(12) United States Patent
Shimakawa et al.

(10) Patent No.: US 10,784,753 B2
(45) Date of Patent: Sep. 22, 2020

(54) ELECTRIC DRIVE DEVICE AND ELECTRIC POWER STEERING DEVICE

(71) Applicant: NSK LTD., Tokyo (JP)

(72) Inventors: Shigeru Shimakawa, Tokyo (JP); Yuri Shimizu, Tokyo (JP); Takashi Sunaga, Tokyo (JP); Masakazu Morimoto, Tokyo (JP); Ryoichi Suzuki, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/617,731

(22) PCT Filed: Jun. 1, 2018

(86) PCT No.: PCT/JP2018/021188
§ 371 (c)(1),
(2) Date: Nov. 27, 2019

(87) PCT Pub. No.: WO2018/221726
PCT Pub. Date: Dec. 6, 2018

(65) Prior Publication Data
US 2020/0195098 A1 Jun. 18, 2020

(30) Foreign Application Priority Data

Jun. 1, 2017 (JP) ................................. 2017-109531
Jun. 1, 2017 (JP) ................................. 2017-109532
(Continued)

(51) Int. Cl.
*H02K 11/33* (2016.01)
*H02K 5/10* (2006.01)
(Continued)

(52) U.S. Cl.
CPC ........... *H02K 11/33* (2016.01); *B62D 5/0406* (2013.01); *B62D 5/0424* (2013.01);
(Continued)

(58) Field of Classification Search
CPC .. H02K 11/33; H02K 11/215; H02K 11/0094; H02K 5/10; H02K 5/225;
(Continued)

(56) References Cited

U.S. PATENT DOCUMENTS 9,359,004 B2   6/2016   Kawata et al.
2007/0218736 A1   9/2007   Takizawa et al.
(Continued)

FOREIGN PATENT DOCUMENTS

CN   1957517 A   5/2007
CN   102255436 A   11/2011
(Continued)

OTHER PUBLICATIONS

International Search Report for PCT/JP2018/021188 dated Aug. 28, 2018 [PCT/ISA/210].
(Continued)

*Primary Examiner* — Michael Andrews
(74) *Attorney, Agent, or Firm* — Sughrue Mion, PLLC

(57) ABSTRACT

An electric drive device and an electric power steering device that reduce temperature increase of a magnetic sensor are provided. The electric drive device includes: an electric motor; an electronic control device including a magnet at an anti-load side end of a shaft to control drive of the electric motor, and a circuit board on the anti-load side of the shaft on an extended line in an axial direction of the shaft; first coil wiring connecting the first coil groups of the electric motor to the circuit board; and second coil wiring connecting the second coil groups of the electric motor to the circuit board. Each of the first and second coil wiring includes a first
(Continued)

portion projecting in a direction intersecting the axial direction of the shaft to the outside of the housing, and a second portion projecting outside the housing from the first portion toward the circuit board.

16 Claims, 73 Drawing Sheets

(30) Foreign Application Priority Data

| May 30, 2018 | (JP) | ................................ 2018-103602 |
|---|---|---|
| May 30, 2018 | (JP) | ................................ 2018-103621 |

(51) Int. Cl.
*H02K 5/22* (2006.01)
*H02K 9/22* (2006.01)
*H02K 11/00* (2016.01)
*B62D 5/04* (2006.01)
*H02K 11/215* (2016.01)

(52) U.S. Cl.
CPC ............. *B62D 5/0463* (2013.01); *H02K 5/10* (2013.01); *H02K 5/225* (2013.01); *H02K 9/22* (2013.01); *H02K 11/0094* (2013.01); *H02K 11/215* (2016.01); *H02K 2211/03* (2013.01); *H02K 2213/06* (2013.01)

(58) Field of Classification Search
CPC .. H02K 9/22; H02K 2211/03; H02K 2213/06; B62D 5/0406; B62D 5/0424; B62D 5/0463

USPC ............................................ 310/64, 71, 68 R
See application file for complete search history.

(56) References Cited

U.S. PATENT DOCUMENTS

| 2007/0252454 A1 | 11/2007 | Hayashi et al. |
| 2011/0285223 A1 | 11/2011 | Miyachi et al. |
| 2013/0088128 A1 | 4/2013 | Nakano et al. |
| 2014/0035445 A1* | 2/2014 | Uryu ...................... H02K 11/33 310/68 D |
| 2016/0036296 A1* | 2/2016 | Kabune .................. H02K 11/21 310/52 |
| 2016/0036299 A1 | 2/2016 | Hayashi |
| 2017/0151976 A1 | 6/2017 | Asao et al. |
| 2018/0123431 A1* | 5/2018 | Kawaguchi ............ H02K 11/00 |

FOREIGN PATENT DOCUMENTS

| JP | 2007-250362 A | 9/2007 |
| JP | 2014-033541 A | 2/2014 |
| JP | 2015-006079 A | 1/2015 |
| JP | 2016-034201 A | 3/2016 |
| JP | 2016-034204 A | 3/2016 |
| JP | 2016-034205 A | 3/2016 |
| WO | 2012/056735 A1 | 5/2012 |
| WO | 2016/023458 A1 | 2/2016 |
| WO | 2016/174704 A1 | 11/2016 |

OTHER PUBLICATIONS

Communication dated May 12, 2020 from the State Intellectual Property Office of the P.R.C. in Application No. 201880036851.8.

* cited by examiner

FIG.61
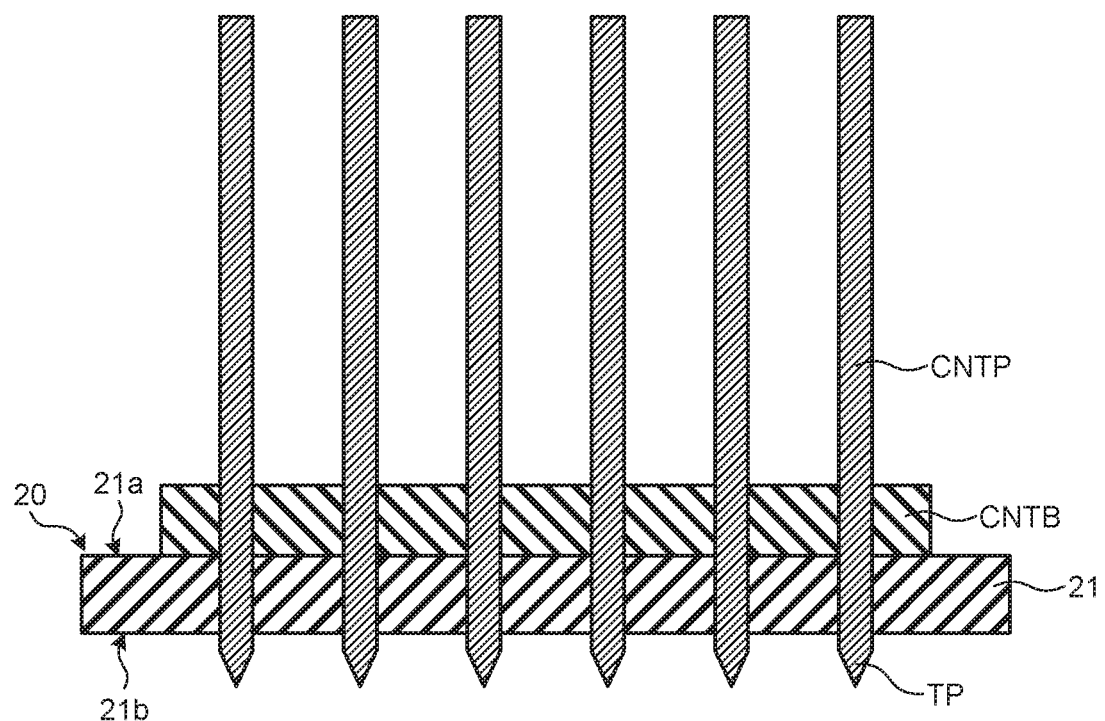
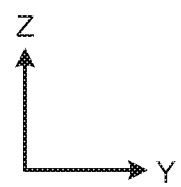

ELECTRIC DRIVE DEVICE AND ELECTRIC POWER STEERING DEVICE

CROSS-REFERENCE TO RELATED APPLICATION

This application is a National Stage of PCT international application Ser. No. PCT/JP2018/021188 filed on Jun. 1, 2018, which designates the United States, incorporated herein by reference, and which is based upon and claims the benefit of priority from Japanese Patent Application No. 2017-109531 filed on Jun. 1, 2017, Japanese Patent Application No. 2017-109532 filed on Jun. 1, 2017, Japanese Patent Application No. 2018-103602 filed on May 30, 2018, and Japanese Patent Application No. 2018-103621 filed on May 30, 2018, the entire contents of which are incorporated herein by reference.

BACKGROUND

1. Technical Field

The present invention relates to an electric drive device and an electric power steering device that are provided with an electronic control device for controlling rotation of an electric motor.

2. Description of the Related Art

An electric power steering device that uses an electric motor to generate steering assist torque is provided with an electronic control device serving as a device for controlling the electric motor. For example, Prior Art 1 describes a drive device having electronic components densely mountable on a substrate.

Prior Art 1: Japanese Laid-open Patent Publication No. 2016-34204

In the drive device of Prior Art 1, switching elements constituting a first inverter unit and switching elements constituting a second inverter unit are symmetrically disposed with respect to an axial center of a motor. The switching elements constituting the first inverter unit and the switching elements constituting the second inverter unit are heat generating elements that generate larger amounts of heat among electronic components included in the drive device. A rotation angle sensor is disposed at the axial center of the motor. Since the heat generating elements are present on both sides of the rotation angle sensor, the rotation angle sensor may be heated from both sides thereof.

The present invention has been made in view of the above-described problem, and aims to provide an electric drive device and an electric power steering device that reduce a rise in temperature of a magnetic sensor.

SUMMARY

To achieve the purpose described above, an electric drive device according to one aspect includes an electric motor that includes: a shaft; a motor rotor interlocked with the shaft; a motor stator including a stator core that rotates the motor rotor; a plurality of coil groups that are divided into at least two systems of first coil groups and second coil groups for each of three phases, and that excite the stator core with three-phase alternating currents; and a tubular housing that accommodates therein the motor rotor, the motor stator, and the coil groups. The electric drive device also includes an electronic control device that includes: a magnet provided at an anti-load side end of the shaft in order to control drive of the electric motor; and a circuit board disposed on the anti-load side of the shaft on an extended line in an axial direction of the shaft. The electric drive device further includes first coil wiring that connects the first coil groups to the circuit board and second coil wiring that connects the second coil groups to the circuit board. The circuit board includes: a detection circuit including a magnetic sensor that detects rotation of the magnet; a first power circuit including a plurality of electronic components that supply currents to the first coil groups; a second power circuit including a plurality of electronic components that supply currents to the second coil groups; and a control circuit including electronic components that control the currents supplied by at least one of the first power circuit or the second power circuit. Each of the first coil wiring and the second coil wiring includes: a first portion that projects in a direction intersecting the axial direction of the shaft to an outside of the housing; and a second portion that projects from the first portion toward the circuit board on the outside.

The above-described configuration allows the first power circuit and the second power circuit to be disposed closer to an outer circumference of the circuit board, and thus can increase separation distances of the first power circuit and the second power circuit from the magnetic sensor. This makes heat generated in the first power circuit and the second power circuit hard to be transmitted to the magnetic sensor, thereby preventing the magnetic sensor from increasing in temperature.

As a preferable aspect, the first coil wiring and the second coil wiring are arranged adjacent to each other. Accordingly, the first power circuit and the second power circuit can be arranged adjacent to each other.

As a preferable aspect, the second portion of the first coil wiring is connected to the first power circuit at a position closer to the outer circumference of the circuit board than the electronic components included in the first power circuit are to the outer circumference of the circuit board. This configuration can locate the first coil wiring away from the magnetic sensor, and can prevent magnetic fields generated by the currents flowing in the first coil wiring from affecting the magnetic sensor.

As a preferable aspect, the circuit board includes a first through-hole for connection to the second portion of the first coil wiring, and, when viewed from a normal direction of the circuit board, arrangement positions of the electronic components included in the first power circuit are between an arrangement position of the detection circuit and the first through-hole. This arrangement can locate current paths extending from the first power circuit to the electric motor away from the magnetic sensor.

As a preferable aspect, when viewed from the normal direction of the circuit board, an arrangement position of an electronic component included in the control circuit is on the opposite side of the first through-hole across the arrangement positions of the electronic components included in the first power circuit. This arrangement can locate the current paths extending from the first power circuit to the electric motor away from the control circuit.

As a preferable aspect, the second portion of the second coil wiring is connected to the second power circuit at a position closer to the outer circumference of the circuit board than the electronic components included in the second power circuit are to the outer circumference of the circuit board. This configuration can locate the second coil wiring away from the magnetic sensor, and can prevent magnetic fields generated by the currents flowing in the second coil wiring from affecting the magnetic sensor.

As a preferable aspect, the circuit board includes a second through-hole for connection to the second portion of the second coil wiring, and, when viewed from the normal direction of the circuit board, arrangement positions of the electronic components included in the second power circuit are between the arrangement position of the detection circuit and the second through-hole. This arrangement can locate current paths extending from the second power circuit to the electric motor away from the magnetic sensor.

As a preferable aspect, when viewed from the normal direction of the circuit board, the arrangement position of the electronic component included in the control circuit is on the opposite side of the second through-hole across the arrangement positions of the electronic components included in the second power circuit. This arrangement can locate the current paths extending from the second power circuit to the electric motor away from the control circuit.

As a preferable aspect, the electric drive device further includes a capacitor disposed on the circuit board, and, when viewed from the normal direction of the circuit board, the arrangement position of the detection circuit is on the opposite side of the arrangement positions of the electronic components included in the first power circuit or the second power circuit across an arrangement position of the capacitor. This arrangement can further increase a separation distance of the first power circuit or the second power circuit from the magnetic sensor.

As a preferable aspect, when viewed from the normal direction of the circuit board, the arrangement position of the detection circuit is on the opposite side of the arrangement positions of the electronic components included in the first power circuit or the second power circuit across a straight line passing through a center of the circuit board. This arrangement can further increase the separation distance of the first power circuit or the second power circuit from the magnetic sensor.

As a preferable aspect, the electric drive device further includes a connector connected to the circuit board, and the connector is disposed outside the electric motor when viewed from the axial direction of the shaft. This arrangement can locate the connector away from the magnetic sensor, and can restrain magnetic fields generated by currents flowing in the connector from affecting the magnetic sensor.

As a preferable aspect, the electric drive device further includes a heat sink that supports the circuit board. This configuration efficiently dissipates heat generated by the circuit board.

As a preferable aspect, the heat sink includes a first raised portion that faces at least one of the first power circuit or the second power circuit and that is raised toward the circuit board. This configuration can effectively dissipate the heat generated in the first power circuit and the second power circuit.

As a preferable aspect, the electric drive device further includes a first heat dissipation material provided on the first raised portion. This configuration can more effectively dissipate the heat generated in the first power circuit and the second power circuit.

As a preferable aspect, the heat sink further includes a second raised portion that faces the control circuit and that is raised toward the circuit board. This configuration can effectively dissipate heat generated in the control circuit.

As a preferable aspect, the electric drive device further includes a second heat dissipation material provided on the second raised portion. This configuration can more effectively dissipate the heat generated in the control circuit.

As a preferable aspect, the heat sink further includes a depressed portion that faces the circuit board and that is depressed toward the opposite side of the circuit board, and the depressed portion accommodates the capacitor disposed on the circuit board. This configuration can make the thickness of a structure including the circuit board with the capacitor disposed thereon and the heat sink smaller than that when the heat sink includes no depressed portion.

As a preferable aspect, the electric drive device further includes an adapter disposed between the electric motor and the heat sink, and each of the first coil wiring and the second coil wiring further includes a bent portion bent between the first portion and the second portion, the bent portion being disposed inside the adapter. This configuration can locate the first coil wiring and the second coil wiring further away from the magnetic sensor in the axial direction of the shaft.

As a preferable aspect, the adapter includes a projecting portion projecting to the outside of the electric motor when viewed from the axial direction of the shaft, and the bent portion is disposed inside the projecting portion. This configuration can locate the first coil wiring and the second coil wiring further away from the magnetic sensor in the direction intersecting the axial direction of the shaft.

As a preferable aspect, the heat sink includes one of a depressed portion and a projecting portion, and the adapter includes the other of the depressed portion and the projecting portion, the projecting portion being fitted in the depressed portion. This configuration can position the adapter with respect to the heat sink.

As a preferable aspect, the electric drive device further includes a first adhesive disposed on the depressed portion, and the first adhesive bonds the heat sink to the adapter. This configuration can prevent the adapter from separating from the heat sink.

As a preferable aspect, the electric drive device further includes a lid that covers the circuit board and a snap-fit that fixes the lid to the heat sink, one of a hooking part and a hooked part of the snap-fit being provided on an outer circumferential portion of the lid, and the other of the hooking part and the hooked part being provided on an outer circumferential portion of the heat sink. This configuration can easily fix the lid to the heat sink.

As a preferable aspect, the electric drive device further includes a valve provided on the lid, the lid and the heat sink constituting a container for containing the circuit board, and the valve opening and closing based on a pressure difference between the inside and the outside of the container. This configuration can reduce a change in pressure in the container caused by a temperature change.

As a preferable aspect, the heat sink includes a groove portion provided on the outer circumferential portion of the heat sink, and the outer circumferential portion of the lid is fitted in the groove portion. This configuration can position the lid with respect to the heat sink.

As a preferable aspect, the electric drive device further includes a second adhesive disposed on the groove portion, and the second adhesive bonds the outer circumferential portion of the lid to the heat sink. As a result, the lid is fixed to the heat sink by both the snap-fit and the adhesive.

An electric power steering device according to one aspect includes the electric drive device described above, and the electric drive device generates steering assist torque. Thus, the magnetic sensor included in the electric drive device is prevented from increasing in temperature.

An electric drive device according to another aspect includes an electric motor that includes: a shaft; a motor rotor interlocked with the shaft; a motor stator including a stator core that rotates the motor rotor; a plurality of coil groups that are divided into at least two systems of first coil groups and second coil groups for each of three phases, and that excite the stator core with three-phase alternating currents; and a tubular housing that accommodates therein the motor rotor, the motor stator, and the coil groups. The electric drive device also includes an electronic control device that includes: a magnet provided at an anti-load side end of the shaft in order to control drive of the electric motor; and a circuit board disposed on the anti-load side of the shaft on an extended line in an axial direction of the shaft. The electric drive device further includes: first coil wiring that connects the first coil groups to the circuit board; second coil wiring that connects the second coil groups to the circuit board; a heat sink that includes a first surface and a second surface that is located on the opposite side of the first surface, and that supports the circuit board on the first surface side; and a ring-shaped wall portion disposed between the first surface and the circuit board. The circuit board includes: a detection circuit including a magnetic sensor that detects rotation of the magnet; a first power circuit including a plurality of electronic components that supply currents to the first coil groups; a second power circuit including a plurality of electronic components that supply currents to the second coil groups; and a control circuit including electronic components that control the currents supplied by at least one of the first power circuit or the second power circuit. Each of the first coil wiring and the second coil wiring includes a first portion that projects in a direction intersecting the axial direction of the shaft to an outside of the housing, and a second portion that projects from the first portion toward the circuit board on the outside. The heat sink includes a through-hole that is provided between the first surface and the second surface and through which the shaft passes, and the through-hole is located inside the ring of the wall portion in a plan view from the axial direction of the shaft.

The above-described configuration allows the first power circuit and the second power circuit to be disposed closer to an outer circumference of the circuit board, and thus can increase separation distances of the first power circuit and the second power circuit from the magnetic sensor. This makes heat generated in the first power circuit and the second power circuit hard to be transmitted to the magnetic sensor, thereby preventing the magnetic sensor from increasing in temperature.

The wall portion includes an end portion on the circuit board side thereof, and a cap can be mounted on the end portion. This configuration can prevent foreign matter from getting into the ring of the wall portion from the first surface side of the heat sink. The magnet is located inside the ring of the wall portion. Therefore, the foreign matter is prevented from adhering to (contaminating) the magnet.

As a preferable aspect, the electric drive device further includes a plurality of ribs that connect an outer circumferential surface of the wall portion to the first surface. This configuration can increase strength of the connection between the wall portion and the heat sink.

As a preferable aspect, the ribs are arranged at regular intervals along the circumference of the wall portion. This arrangement can prevent the strength of the connection between the wall portion and the heat sink from being biased on the circumference of the wall portion.

As a preferable aspect, the electric drive device further includes a cap mounted on the end portion on the circuit board side of the wall portion, and the cap includes a top board portion that faces the magnet and a rim portion that supports an outer circumference of the top board portion, the material of the top board portion being a resin. With this configuration, a magnetic flux generated from the magnet can pass through the top board portion of the cap, and the magnetic sensor can detect the magnetic flux. The cap need not be removed from the end portion of the wall portion in order to let the magnetic flux pass. As a result, no process is required to remove the cap in an assembly process of the electric drive device. Thus, the number of processes can be prevented from increasing. After the circuit board is mounted on the heat sink, and the electric drive device is completed, the cap remains being mounted on the wall portion. As a result, the foreign matter continues to be prevented from adhering to the magnet.

As a preferable aspect, the wall portion includes a groove portion provided on the outer circumferential surface, and the rim portion includes a projecting portion provided in a position that overlaps the groove portion, the projecting portion engaging with the groove portion. This engagement fixes the cap to the wall portion.

As a preferable aspect, the wall portion is formed integrally with the heat sink. With this configuration, no boundary of connection is present between the wall portion and the heat sink. Therefore, the strength of the connection between the wall portion and the heat sink can be increased. The material of the wall portion is the same as that of the heat sink, and is, for example, a metal. When the material of the wall portion is a metal, the magnetism is interrupted between the inside and the outside of the ring of the wall portion.

As a preferable aspect, the heat sink includes a depressed portion provided on the first surface, and the wall portion is fitted in the depressed portion. This configuration allows the heat sink and the wall portion to be separately manufactured.

As a preferable aspect, the electric drive device further includes a magnetic shielding layer provided on an inner circumferential surface of the wall portion. This configuration blocks the magnetism between the inside and the outside of the ring of the wall portion even when the wall portion is made of a resin.

An electric drive device according to still another aspect includes an electric motor that includes: a shaft; a motor rotor interlocked with the shaft; a motor stator including a stator core that rotates the motor rotor; a plurality of coil groups that are divided into at least two systems of first coil groups and second coil groups for each of three phases, and that excite the stator core with three-phase alternating currents; and a tubular housing that accommodates therein the motor rotor, the motor stator, and the coil groups. The electric drive device also includes an electronic control device that includes: a magnet provided at an anti-load side end of the shaft in order to control drive of the electric motor; and a circuit board disposed on the anti-load side of the shaft on an extended line in an axial direction of the shaft. The electric drive device further includes: first coil wiring that connects the first coil groups to the circuit board; second coil wiring that connects the second coil groups to the circuit board; a heat sink that includes a first surface and a second surface that is located on the opposite side of the first surface, and that supports the circuit board on the first surface side; a ring-shaped wall portion disposed between the first surface and the circuit board; and an elastic body disposed between the wall portion and the circuit board. The circuit board includes: a detection circuit including a magnetic sensor that detects rotation of the magnet; a first power circuit including a plurality of electronic components that supply currents to the first coil groups; a second power circuit including a plurality of electronic components that supply currents to the second coil groups; and a control circuit including electronic components that control the currents supplied by at least one of the first power circuit or the second power circuit. Each of the first coil wiring and the second coil wiring includes: a first portion that projects in a direction intersecting the axial direction of the shaft to an outside of the housing; and a second portion that projects from the first portion toward the circuit board on the outside. The heat sink includes a through-hole that is provided between the first surface and the second surface and through which the shaft passes, and the through-hole is located inside the ring of the wall portion in a plan view from the axial direction of the shaft.

The above-described configuration allows the first power circuit and the second power circuit to be disposed closer to an outer circumference of the circuit board, and thus can increase separation distances of the first power circuit and the second power circuit from the magnetic sensor. This makes heat generated in the first power circuit and the second power circuit hard to be transmitted to the magnetic sensor, thereby preventing the magnetic sensor from increasing in temperature.

The elastic body is disposed between the wall portion and the circuit board. The elastic body comes in tight contact with the wall portion and the circuit board to prevent the circuit board from vibrating and prevent the magnetic sensor from vibrating relative to the magnet. As a result, a separation distance between the magnetic sensor and the magnet can be kept more constant. The magnetic sensor can accurately detect a rotation angle of the magnet.

As a preferable aspect, the elastic body has a ring shape, and the through-hole is located inside the ring of the elastic body in the plan view from the axial direction of the shaft. With this configuration, once the elastic body comes in tight contact with the wall portion and the circuit board, the ring of the wall portion is closed by the circuit board. This closing can prevent the foreign matter from getting into the ring of the wall portion from the first surface side of the heat sink. The magnet is located inside the ring of the wall portion. Therefore, the foreign matter is prevented from adhering to (contaminating) the magnet.

As a preferable aspect, the wall portion includes a groove portion provided on a surface thereof facing the circuit board, and the elastic body is fitted in the groove portion. This configuration facilitates disposition of the elastic body on the surface of the wall portion facing the circuit board, and can prevent the elastic body from being displaced with respect to the wall portion.

As a preferable aspect, the elastic body has an insulating property. This property allows the elastic body to isolate the circuit board from the wall portion. For example, the elastic body can prevent any current from flowing between the wall portion and the circuit board even when the wall portion is made of a metal.

As a preferable aspect, the electric drive device further includes a plurality of ribs that connect an outer circumferential surface of the wall portion to the first surface. This configuration can increase strength of the connection between the wall portion and the heat sink.

As a preferable aspect, the ribs are arranged at regular intervals along the circumference of the wall portion. This arrangement can prevent the strength of the connection between the wall portion and the heat sink from being biased on the circumference of the wall portion.

As a preferable aspect, the wall portion is formed integrally with the heat sink. With this configuration, no boundary of connection is present between the wall portion and the heat sink. Therefore, the strength of the connection between the wall portion and the heat sink can be increased. The material of the wall portion is the same as that of the heat sink, and is, for example, a metal. When the material of the wall portion is a metal, the magnetism is interrupted between the inside and the outside of the ring of the wall portion.

As a preferable aspect, the heat sink includes a depressed portion provided on the first surface, and the wall portion is fitted in the depressed portion. This configuration allows the heat sink and the wall portion to be separately manufactured.

As a preferable aspect, the electric drive device further includes a magnetic shielding layer provided on an inner circumferential surface of the wall portion. This configuration blocks the magnetism between the inside and the outside of the ring of the wall portion even when the wall portion is made of a resin.

An electric drive device according to still another aspect of the present invention includes an electric motor that includes: a shaft; a motor rotor interlocked with the shaft; a motor stator including a stator core that rotates the motor rotor; a plurality of coil groups that are divided into at least two systems of first coil groups and second coil groups for each of three phases, and that excite the stator core with three-phase alternating currents; and a tubular housing that accommodates therein the motor rotor, the motor stator, and the coil groups. The electric drive device also includes an electronic control device that includes: a magnet provided at an anti-load side end of the shaft in order to control drive of the electric motor; a circuit board disposed on the anti-load side of the shaft on an extended line in an axial direction of the shaft; a lid that covers the circuit board; and a connector connected to the circuit board. The electric drive device further includes: first coil wiring that connects the first coil groups to the circuit board; and second coil wiring that connects the second coil groups to the circuit board. The circuit board includes: a detection circuit including a magnetic sensor that detects rotation of the magnet: a first power circuit including a plurality of electronic components that supply currents to the first coil groups; a second power circuit including a plurality of electronic components that supply currents to the second coil groups; and a control circuit including electronic components that control the currents supplied by at least one of the first power circuit or the second power circuit. Each of the first coil wiring and the second coil wiring includes: a first portion that projects in a direction intersecting the axial direction of the shaft to an outside of the housing; and a second portion that projects from the first portion toward the circuit board on the outside. The lid includes a lid body and an exterior portion of the connector formed integrally with the lid body.

The above-described configuration allows the first power circuit and the second power circuit to be disposed closer to an outer circumference of the circuit board, and thus can increase separation distances of the first power circuit and the second power circuit from the magnetic sensor. This makes heat generated in the first power circuit and the second power circuit hard to be transmitted to the magnetic sensor, thereby preventing the magnetic sensor from increasing in temperature. The integral formation of the lid body with the exterior portion of the connector can contribute to a reduction in number of parts of the electric drive device.

As a preferable aspect, the lid body includes a first surface that faces the circuit board and a second surface located on the opposite side of the first surface, and the exterior portion projects from the second surface to the outside of the lid. With this configuration, signal transmission wiring located outside the electric drive device can be connected from the lid side through the connector to the circuit board.

As a preferable aspect, the connector is separated from the first coil wiring and the second coil wiring in a normal direction of the circuit board. With this configuration, at the circuit board, a region where the connector is connected and a region where the first coil wiring or the second coil wiring is connected can be separated from each other.

As a preferable aspect, the first coil wiring and the second coil wiring are arranged adjacent to each other. Accordingly, the first power circuit and the second power circuit can be arranged adjacent to each other.

As a preferable aspect, the second portion of the first coil wiring is connected to the first power circuit at a position closer to the outer circumference of the circuit board than the electronic components included in the first power circuit are to the outer circumference of the circuit board. This configuration can locate the first coil wiring away from the magnetic sensor, and can prevent magnetic fields generated by the currents flowing in the first coil wiring from affecting the magnetic sensor.

As a preferable aspect, the circuit board includes a first through-hole for connection to the second portion of the first coil wiring, and, when viewed from the normal direction of the circuit board, arrangement positions of the electronic components included in the first power circuit are between an arrangement position of the detection circuit and the first through-hole. This arrangement can locate current paths extending from the first power circuit to the electric motor away from the magnetic sensor.

As a preferable aspect, when viewed from the normal direction of the circuit board, an arrangement position of an electronic component included in the control circuit is on the opposite side of the first through-hole across the arrangement positions of the electronic components included in the first power circuit. This arrangement can locate the current paths extending from the first power circuit to the electric motor away from the control circuit.

As a preferable aspect, the second portion of the second coil wiring is connected to the second power circuit at a position closer to the outer circumference of the circuit board than the electronic components included in the second power circuit are to the outer circumference of the circuit board. This configuration can locate the second coil wiring away from the magnetic sensor, and can prevent magnetic fields generated by the currents flowing in the second coil wiring from affecting the magnetic sensor.

As a preferable aspect, the circuit board includes a second through-hole for connection to the second portion of the second coil wiring, and, when viewed from the normal direction of the circuit board, arrangement positions of the electronic components included in the second power circuit are between the arrangement position of the detection circuit and the second through-hole. This arrangement can locate current paths extending from the second power circuit to the electric motor away from the magnetic sensor.

As a preferable aspect, when viewed from the normal direction of the circuit board, the arrangement position of the electronic component included in the control circuit is on the opposite side of the second through-hole across the arrangement positions of the electronic components included in the second power circuit. This arrangement can locate the current paths extending from the second power circuit to the electric motor away from the control circuit.

As a preferable aspect, the electric drive device further includes a capacitor disposed on the circuit board, and, when viewed from the normal direction of the circuit board, the arrangement position of the detection circuit is on the opposite side of the arrangement positions of the electronic components included in the first power circuit or the second power circuit across an arrangement position of the capacitor. This arrangement can further increase a separation distance of the first power circuit or the second power circuit from the magnetic sensor.

As a preferable aspect, when viewed from the normal direction of the circuit board, the arrangement position of the detection circuit is on the opposite side of the arrangement positions of the electronic components included in the first power circuit or the second power circuit across a straight line passing through a center of the circuit board. This arrangement can further increase the separation distance of the first power circuit or the second power circuit from the magnetic sensor.

As a preferable aspect, the connector is disposed outside the electric motor when viewed from the axial direction of the shaft. This arrangement can locate the connector away from the magnetic sensor, and can prevent magnetic fields generated by currents flowing in the connector from affecting the magnetic sensor.

As a preferable aspect, the electric drive device further includes a heat sink that supports the circuit board, and the lid is mounted on the heat sink. This configuration efficiently dissipates heat generated by the circuit board.

As a preferable aspect, the heat sink includes a first raised portion that faces at least one of the first power circuit or the second power circuit and that is raised toward the circuit board. This configuration can effectively dissipate the heat generated in the first power circuit and the second power circuit.

As a preferable aspect, the electric drive device further includes a first heat dissipation material provided on the first raised portion. This configuration can more effectively dissipate the heat generated in the first power circuit and the second power circuit.

As a preferable aspect, the heat sink further includes a second raised portion that faces the control circuit and that is raised toward the circuit board. This configuration can effectively dissipate heat generated in the control circuit.

As a preferable aspect, the electric drive device further includes a second heat dissipation material provided on the second raised portion. This configuration can more effectively dissipate the heat generated in the control circuit.

As a preferable aspect, the heat sink further includes a depressed portion that faces the circuit board and that is depressed toward the opposite side of the circuit board, and the depressed portion accommodates a capacitor disposed on the circuit board. This configuration can make the thickness of a structure including the circuit board with the capacitor disposed thereon and the heat sink smaller than that when the heat sink includes no depressed portion.

As a preferable aspect, the electric drive device further includes an adapter disposed between the electric motor and the heat sink, and each of the first coil wiring and the second coil wiring further includes a bent portion bent between the first portion and the second portion, the bent portion being disposed inside the adapter. This configuration can locate the first coil wiring and the second coil wiring further away from the magnetic sensor in the axial direction of the shaft.

As a preferable aspect, the adapter includes a projecting portion projecting to the outside of the electric motor when viewed from the axial direction of the shaft, and the bent portion is disposed inside the projecting portion. This configuration can locate the first coil wiring and the second coil wiring further away from the magnetic sensor in the direction intersecting the axial direction of the shaft.

As a preferable aspect, the heat sink includes one of a depressed portion and a projecting portion, and the adapter includes the other of the depressed portion and the projecting portion, the projecting portion being fitted in the depressed portion. This configuration can position the adapter with respect to the heat sink.

As a preferable aspect, the electric drive device further includes a first adhesive disposed on the depressed portion, and the first adhesive bonds the heat sink to the adapter. This configuration can prevent the adapter from separating from the heat sink.

As a preferable aspect, the electric drive device further includes a snap-fit that fixes the lid to the heat sink, one of a hooking part and a hooked part of the snap-fit being provided on an outer circumferential portion of the lid, and the other of the hooking part and the hooked part being provided on an outer circumferential portion of the heat sink. This configuration can easily fix the lid to the heat sink.

As a preferable aspect, the electric drive device further includes a valve provided on the lid, the lid and the heat sink constituting a container for containing the circuit board, and the valve opening and closing based on a pressure difference between the inside and the outside of the container. This configuration can reduce a change in pressure in the container caused by a temperature change.

As a preferable aspect, the heat sink includes a groove portion provided on the outer circumferential portion of the heat sink, and the outer circumferential portion of the lid is fitted in the groove portion. With this configuration, the groove portion can be used to position the lid with respect to the heat sink.

As a preferable aspect, the electric drive device further includes a second adhesive disposed on the groove portion, and the second adhesive bonds the outer circumferential portion of the lid to the heat sink. As a result, the lid is fixed to the heat sink by both the snap-fit and the adhesive.

The present invention can provide an electric drive device and an electric power steering device that reduce a rise in temperature of a magnetic sensor.

BRIEF DESCRIPTION OF THE DRAWINGS

FIG. 61 is another schematic diagram illustrating the connection example of the connector to the circuit board.

DETAILED DESCRIPTION

Modes (embodiments) for carrying out the present invention will be described in detail with reference to the drawings. The present invention is not limited to the content described in the following embodiments. The components described below include those easily conceivable by those skilled in the art and those substantially the same. In addition, the components described below can be combined as appropriate.

First Embodiment

Figure 1:
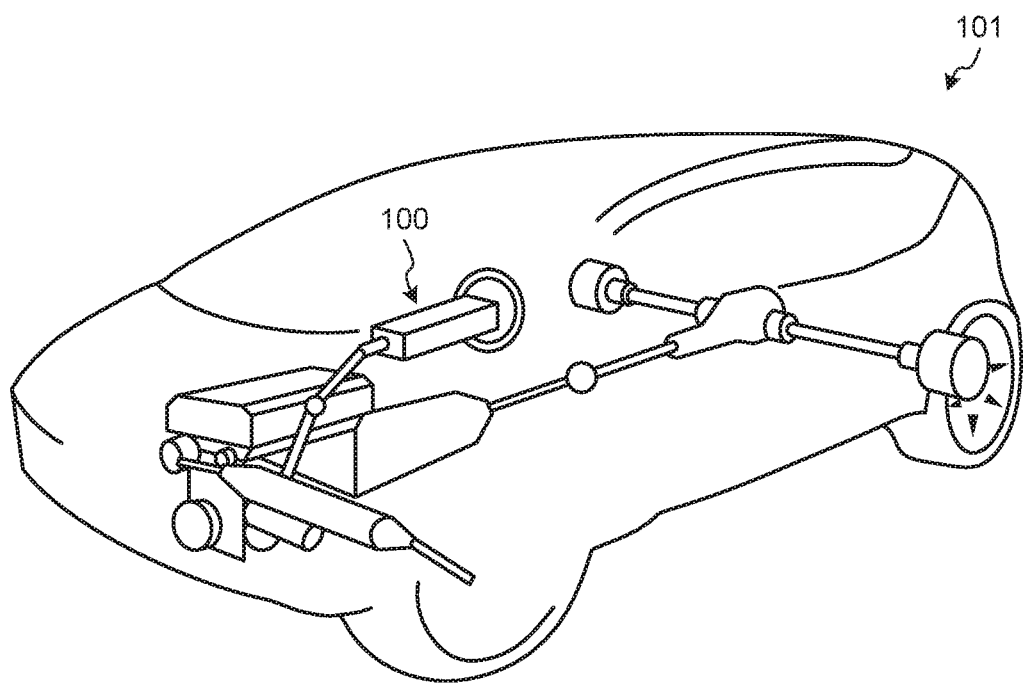
FIG. 1 is a perspective view schematically illustrating a vehicle provided with an electric power steering device according to a first embodiment of the present invention.
Figure 2:
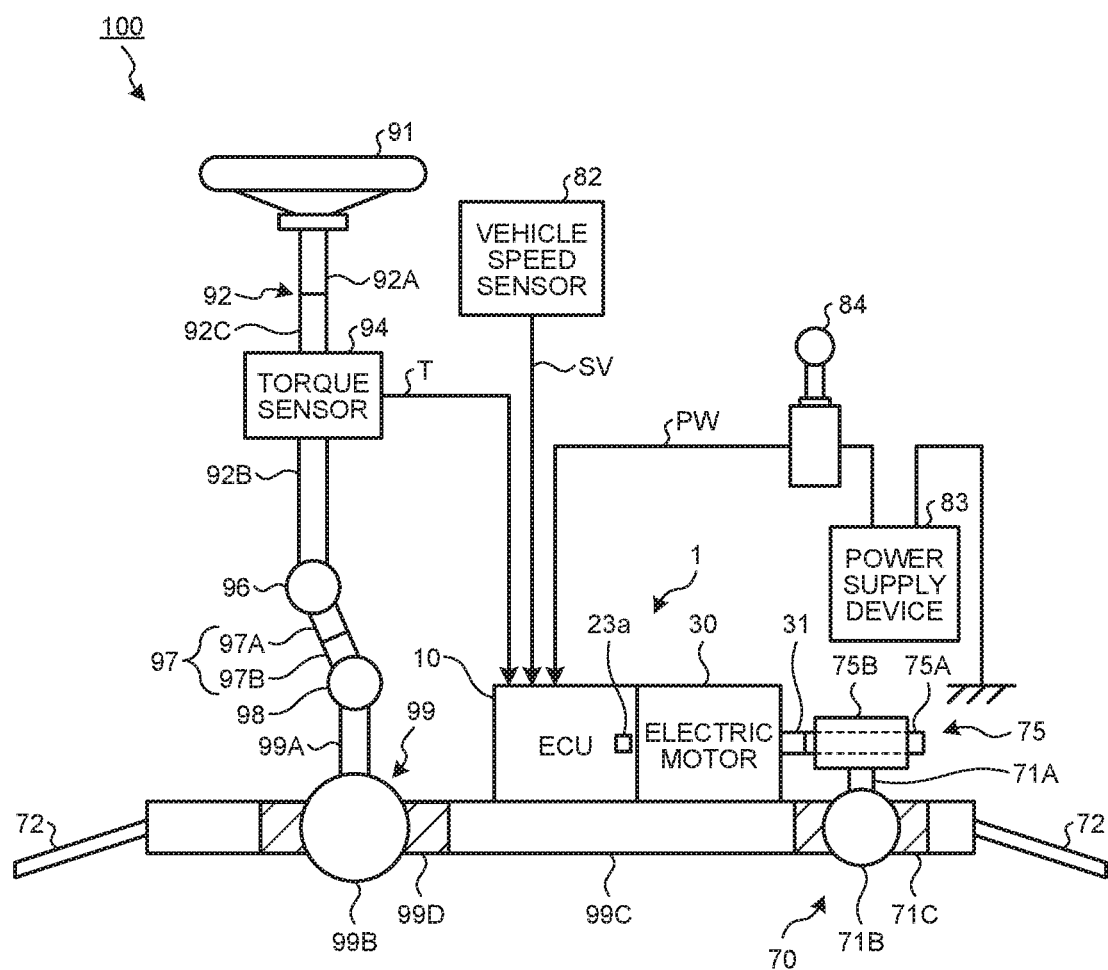
FIG. 2 is a schematic diagram of the electric power steering device according to the first embodiment.

FIG. 1 is a perspective view schematically illustrating a vehicle provided with an electric power steering device according to a first embodiment of the present invention. FIG. 2 is a schematic diagram of the electric power steering device according to the first embodiment. As illustrated in FIG. 1, a vehicle 101 is provided with an electric power steering device 100. An outline of the electric power steering device 100 will be described with reference to FIG. 2.

The electric power steering device 100 is provided with a steering wheel 91, a steering shaft 92, a universal joint 96, an intermediate shaft 97, a universal joint 98, a first rack-and-pinion mechanism 99, and tie rods 72, in the order of transmission of a force applied from a driver (operator). The electric power steering device 100 is also provided with a torque sensor 94 for detecting steering torque of the steering shaft 92, an electric motor 30, an electronic control device (hereafter, called "electronic control unit (ECU)") 10 for controlling the electric motor 30, a speed reducer 75, and a second rack-and-pinion mechanism 70. A vehicle body is provided with a vehicle speed sensor 82, a power supply device 83 (such as an in-vehicle battery), and an ignition switch 84. The vehicle speed sensor 82 detects a traveling speed of the vehicle 101. The vehicle speed sensor 82 outputs a detected vehicle speed signal SV to the ECU 10 through Controller Area Network (CAN) communication. The ECU 10 is supplied with power from the power supply device 83 while the ignition switch 84 is in an on state.

An electric drive device 1 is provided with the electric motor 30 and the ECU 10 fixed to an anti-load side of a shaft 31 of the electric motor 30. The electric drive device 1 may be provided with an adapter 60 (refer to FIG. 3) for connecting the ECU 10 to the electric motor 30.

As illustrated in FIG. 2, the steering shaft 92 includes an input shaft 92A, an output shaft 92B, and a torsion bar 92C. The input shaft 92A is connected at one end thereof to the steering wheel 91, and connected at the other end thereof to the torsion bar 92C. The output shaft 92B is connected at one end thereof to the torsion bar 92C, and connected at the other end thereof to the universal joint 96. The torque sensor 94 detects torsion of the torsion bar 92C to detect the steering torque applied to the steering shaft 92. The torque sensor 94 outputs a steering torque signal T corresponding to the detected steering torque to the ECU 10 through the CAN communication. The steering shaft 92 is rotated by a steering force applied to the steering wheel 91.

The intermediate shaft 97 includes an upper shaft 97A and a lower shaft 97B, and transmits the torque of the output shaft 92B. The upper shaft 97A is connected through the universal joint 96 to the output shaft 92B. Meanwhile, the lower shaft 97B is connected through the universal joint 98 to a first pinion shaft 99A of the first rack-and-pinion mechanism 99. The upper shaft 97A and the lower shaft 97B are, for example, splined to each other.

The first rack-and-pinion mechanism 99 includes the first pinion shaft 99A, a first pinion gear 99B, a rack shaft 99C, and a first rack 99D. The first pinion shaft 99A is connected at one end thereof to the lower shaft 97B through the universal joint 98, and connected at the other end thereof to the first pinion gear 99B. The first rack 99D provided on the rack shaft 99C meshes with the first pinion gear 99B. The rotary motion of the steering shaft 92 is transmitted through the intermediate shaft 97 to the first rack-and-pinion mechanism 99. This rotary motion is converted by the first rack-and-pinion mechanism 99 into linear motion of the rack shaft 99C. The respective tie rods 72 are connected to both ends of the rack shaft 99C.

The electric motor 30 is a motor that generates steering assist torque for assisting the steering of the driver. The electric motor 30 may be a brushless motor or a brushed motor having brushes and a commutator.

The ECU 10 is provided with a rotation angle sensor 23a. The rotation angle sensor 23a detects a rotation phase of the electric motor 30. The ECU 10 acquires a rotation phase signal of the electric motor 30 from the rotation angle sensor 23a, the steering torque signal T from the torque sensor 94, and the vehicle speed signal SV of the vehicle 101 from the vehicle speed sensor 82. The ECU 10 calculates an auxiliary steering command value of an assist command based on the rotation phase signal, the steering torque signal T, and the vehicle speed signal SV. The ECU 10 supplies a current to the electric motor 30 based on the calculated auxiliary steering command value.

The speed reducer 75 is provided with a worm shaft 75A that rotates integrally with the shaft 31 of the electric motor 30, and a worm wheel 75B that meshes with the worm shaft 75A. Accordingly, the rotary motion of the shaft 31 is transmitted to the worm wheel 75B through the worm shaft 75A. In the first embodiment, the speed reducer 75 side of the shaft 31 is called a load side end, and a side opposite to the speed reducer 75 of the shaft 31 is called an anti-load side end.

The second rack-and-pinion mechanism 70 includes a second pinion shaft 71A, a second pinion gear 71B, and a second rack 71C. The second pinion shaft 71A is fixed at one end thereof to the worm wheel 75B so as to rotate coaxially and integrally therewith. The second pinion shaft 71A has the other end thereof connected to the second pinion gear 71B. The second rack 71C provided on the rack shaft 99C mashes with the second pinion gear 71B. The rotary motion of the electric motor 30 is transmitted to the second rack-and-pinion mechanism 70 through the speed reducer 75. This rotary motion is converted by the second rack-and-pinion mechanism 70 into the linear motion of the rack shaft 99C.

The steering force applied to the steering wheel 91 by the driver is transmitted through the steering shaft 92 and the intermediate shaft 97 to the first rack-and-pinion mechanism 99. The first rack-and-pinion mechanism 99 transmits the transmitted steering force as a force applied in the axial direction of the rack shaft 99C to the rack shaft 99C. At this time, the ECU 10 acquires the steering torque signal T applied to the steering shaft 92 from the torque sensor 94. The ECU 10 acquires the vehicle speed signal SV from the vehicle speed sensor 82. The ECU 10 acquires the rotation phase signal of the electric motor 30 from the rotation angle sensor 23a. Then, the ECU 10 outputs a control signal to control the operation of the electric motor 30. The steering assist torque output by the electric motor 30 is transmitted to the second rack-and-pinion mechanism 70 through the speed reducer 75. The second rack-and-pinion mechanism 70 transmits the steering assist torque as a force applied in the axial direction of the rack shaft 99C to the rack shaft 99C. In this way, the steering of the steering wheel 91 by the driver is assisted by the electric power steering device 100.

Figure 3:
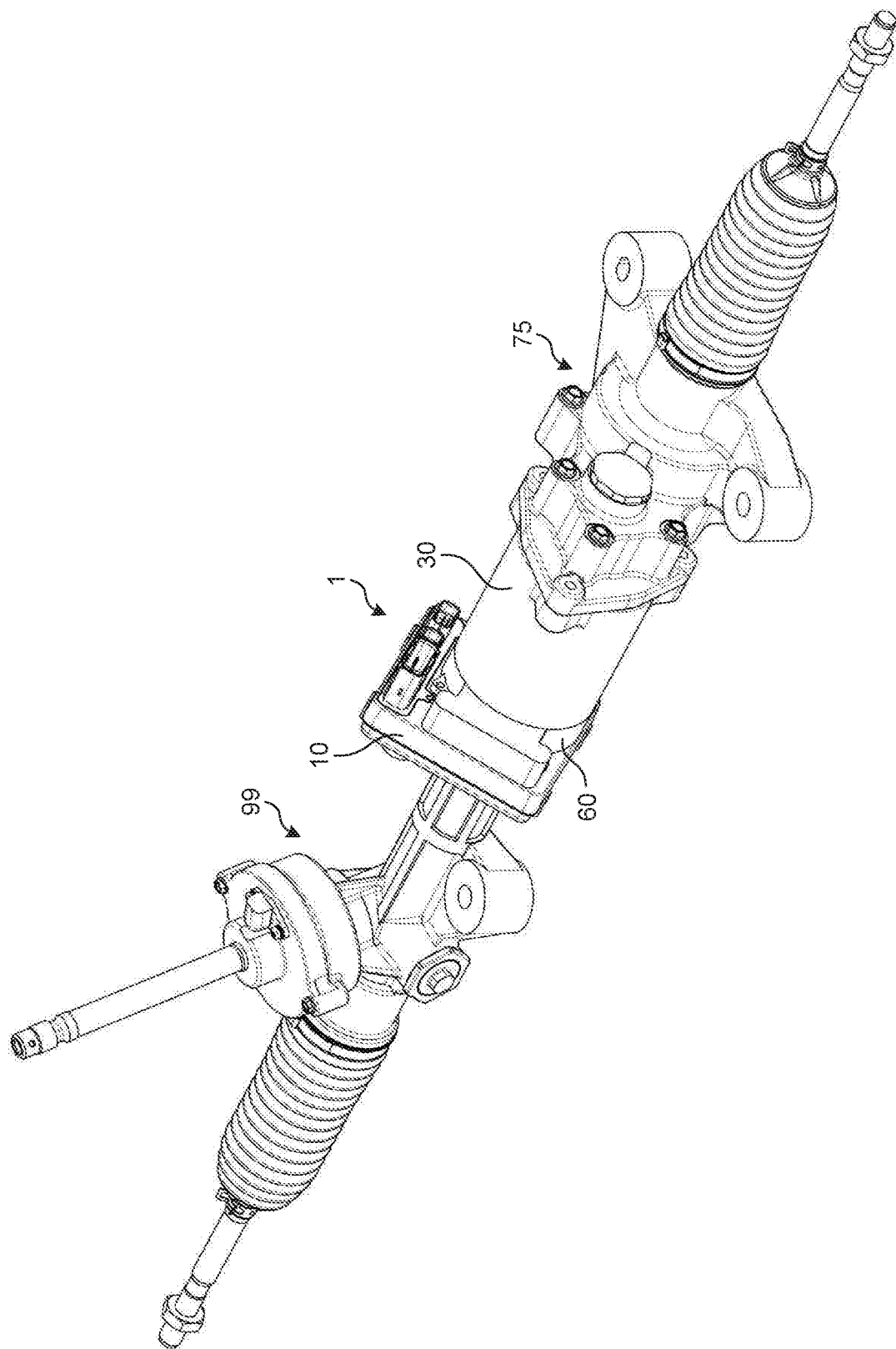
FIG. 3 is a schematic view illustrating an arrangement example of an electronic control unit (ECU) according to the first embodiment.

FIG. 3 is a schematic view illustrating an arrangement example of the ECU according to the first embodiment. As illustrated in FIG. 3, the electric drive device 1 provided with the ECU 10, the electric motor 30, and the adapter 60 is disposed near the first rack-and-pinion mechanism 99 and the second rack-and-pinion mechanism 70. As described above, the electric power steering device 100 is a rack assisted system in which the assist force is applied to the second rack-and-pinion mechanism 70, but is not limited to this system. The electric power steering device 100 may be a column assisted system in which the assist force is applied to the steering shaft 92, or a pinion assisted system in which the assist force is applied to the first pinion gear 99B.

Figure 4:
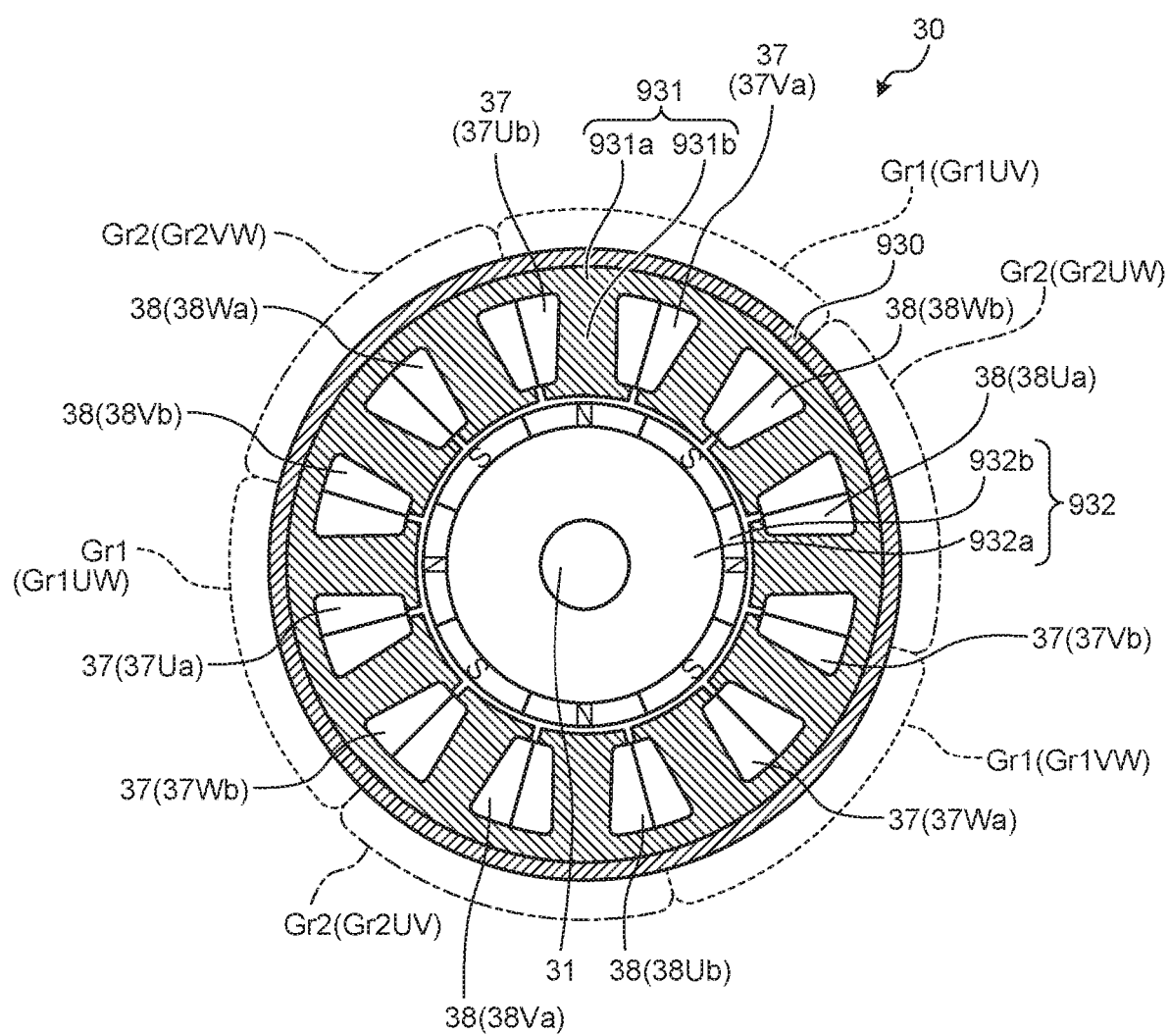
FIG. 4 is a sectional view schematically illustrating a section of an electric motor according to the first embodiment.
Figure 5:
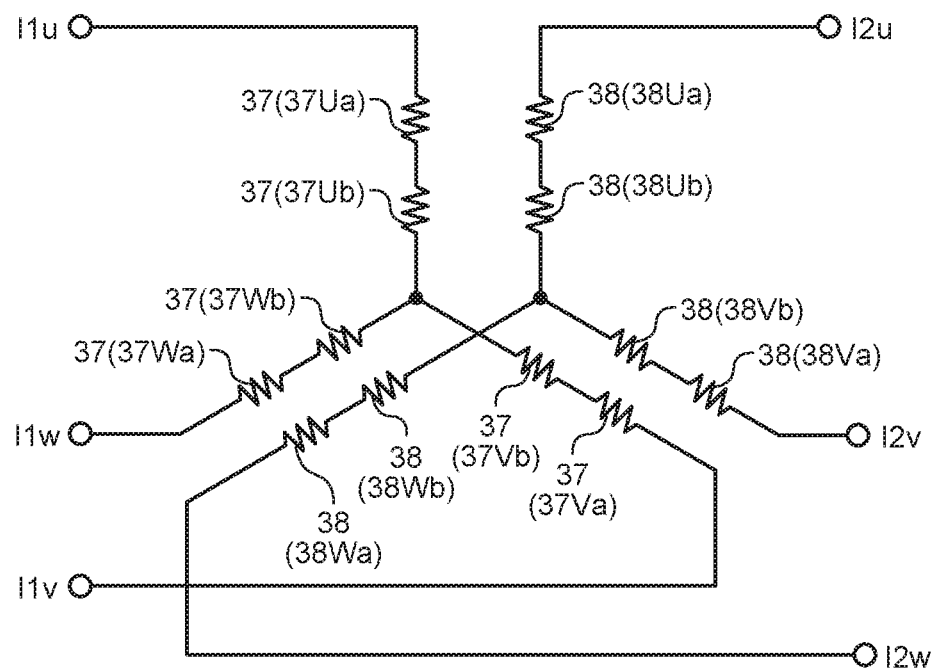
FIG. 5 is a schematic diagram illustrating wiring of the electric motor according to the first embodiment.

FIG. 4 is a sectional view schematically illustrating a section of the electric motor according to the first embodiment. FIG. 5 is a schematic diagram illustrating wiring of the electric motor according to the first embodiment. As illustrated in FIG. 4, the electric motor 30 is provided with a housing 930, a stator including a stator core 931, and a rotor 932. The stator includes the stator core 931 having a cylindrical shape, a plurality of first coils 37, and a plurality of second coils 38. The stator core 931 includes a ring-shaped back yoke 931a and a plurality of teeth 931b projecting from the inner circumferential surface of the back yoke 931a. Twelve of the teeth 931b are arranged in the circumferential direction. The rotor 932 includes a rotor yoke 932a and magnetic poles 932b. The magnetic poles 932b are provided on the outer circumferential surface of the rotor yoke 932a. The number of the magnetic poles 932b is, for example, eight.

As illustrated in FIG. 4, each of the first coils 37 is concentratedly wound around corresponding one of the teeth 931b. The first coil 37 is concentratedly wound around the outer circumference of the tooth 931b with an insulator interposed therebetween. All the first coils 37 are included in a first coil system. The first coil system according to the first embodiment is supplied with currents and excited by an inverter circuit 251 included in a first power circuit 25A (refer to FIG. 6). The first coil system includes, for example, six of the first coils 37. The six first coils 37 are arranged such that two of the first coils 37 are adjacent to each other in the circumferential direction. Three first coil groups Gr1 each obtained by grouping the adjacent first coils 37 into one group are arranged at regular intervals in the circumferential direction. In other words, the first coil system includes the three first coil groups Gr1 arranged at regular intervals in the circumferential direction. The number of the first coil groups Gr1 need not be three. When n denotes a natural number, 3n of the first coil groups Gr1 only need to be arranged at regular intervals in the circumferential direction. The numeral of n is preferably an odd number.

As illustrated in FIG. 4, each of the second coils 38 is concentratedly wound around corresponding one of the teeth 931b. The second coil 38 is concentratedly wound around the outer circumference of the tooth 931b with an insulator interposed therebetween. The teeth 931b around which the second coils 38 are concentratedly wound are different from the teeth 931b around which the first coils 37 are wound. All the second coils 38 are included in a second coil system. The second coil system is supplied with currents and excited by the inverter circuit 251 included in a second power circuit 25B (refer to FIG. 6). The second coil system includes, for example, six of the second coils 38. The six second coils 38 are arranged such that two of the second coils 38 are adjacent to each other in the circumferential direction. Three second coil groups Gr2 each obtained by grouping the adjacent second coils 38 into one group are arranged at regular intervals in the circumferential direction. In other words, the second coil system includes the three second coil groups Gr2 arranged at regular intervals in the circumferential direction. The number of the second coil groups Gr2 need not be three. When n denotes a natural number, 3n of the second coil groups Gr2 only need to be arranged at regular intervals in the circumferential direction. The numeral of n is preferably an odd number.

As illustrated in FIG. 5, the six first coils 37 include two first U-phase coils 37Ua and 37Ub excited by a first U-phase current I1u, two first V-phase coils 37Va and 37Vb excited by a first V-phase current I1v, and two first W-phase coils 37Wa and 37Wb excited by a first W-phase current I1w. The first U-phase coil 37Ub is connected in series to the first U-phase coil 37Ua. The first V-phase coil 37Vb is connected in series to the first V-phase coil 37Va. The first W-phase coil 37Wb is connected in series to the first W-phase coil 37Wa. All winding directions of the first coils 37 are the same with respect to the teeth 931b. The first U-phase coil 37Ub, the first V-phase coil 37Vb, and the first W-phase coil 37Wb are connected into a star connection (Y connection).

As illustrated in FIG. 5, the six second coils 38 include two second U-phase coils 38Ua and 38Ub excited by a second U-phase current I2u, two second V-phase coils 38Ua and 38Vb excited by a second V-phase current I2v, and two second W-phase coils 38Wa and 38Wb excited by a second W-phase current I2w. The second U-phase coil 38Ub is connected in series to the second U-phase coil 38Ua. The second V-phase coil 38Vb is connected in series to the second V-phase coil 38Va. The second W-phase coil 38Wb is connected in series to the second W-phase coil 38Wa. All winding directions of the second coils 38 are the same with respect to the teeth 931b, and are the same as the winding directions of the first coils 37. The second U-phase coil 38Ub, the second V-phase coil 38Vb, and the second W-phase coil 38Wb are connected into a star connection (Y connection).

As illustrated in FIG. 4, the three first coil groups Gr1 consist of a first UV coil group Gr1UV, a first VW coil group Gr1VW, and a first UW coil group Gr1UW. The first UV coil group Gr1UV includes the first U-phase coil 37Ub and the first V-phase coil 37Va adjacent to each other in the circumferential direction. The first VW coil group Gr1VW includes the first V-phase coil 37Ub and the first W-phase coil 37Wa adjacent to each other in the circumferential direction. The first UW coil group Gr1UW includes the first U-phase coil 37Ua and the first W-phase coil 37Wb adjacent to each other in the circumferential direction.

As illustrated in FIG. 4, the three second coil groups Gr2 consist of a second UV coil group Gr2UV, a second VW coil group Gr2VW, and a second UW coil group Gr2UW. The second UV coil group Gr2UV includes the second U-phase coil 38Ub and the second V-phase coil 38Va adjacent to each other in the circumferential direction. The second VW coil group Gr2VW includes the second V-phase coil 38Vb and the second W-phase coil 38Wa adjacent to each other in the circumferential direction. The second UW coil group Gr2UW includes the second U-phase coil 38Ua and the second W-phase coil 38Wb adjacent to each other in the circumferential direction.

The first coils 37 excited by the first U-phase current I1$u$ face the second coils 38 excited by the second U-phase current I2$u$ in the radial direction of the stator core 931. In the following description, the radial direction of the stator core 931 is simply described as the radial direction. For example, as illustrated in FIG. 4, the first U-phase coil 37Ua faces the second U-phase coil 38Ua, and the first U-phase coil 37Ub faces the second U-phase coil 38Ub, in the radial direction.

The first coils 37 excited by the first V-phase current I1$v$ face the second coils 38 excited by the second V-phase current I2$v$ in the radial direction. For example, as illustrated in FIG. 4, the first V-phase coil 37Ua faces the second V-phase coil 38Va, and the first V-phase coil 37Ub faces the second V-phase coil 38Vb, in the radial direction.

The first coils 37 excited by the first W-phase current I1$w$ face the second coils 38 excited by the second W-phase current I2$w$ in the radial direction. For example, as illustrated in FIG. 4, the first W-phase coil 37Wa faces the second W-phase coil 38Wa, and the first W-phase coil 37Wb faces the second W-phase coil 38Wb, in the radial direction.

Figure 6:
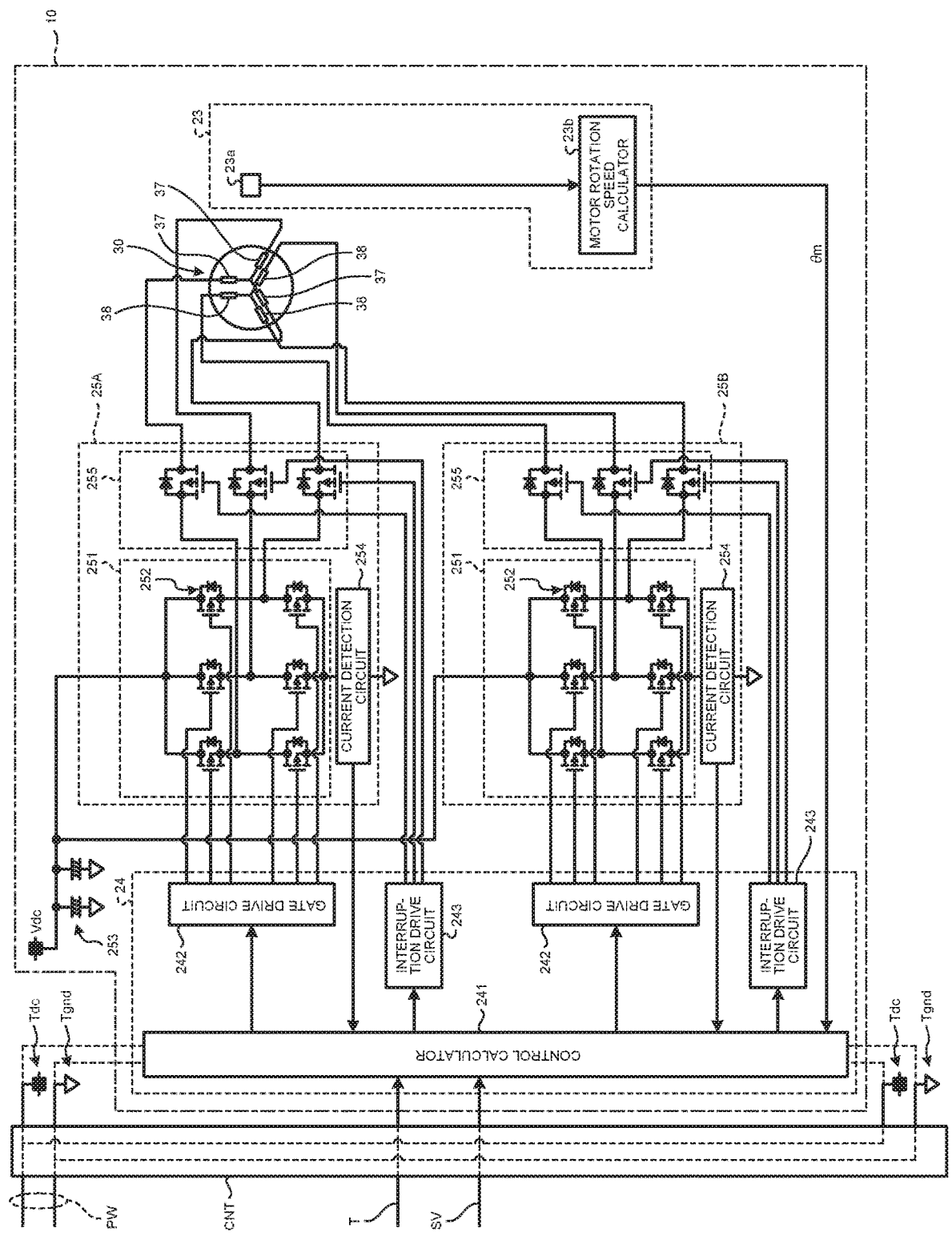
FIG. 6 is a schematic diagram illustrating a relation between the electric motor and the ECU according to the first embodiment.

FIG. 6 is a schematic diagram illustrating a relation between the electric motor and the ECU according to the first embodiment. As illustrated in FIG. 6, the ECU 10 is provided with a detection circuit 23, a control circuit 24, the first power circuit 25A, and the second power circuit 25B. The detection circuit 23 includes the rotation angle sensor 23$a$ and a motor rotation speed calculator 23$b$. The control circuit 24 includes a control calculator 241, a gate drive circuit 242, and an interruption drive circuit 243. The first power circuit 25A includes the inverter circuit 251 and a current interruption circuit 255. The second power circuit 25B includes the inverter circuit 251 and the current interruption circuit 255. The inverter circuit 251 includes a plurality of switching elements 252 and a current detection circuit 254 for detecting current values.

The control calculator 241 calculates a motor current command value. The motor rotation speed calculator 23$b$ calculates a motor electrical angle θm, and outputs the result to the control calculator 241. The gate drive circuit 242 receives the motor current command value output from the control calculator 241. The gate drive circuit 242 controls the first power circuit 25A and the second power circuit 25B based on the motor current command value.

As illustrated in FIG. 6, the ECU 10 is provided with the rotation angle sensor 23$a$. The rotation angle sensor 23$a$ is, for example, a magnetic sensor. A detection value of the rotation angle sensor 23$a$ is supplied to the motor rotation speed calculator 23$b$. The motor rotation speed calculator 23$b$ calculates the motor electrical angle θm based on the detection value of the rotation angle sensor 23$a$, and outputs the result to the control calculator 241.

The control calculator 241 receives the steering torque signal T detected by the torque sensor 94, the vehicle speed SV detected by the vehicle speed sensor 82, and the motor electrical angle θm output from the motor rotation speed calculator 23$b$. The control calculator 241 calculates the motor current command value based on the steering torque signal T, the vehicle speed SV, and the motor electrical angle θm, and outputs the result to the gate drive circuit 242.

The gate drive circuit 242 calculates first pulse width modulation signals based on the current command value, and outputs the results to the inverter circuit 251 of the first power circuit 25A. The inverter circuit 251 switches the switching elements 252 so as to generate three-phase current values according to duty ratios of the first pulse width modulation signals, and thus generates three-phase alternating currents including the first U-phase current I1$u$, the first V-phase current I1$v$, and the first W-phase current I1$w$. The first U-phase current I1$u$ excites the first U-phase coil 37Ua and the first U-phase coil 37Ub. The first V-phase current I1$v$ excites the first V-phase coil 37Ua and the first V-phase coil 37Vb. The first W-phase current I1$w$ excites the first W-phase coil 37Wa and the first W-phase coil 37Wb.

The gate drive circuit 242 calculates second pulse width modulation signals based on the current command value, and outputs the results to the inverter circuit 251 of the second power circuit 25B. The inverter circuit 251 switches the switching elements 252 so as to generate three-phase current values according to duty ratios of the second pulse width modulation signals, and thus generates three-phase alternating currents including the second U-phase current I2$u$, the second V-phase current I2$v$, and the second W-phase current I2$w$. The second U-phase current I2$u$ excites the second U-phase coil 38Ua and the second U-phase coil 38Ub. The second V-phase current I2$v$ excites the second V-phase coil 38Va and the second V-phase coil 38Vb. The second W-phase current I2$w$ excites the second W-phase coil 38Wa and the second W-phase coil 38Wb.

The inverter circuit 251 is a power conversion circuit for converting direct-current power into alternating-current power. As described above, the inverter circuit 251 includes the switching elements 252. The switching elements 252 are, for example, field-effect transistors. Smoothing capacitors 253 are connected in parallel to the inverter circuits 251. The smoothing capacitors 253 are, for example, electrolytic capacitors. A circuit board 20 is provided with two electrolytic capacitors 253A and 253B (refer to FIG. 17F) connected in parallel as the smoothing capacitors 253.

As described above, the inverter circuit 251 includes the current detection circuit 254. The current detection circuit 254 includes, for example, shunt resistors. The current values detected by the current detection circuit 254 are transmitted to the control calculator 241. The current detection circuit 254 may be connected so as to detect the current values of the respective phases of the electric motor 30.

The current interruption circuit 255 is disposed between the inverter circuit 251 and the first coils 37 or the second coils 38. If the current values detected by the current detection circuit 254 are determined to be abnormal, the control calculator 241 can interrupt the currents flowing from the inverter circuit 251 to the first coils 37 by driving the current interruption circuit 255 through the interruption drive circuit 243. The control calculator 241 can also interrupt the currents flowing from the inverter circuit 251 to the second coils 38 by driving the current interruption circuit 255 through the interruption drive circuit 243. In this way, the currents flowing to the first coils 37 and the currents flowing to the second coils 38 are controlled independently of each other by the control calculator 241. Input-output signals, for example, the steering torque signal T and the vehicle speed signal SV, are transmitted to the control calculator 241 through a connector CNT.

Figure 7:
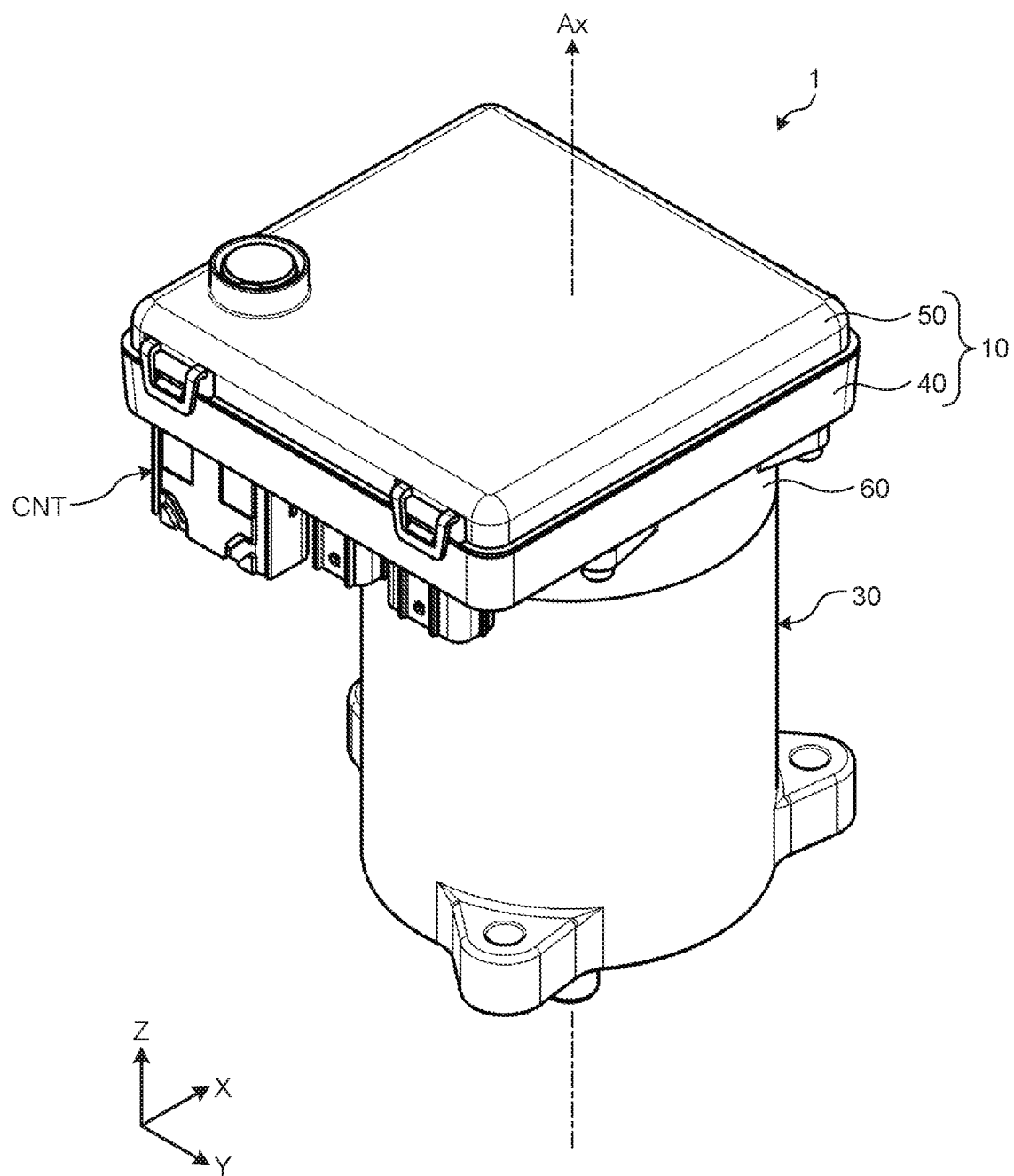
FIG. 7 is a perspective view illustrating a configuration example of an electric drive device according to the first embodiment.
Figure 8:
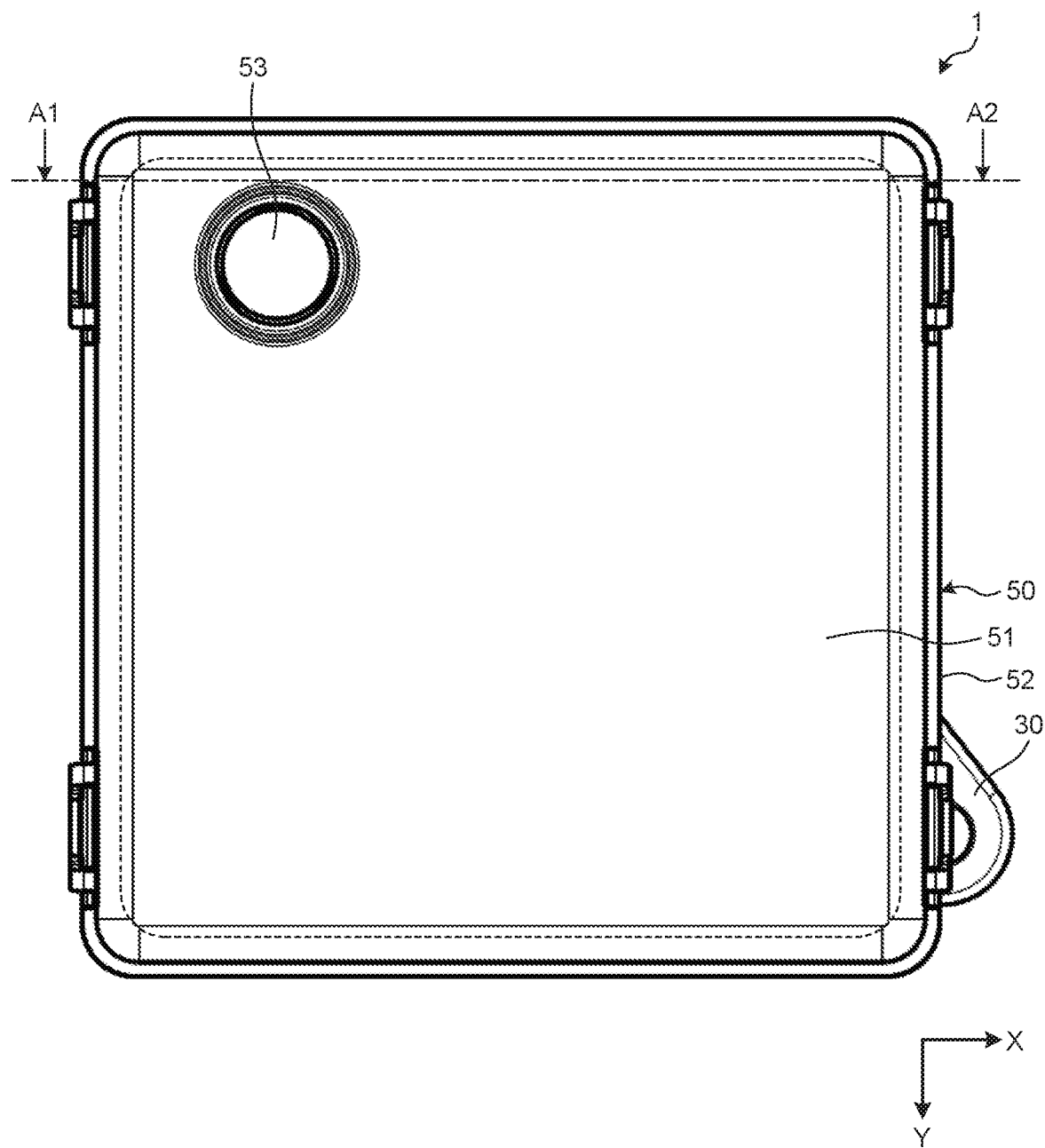
FIG. 8 is a plan view illustrating the configuration example of the electric drive device according to the first embodiment.
Figure 9:
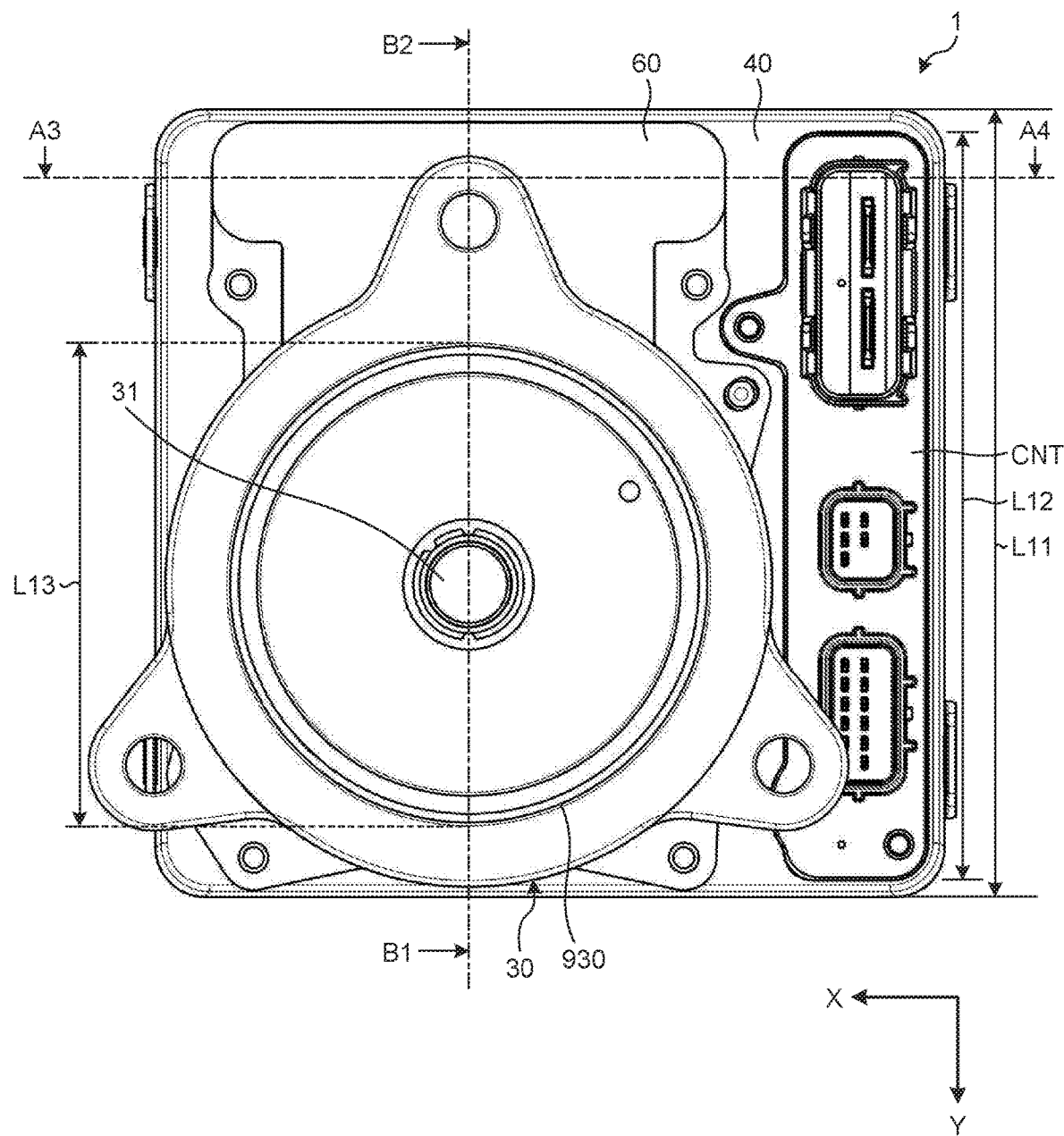
FIG. 9 is a bottom view illustrating the configuration example of the electric drive device according to the first embodiment.
Figure 10:
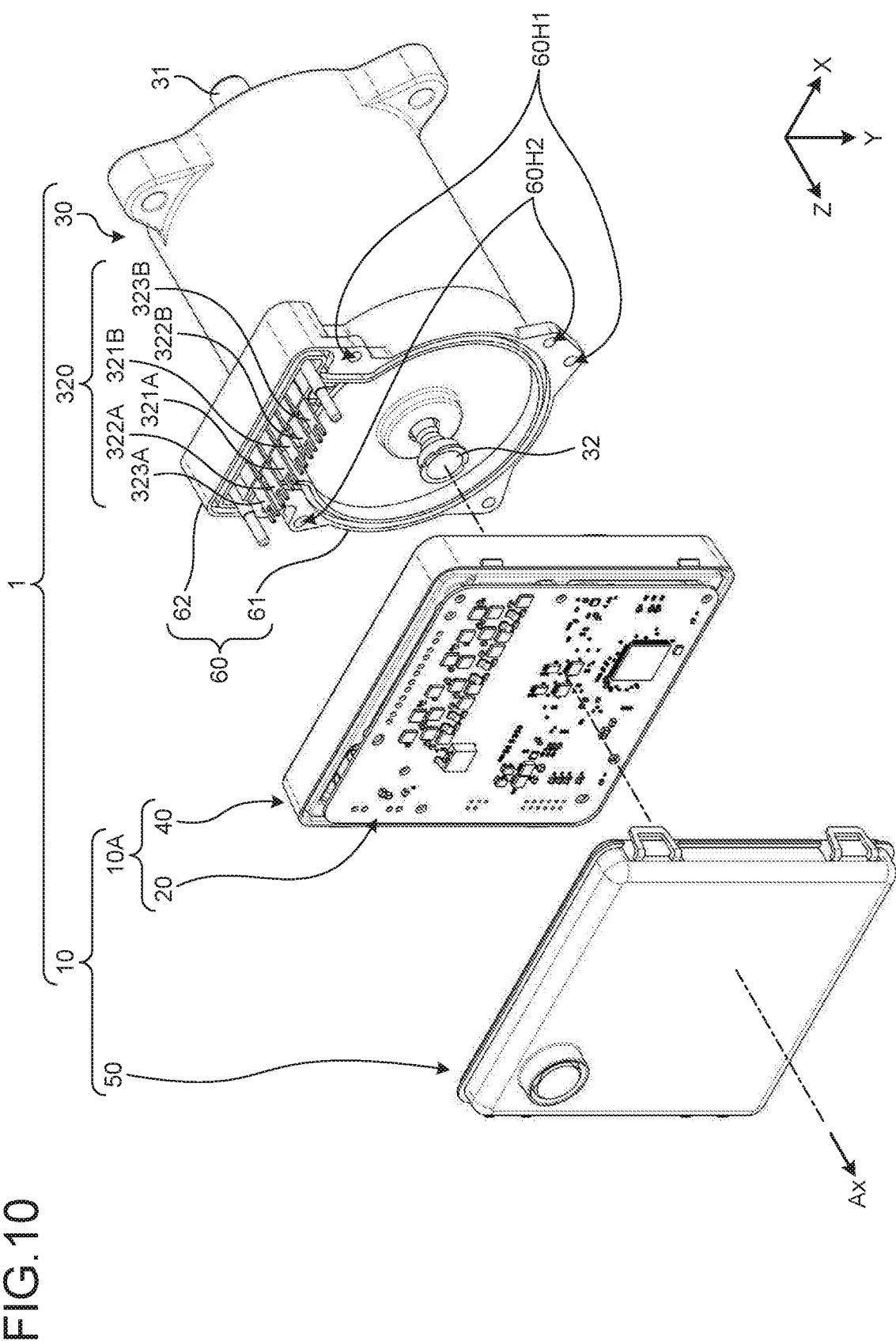
FIG. 10 is an exploded perspective view illustrating the configuration example of the electric drive device according to the first embodiment.
Figure 11:
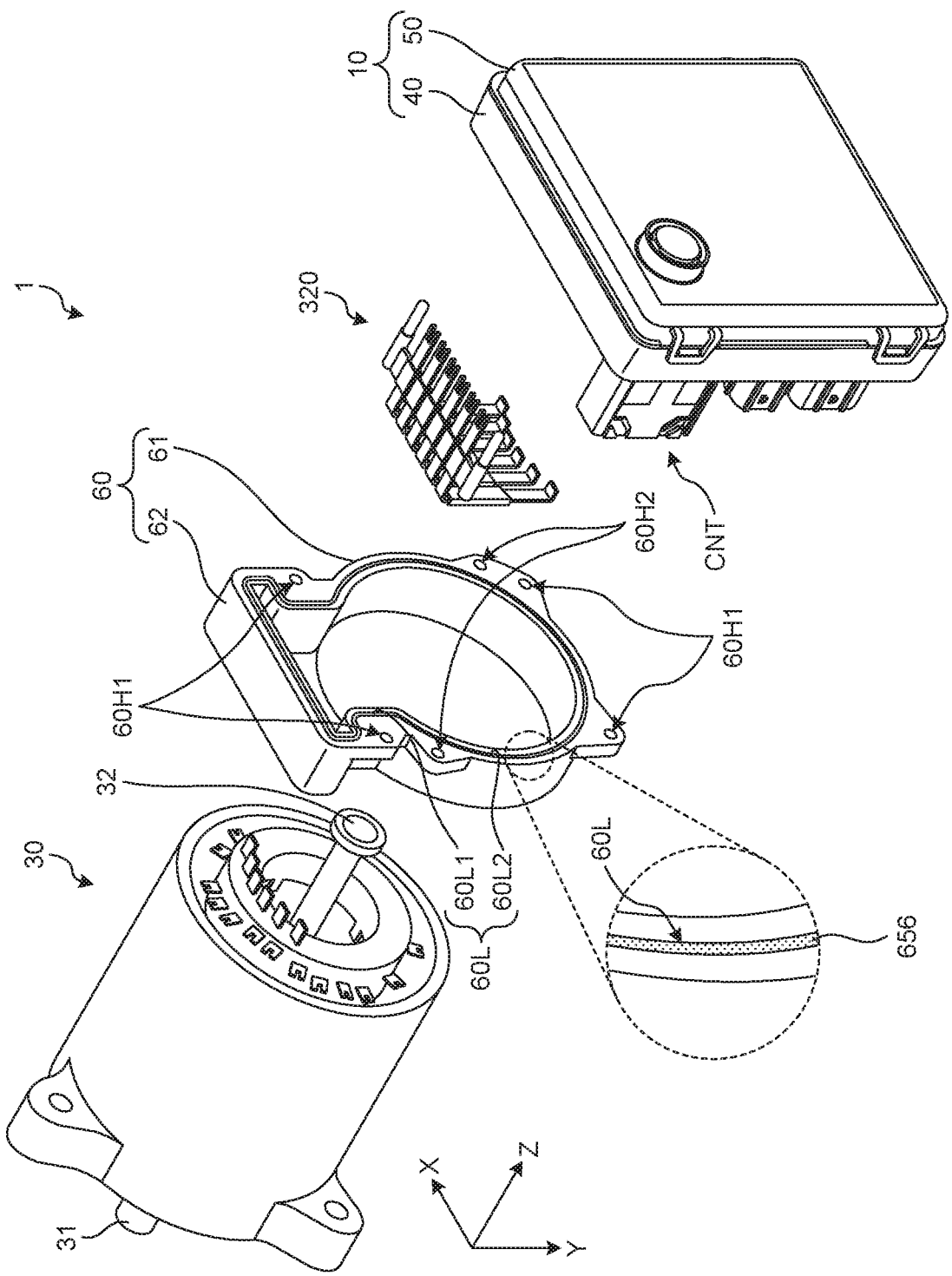
FIG. 11 is another exploded perspective view illustrating the configuration example of the electric drive device according to the first embodiment.
Figure 12:
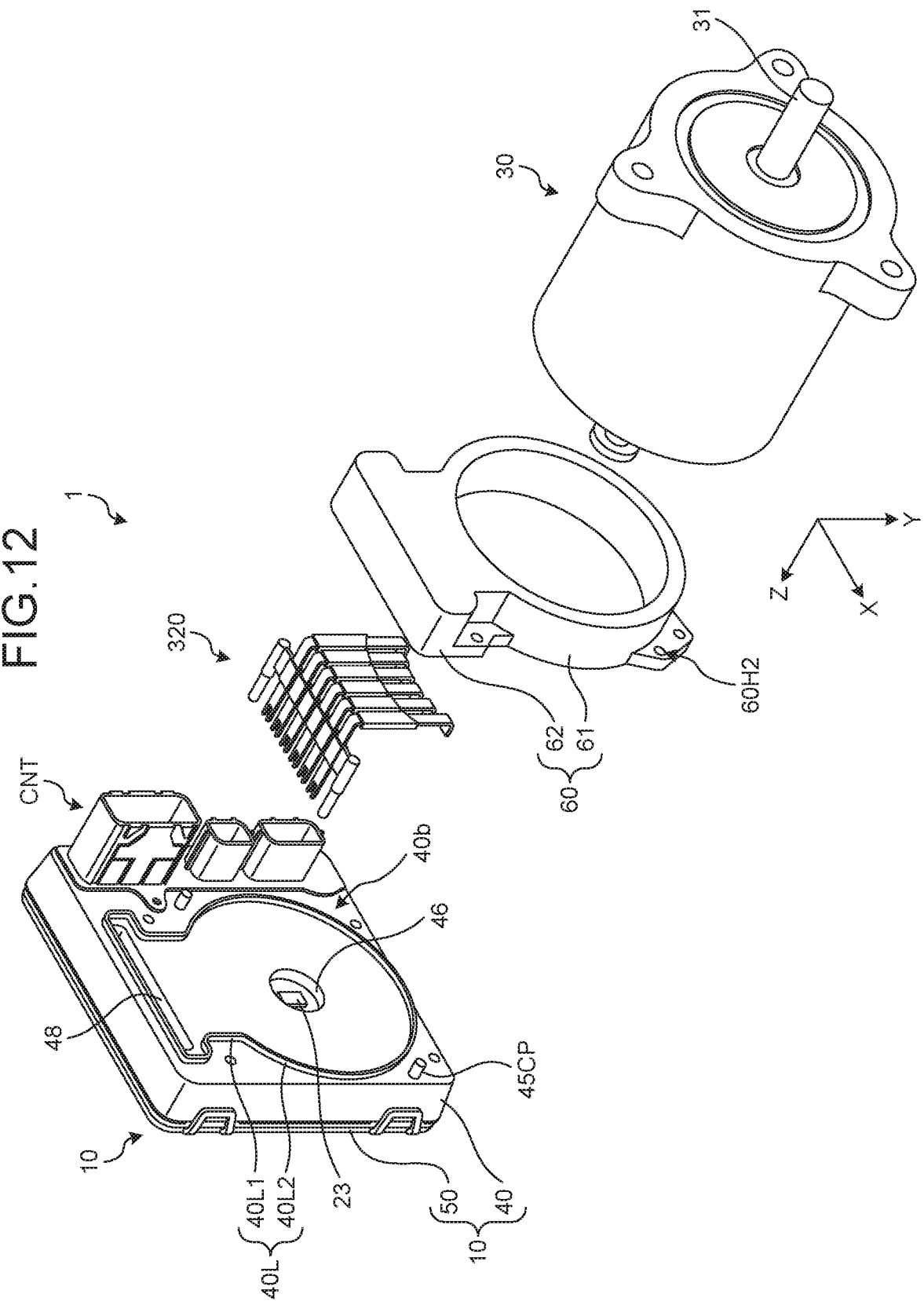
FIG. 12 is still another exploded perspective view illustrating the configuration example of the electric drive device according to the first embodiment.

FIG. 7 is a perspective view illustrating a configuration example of the electric drive device according to the first embodiment. FIG. 8 is a plan view illustrating the configuration example of the electric drive device according to the first embodiment. FIG. 9 is a bottom view illustrating the configuration example of the electric drive device according to the first embodiment. FIGS. 10 to 12 are exploded perspective views each illustrating the configuration example of the electric drive device according to the first embodiment. As illustrated in FIGS. 7 to 12, the electric drive device 1 is provided with the electric motor 30, the ECU 10 disposed on the anti-load side of the electric motor 30, and the adapter 60 disposed between the ECU 10 and the electric motor 30. The electric motor 30 is provided with the housing 930. The housing 930 has a tubular shape, and accommodates therein the rotor 932 (refer to FIG. 4), the stator including the first coil groups Gr1 and the second coil groups Gr2 (refer to FIG. 4), and the shaft 31. A magnet 32 is mounted at the anti-load side end of the shaft 31.

The adapter 60 includes a circular ring portion 61 and a projecting portion 62 projecting from the circular ring portion 61 in a direction intersecting an axial direction Ax of the shaft 31. The circular ring portion 61 and the projecting portion 62 are integrally formed. The adapter 60 is provided with insert holes 60H1 through which bolts for fastening the adapter 60 to a heat sink 40 are inserted. For example, four insert holes 60H1 are provided. The adapter 60 is also provided with insert holes 60H2 in which pins 45CP provided on the heat sink 40 are inserted. For example, two insert holes 60H2 are provided. The pins 45CP are each inserted through a corresponding one of the two insert holes 60H2, by which the adapter 60 is positioned with respect to the heat sink 40.

A depressed portion 60L is provided on a surface of the adapter 60 facing the heat sink 40. When viewed from a Z-axis direction, the depressed portion 60L has a shape of a ring formed of linear portions 60L1 and a curved portion 60L2. The ring formed by the depressed portion 60L has a non-angular smooth shape. The adapter 60 is made of a high heat dissipation metal, such as aluminum or copper. As a result, the adapter 60 can assist the heat sink 40 to dissipate heat, and can efficiently dissipate heat generated by the electric motor 30 to the outside. In the first embodiment, the adapter 60 is not limited to being made of a metal, and may be made of a resin.

Figure 13:
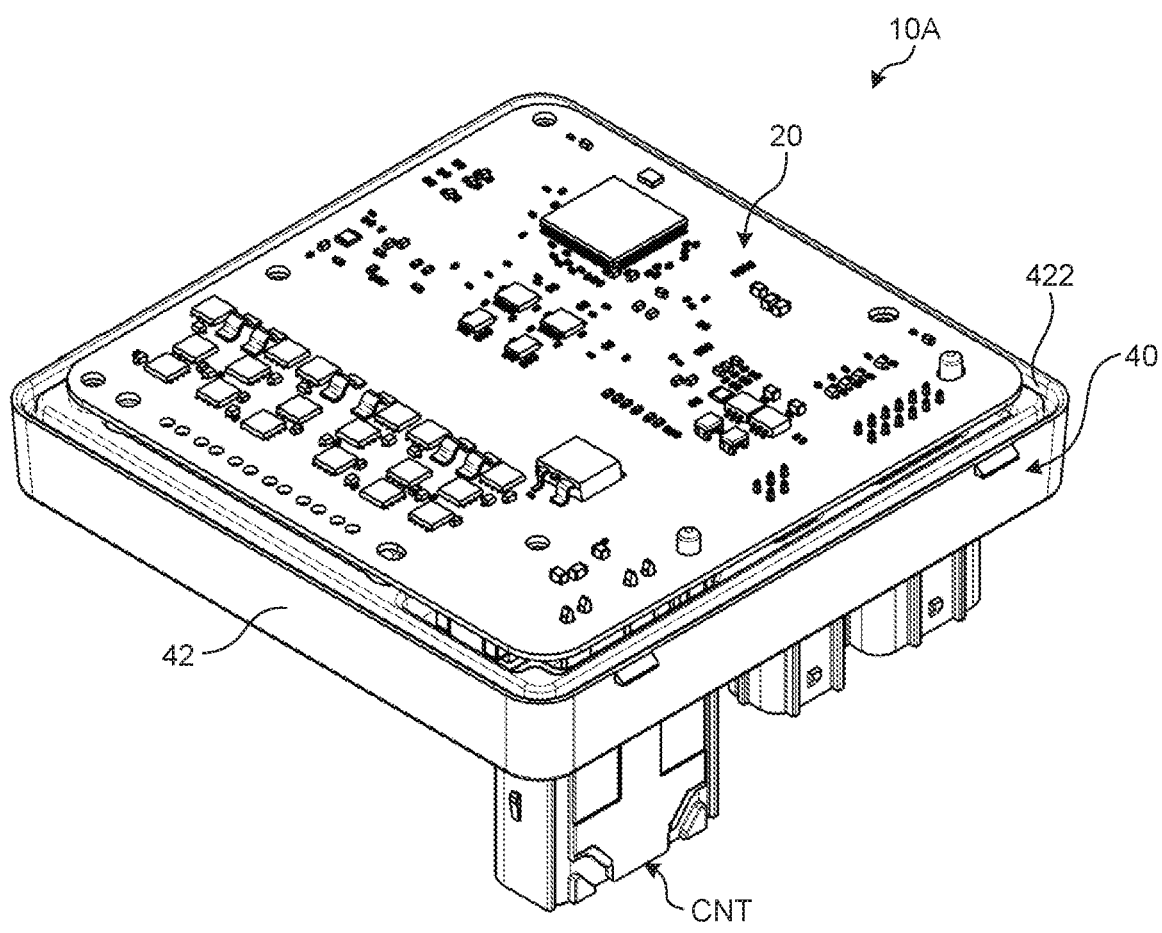
FIG. 13 is a perspective view illustrating a configuration example of an ECU body according to the first embodiment.
Figure 14:
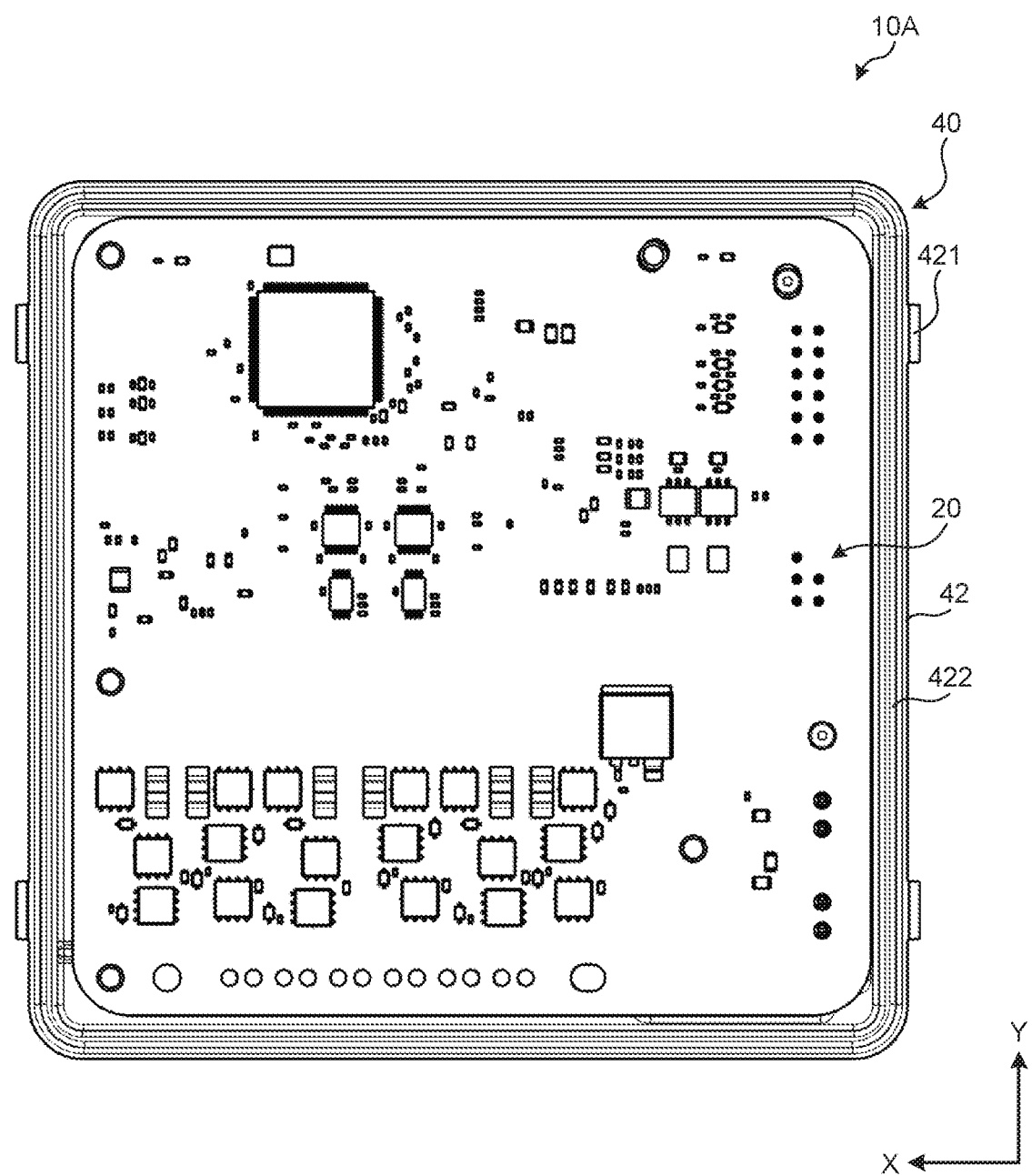
FIG. 14 is a plan view illustrating the configuration example of the ECU body according to the first embodiment.
Figure 15:
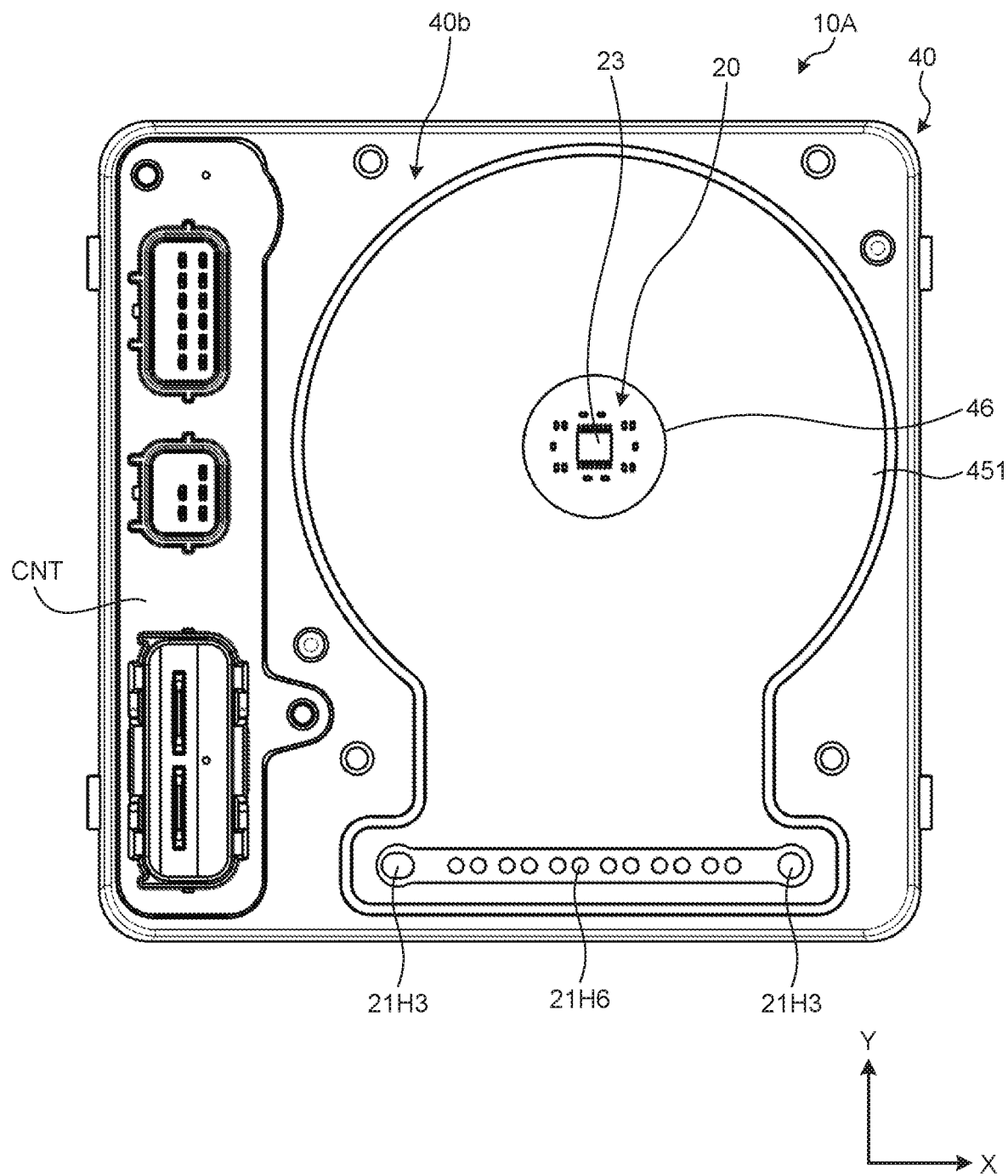
FIG. 15 is a bottom view illustrating the configuration example of the ECU body according to the first embodiment.
Figure 16:
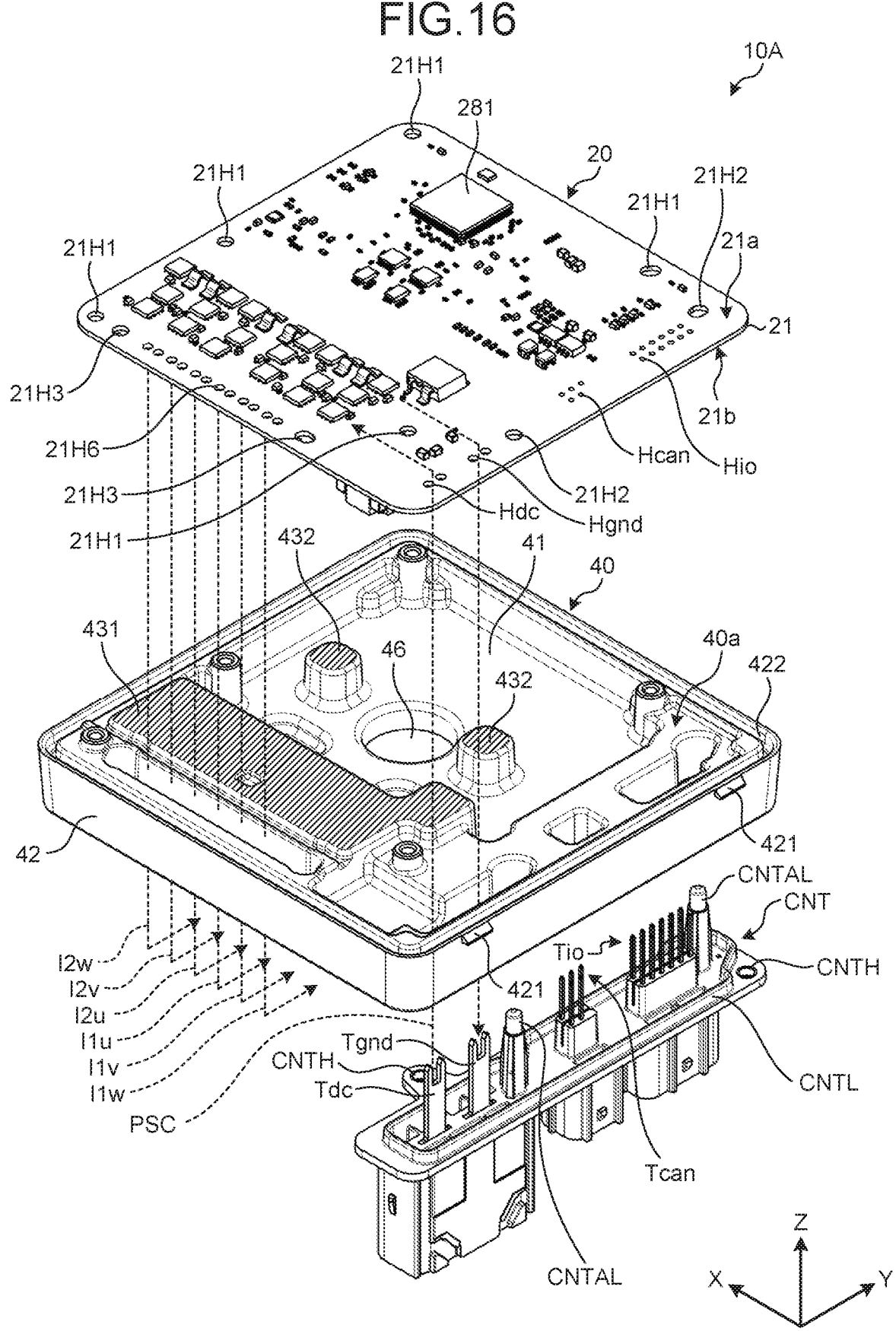
FIG. 16 is an exploded perspective view illustrating the configuration example of the ECU body according to the first embodiment.

FIG. 13 is a perspective view illustrating a configuration example of an ECU body according to the first embodiment. FIG. 14 is a plan view illustrating the configuration example of the ECU body according to the first embodiment. FIG. 15 is a bottom view illustrating the configuration example of the ECU body according to the first embodiment. FIG. 16 is an exploded perspective view illustrating the configuration example of the ECU body according to the first embodiment. Dotted lines in FIG. 16 represent current paths from power supply terminals Tdc and Tgnd through an ECU body 10A to the electric motor 30 (refer to FIG. 10). As illustrated in FIGS. 13 to 16, the ECU 10 is provided with the ECU body 10A and a lid 50 (refer to FIG. 7). The ECU body 10A includes the circuit board 20, the heat sink 40 that supports the circuit board 20, and the connector CNT. The circuit board 20 and the connector CNT are mounted on the heat sink 40. The connector CNT is connected to the circuit board 20 from outside the heat sink 40. When viewed from the Z-axis direction, the connector CNT is disposed outside the electric motor 30.

The circuit board 20 includes a board body 21 and a plurality of electronic components mounted on the board body 21. The board body 21 is, for example, a printed-circuit board made of a resin or other materials. The electronic components mounted on one sheet of the board body 21 includes, for example, a central processing unit (CPU), application-specific integrated circuits (ASICs), field-effect transistors (FETs), a magnetic sensor, electrolytic capacitors, resistive elements, diodes, and a thermistor. These electronic components constitute the detection circuit 23, the control circuit 24, the first power circuit 25A, and the second power circuit 25B illustrated in FIG. 6.

As illustrated in FIG. 16, the connector CNT includes the power supply terminals Tdc and Tgnd, a CAN terminal Tcan for performing the CAN communication, and an input-output terminal Tio for receiving and outputting data using a method other than the CAN communication. The power supply terminal Tdc is a metal terminal for supplying a power supply voltage Vdc of the power supply device 83 (refer to FIG. 2). The power supply terminal Tgnd is a metal terminal for supplying a negative power supply voltage of the power supply device 83 (for example, a reference voltage such as a ground voltage). Power wiring PW (refer to FIG. 2) for transmitting the power from the power supply device 83 is connected to the first and second power circuits 25A and 25B through the power supply terminals Tdc and Tgnd, respectively. Each of the CAN terminal Tcan and the input-output terminal Tio is a metal terminal. Signal transmission wiring for transmitting the input-output signals, for example, the steering torque signal T and the vehicle speed signal SV, is connected to the control calculator 241 of the control circuit 24 (refer to FIG. 6) through the CAN terminal Tcan and the input-output terminal Tio. The connector CNT is provided with insert holes CNTH through which bolts for fastening the connector CNT to the heat sink 40 are inserted. A projecting portion CNTL is provided on a surface of the connector CNT facing the heat sink 40. When viewed from the Z-axis direction, the projecting portion CNTL surrounds the power supply terminals Tdc and Tgnd, the CAN terminal Tcan, and the input-output terminal Tio.

As illustrated in FIG. 9, in a plan view from the Z-axis direction, the connector CNT is disposed such that a longitudinal direction thereof corresponds to a Y-direction. In the plan view from the Z-axis direction, the planar shape of the housing 930 included in the electric motor 30 is a perfect circle. In the Y-direction, L11 denotes the length of the heat sink 40, and L12 denotes the length of the connector CNT. L13 denotes the diameter of the housing 930. As illustrated in FIG. 9, the length L12 of the connector CNT is larger than the diameter L13 of the housing 930. The length L11 of the heat sink 40 is larger than the length L12 of the connector CNT. The relation of the lengths is such that L11>L12>L13.

Figure 17A:
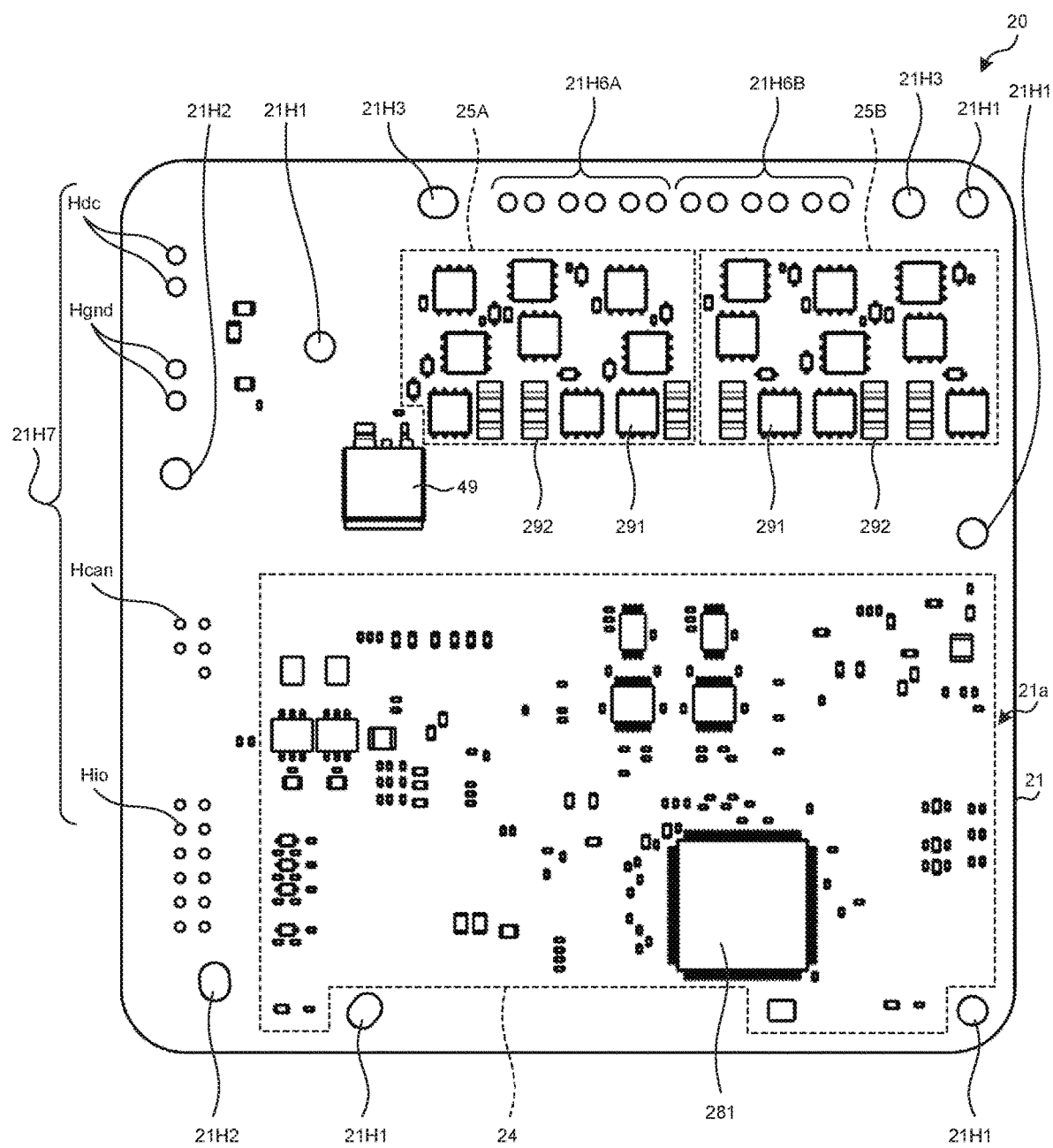
FIG. 17A is a front view illustrating a configuration example of a circuit board according to the first embodiment.
Figure 17B:
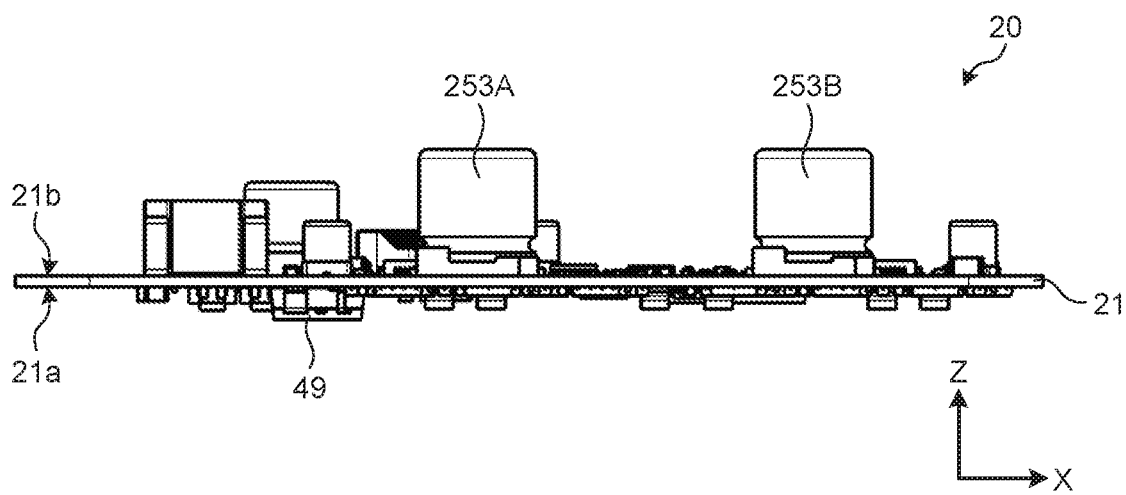
FIG. 17B is a plan view illustrating the configuration example of the circuit board according to the first embodiment.
Figure 17C:
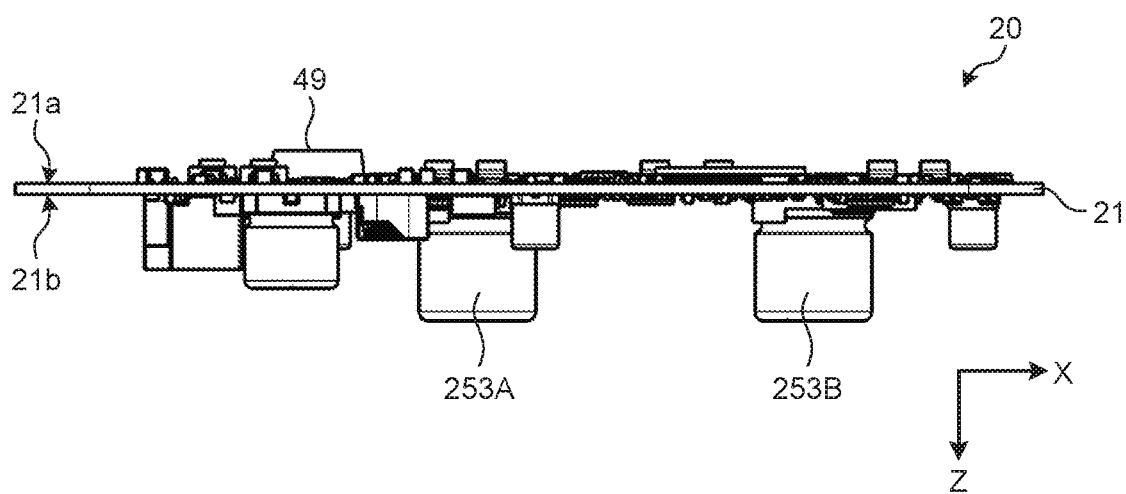
FIG. 17C is a bottom view illustrating the configuration example of the circuit board according to the first embodiment.
Figure 17D:
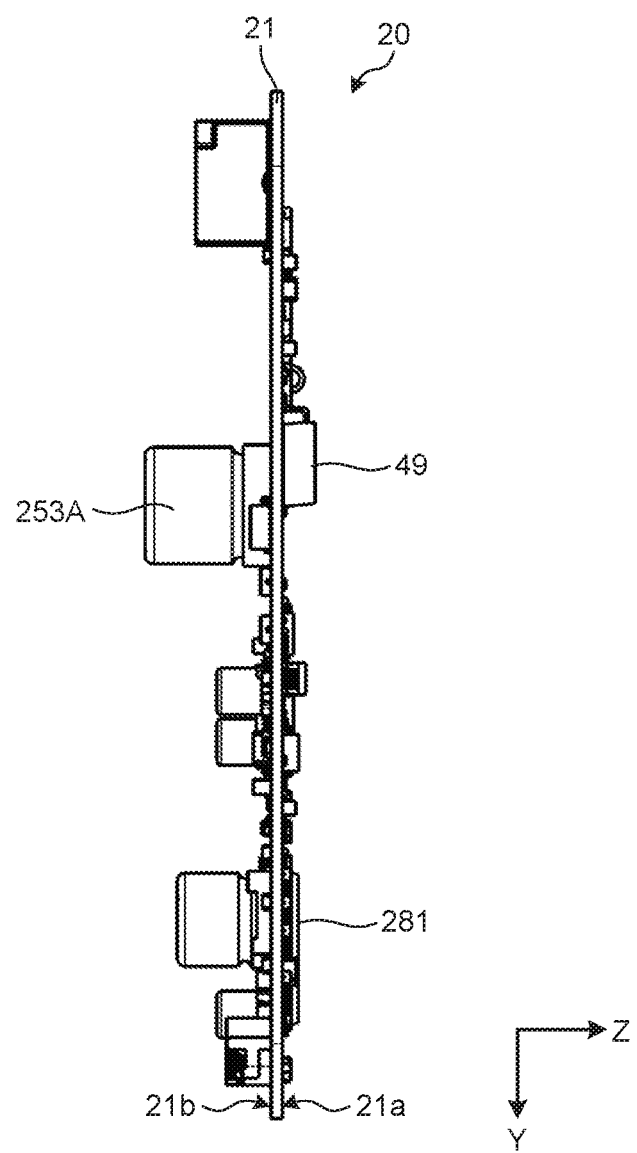
FIG. 17D is a left side view illustrating the configuration example of the circuit board according to the first embodiment.
Figure 17E:
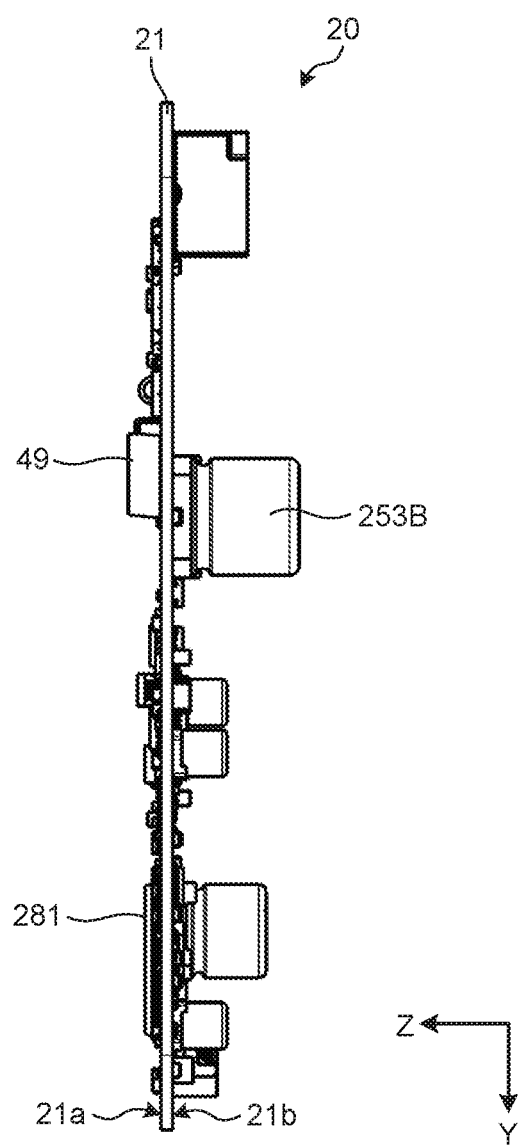
FIG. 17E is a right side view illustrating the configuration example of the circuit board according to the first embodiment.
Figure 17F:
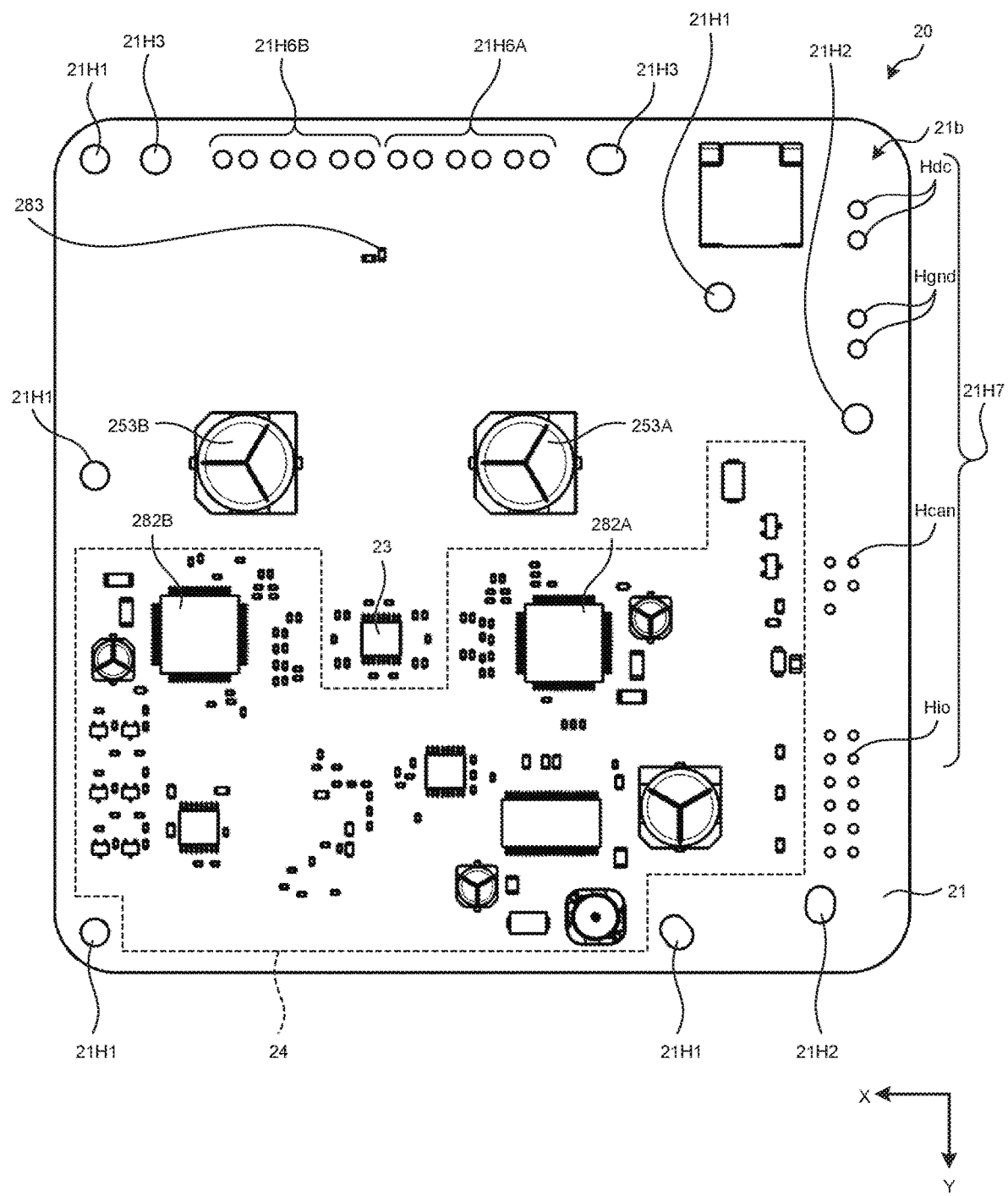
FIG. 17F is a rear view illustrating the configuration example of the circuit board according to the first embodiment.

FIG. 17A is a front view illustrating a configuration example of the circuit board according to the first embodiment. FIG. 17B is a plan view illustrating the configuration example of the circuit board according to the first embodiment. FIG. 17C is a bottom view illustrating the configuration example of the circuit board according to the first embodiment. FIG. 17D is a left side view illustrating the configuration example of the circuit board according to the first embodiment. FIG. 17E is a right side view illustrating the configuration example of the circuit board according to the first embodiment. FIG. 17F is a rear view illustrating the configuration example of the circuit board according to the first embodiment.

As illustrated in FIGS. 17A to 17F, the board body 21 has a first surface 21a and a second surface 21b located on the opposite side of the first surface 21a. The detection circuit 23, the control circuit 24, the first power circuit 25A, and the second power circuit 25B are each constituted by one or more electronic components mounted on the first surface 21a or the second surface 21b. For example, as illustrated in FIG. 17F, the detection circuit 23 is constituted by one electronic component mounted on the second surface 21b of the board body 21.

As illustrated in FIGS. 17A and 17F, the control circuit 24 is constituted by a plurality of electronic components mounted on the first surface 21a and the second surface 21b of the board body 21. For example, the control calculator 241 included in the control circuit 24 (refer to FIG. 6) is constituted by an electronic component 281 mounted on the first surface 21a. The electronic component 281 is the CPU. The gate drive circuit 242 included in the control circuit 24 (refer to FIG. 6) is constituted by electronic components 282A and 282B mounted on the second surface 21b. The electronic components 282A and 282B are the ASICs.

As illustrated in FIG. 17A, the first power circuit 25A is constituted by a plurality of electronic components mounted on the first surface 21a of the board body 21. For example, the inverter circuit 251 included in the first power circuit 25A (refer to FIG. 6) is constituted by six electronic components 291 serving as the switching elements 252 (refer to FIG. 6) and three electronic components 292 serving as the current detection circuit 254 (refer to FIG. 6). The electronic components 291 are the FETs. The electronic components 292 are the resistive elements (shunt resistors). The current interruption circuit 255 included in the first power circuit 25A (refer to FIG. 6) is constituted by three of the electronic components 291.

In the same way as the first power circuit 25A, the second power circuit 25B are also constituted by a plurality of electronic components mounted on the first surface 21a of the board body 21. For example, the inverter circuit 251 included in the second power circuit 25B is constituted by six electronic components 291 serving as the switching elements 252 and three electronic components 292 serving as the current detection circuit 254. The current interruption circuit 255 included in the second power circuit 25B is constituted by three of the electronic components 291.

As illustrated in FIGS. 17A to 17E, the circuit board 20 includes a choke coil 49 mounted on the first surface 21a of the board body 21. The choke coil 49 removes a high-frequency component in the power wiring PW from the power supply device 83 described above. As illustrated in FIGS. 17B to 17F, the circuit board 20 includes the electrolytic capacitors 253A and 253B mounted on the second surface 21b of the board body 21.

As illustrated in FIGS. 16, 17A, and 17F, the board body 21 is provided with a plurality of through-holes 21H1, 21H2, 21H3, 21H6, and 21H7 penetrating between the first surface 21a and the second surface 21b. The through-holes 21H6 include first through-holes 21H6A and second through-holes 21H6B. The through-holes 21H7 include through-holes Hdc, Hgnd, Hcan, and Hio. Screws for fastening the circuit board 20 to the heat sink 40 are inserted in the through-holes 21H1. Rod-like connection members CNTAL are inserted in the through-holes 21H2 to position the connector CNT with respect to the circuit board 20. Rod-like connection members 66AL (refer to FIG. 24) are inserted in the through-holes 21H3 to position first coil wiring 321A, 322A, and 323A and second coil wiring 321B, 322B, and 323B (refer to FIG. 25) with respect to the circuit board 20. The first coil wiring 321A, 322A, and 323A (refer to FIG. 25) are inserted in the first through-holes 21H6A. The second coil wiring 321B, 322B, and 323B (refer to FIG. 25) are inserted in the second through-holes 21H6B.

The power supply terminal Tdc is inserted in the through-holes Hdc. The power supply terminal Tgnd is inserted in the through-holes Hgnd. The CAN terminal Tcan is inserted in the through-holes Hcan. The input-output terminal Tio is inserted in the through-holes Hio.

The heat sink 40 supports the circuit board 20. The circuit board 20 is fastened to one surface (first surface) 40a side of the heat sink 40. The heat sink 40 is made of a high heat dissipation metal, such as aluminum or copper, and efficiently dissipates heat generated by the circuit board 20 to the outside.

Figure 18:
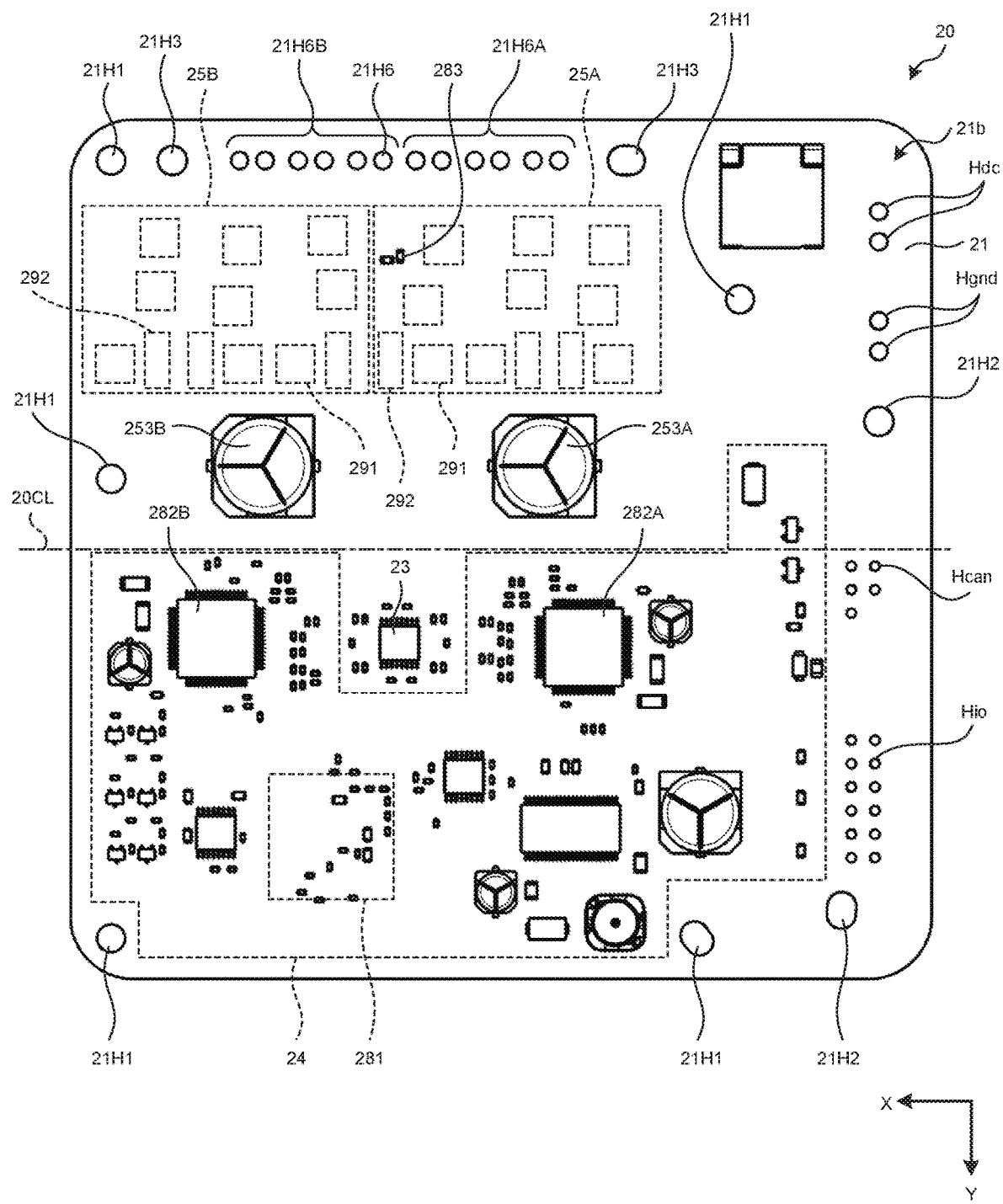
FIG. 18 is a perspective view illustrating electronic components mounted on a first surface side of the circuit board according to the first embodiment, when viewed from a second surface side thereof.

FIG. 18 is a perspective view illustrating the electronic components mounted on the first surface side of the circuit board according to the first embodiment, when viewed from the second surface side thereof. On the circuit board 20 according to the first embodiment, the detection circuit 23, the control circuit 24, the first power circuit 25A, the second power circuit 25B, and the electrolytic capacitors 253A and 253B have, for example, the following positional interrelations. As illustrated in FIG. 18, when viewed from a normal direction (for example, the Z-direction) of the circuit board 20, arrangement positions of the electronic components 291 and 292 included in the first power circuit 25A are between an arrangement position of the detection circuit 23 and the first through-holes 21H6A. In the same way, when viewed from the Z-axis direction, arrangement positions of the electronic components 291 and 292 included in the second power circuit 25B are between the arrangement position of the detection circuit 23 and the second through-holes 21H6B.

When viewed from the Z-axis direction, an arrangement position of the electronic component 282A included in the control circuit 24 is on the opposite side of the first through-holes 21H6A across the arrangement positions of the electronic components 291 and 292 included in the first power circuit 25A. In the same way, when viewed from the Z-axis direction, an arrangement position of the electronic component 282B included in the control circuit 24 is on the opposite side of the second through-holes 21H6B across the arrangement positions of the electronic components 291 and 292 included in the second power circuit 25B.

When viewed from the Z-axis direction, the arrangement position of the detection circuit 23 is on the opposite side of the arrangement positions of the electronic components 291 and 292 included in the first power circuit 25A or the second power circuit 25B across an arrangement position of the electrolytic capacitor 253A or 253B. When viewed from the Z-axis direction, the arrangement position of the detection circuit on the opposite side of the arrangement positions of the electronic components 291 and 292 included in the first power circuit 25A or the second power circuit 25B across a straight line 20CL passing through the center of the circuit board 20.

The first through-holes 21H6A and the second through-holes 21H6B are provided on one side of the circuit board 20 divided by the straight line 20CL passing through the center of the circuit board 20. With this configuration, second portions WP2 of the first coil wiring 321A, 322A, and 323A (refer to FIG. 25 to be explained later) and the second portions WP2 of the second coil wiring 321B, 322B, and 323B (refer to FIG. 25 to be explained later) are disposed on only one side of the circuit board 20 divided by the straight line 20CL passing through the center of the circuit board 20.

Figure 19:
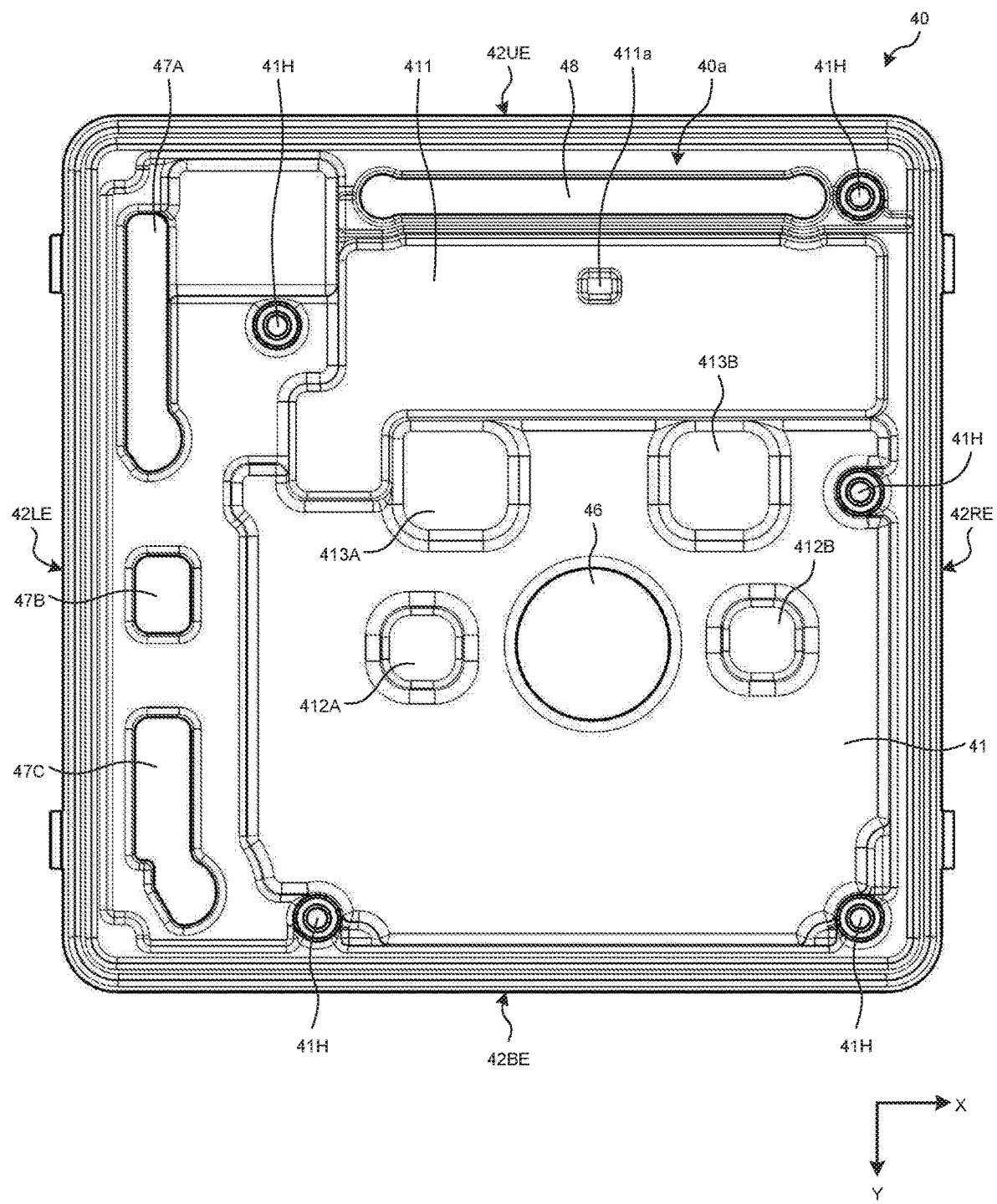
FIG. 19 is a front view illustrating a configuration example of a heat sink according to the first embodiment.
Figure 20:
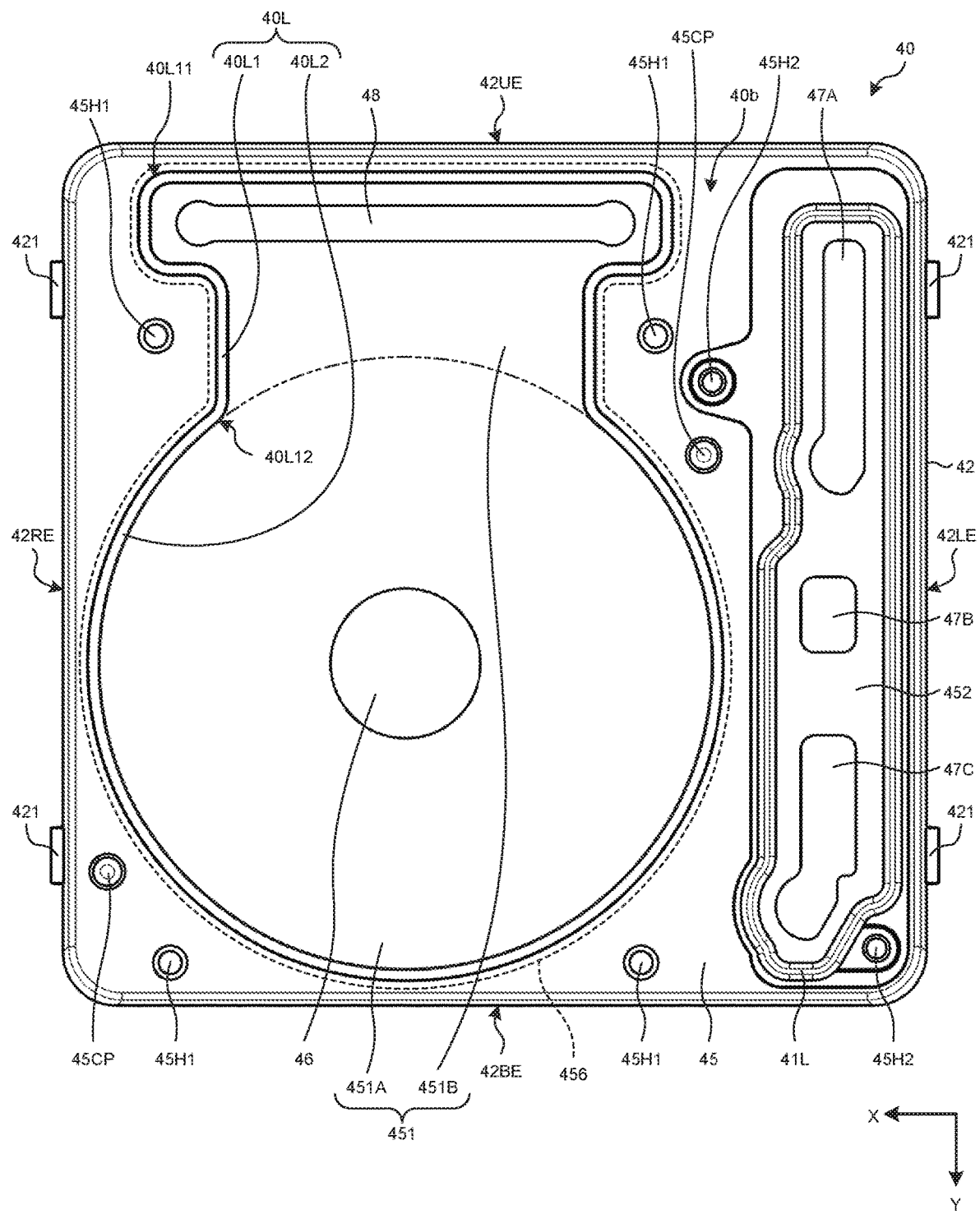
FIG. 20 is a rear view illustrating the configuration example of the heat sink according to the first embodiment.

FIG. 19 is a front view illustrating a configuration example of the heat sink according to the first embodiment. FIG. 20 is a rear view illustrating the configuration example of the heat sink according to the first embodiment. As illustrated in FIGS. 16 to 20, the shape in the plan view (hereinafter called the planar shape) of the heat sink 40 is substantially rectangular. The heat sink 40 has the first surface 40a and a second surface 40b located on the opposite side of the first surface 40a. The heat sink 40 has a first raised portion 411 and second raised portions 412A and 412B that are provided at a bottom portion 41 of the first surface 40a. The first raised portion 411 is provided in a position overlapping the first power circuit 25A or the second power circuit 25B (refer to FIG. 17A) in the Z-axis direction. For example, the electronic components 291 and 292 included in the first power circuit 25A or the second power circuit 25B are mounted on the first surface 21a of the board body 21 (refer to FIG. 17A). The first raised portion 411 is provided on the opposite side of the electronic components 291 and 292 included in the first power circuit 25A or the second power circuit 25B across the board body 21 (refer to FIG. 17A). The first raised portion 411 includes a depressed portion 411a for accommodating a thermistor 283 mounted on the second surface 21b of the board body 21 (refer to FIG. 17F). Once the circuit board 20 is mounted on the heat sink 40, the thermistor 283 is accommodated in the depressed portion 411a.

The second raised portion 412A is provided in a position facing the electronic component 282A constituting the gate drive circuit 242 (FIG. 17F). The second raised portion 412B is provided in a position facing the electronic component 282B constituting the gate drive circuit 242 (refer to FIG. 17F).

As illustrated in FIGS. 16 and 19, a first heat dissipation material 431 is provided on a surface at the first raised portion 411 facing the circuit board 20. Second heat dissipation materials 432 are provided on surfaces at the second raised portions 412A and 412B facing the circuit board 20. The first heat dissipation material 431 and the second heat dissipation materials 432 are, for example, a material that is obtained by mixing a silicone polymer with a thermally conductive filler, and that is also called thermal interface material (TIM) or thermal grease.

The respective surfaces of the first raised portion 411 and the second raised portions 412A and 412B facing the circuit board 20 are applied with the TIM. The first raised portion 411 and the second raised portions 412A and 412B are in contact with the circuit board 20 through the TIM. With this configuration, the ECU 10 can effectively dissipate heat generated in the first power circuit 25A, the second power circuit 25B, or the gate drive circuit 242 to the heat sink 40 through the TIM. The first raised portion 411 and the second raised portions 412A and 412B are spaced apart from the electronic components including the detection circuit 23. This prevents the TIM from coming in contact with the electronic components including the detection circuit 23 even when the applied TIM has been spread by being pressed between the first raised portion 411 and the second raised portions 412A and 412B, and the circuit board 20.

The heat sink 40 has depressed portions 413A and 413B provided at the bottom portion 41 of the first surface 40a. The depressed portion 413A is provided in a position facing the electrolytic capacitor 253A (refer to FIG. 17F). The depressed portion 413B is provided in a position facing the electrolytic capacitor 253B (refer to FIG. 17F). Once the circuit board 20 is mounted on the heat sink 40, the electrolytic capacitor 253A is disposed in the depressed portion 413A, and the electrolytic capacitor 253B is disposed in the depressed portion 413B.

The heat sink 40 has a plurality of screw holes 41H provided in the first surface 40a. Screws for fastening the circuit board 20 (refer to FIG. 16) to the heat sink 40 are inserted in the respective screw holes 41H. An inner circumferential surface of each of the screw holes 41H is provided with a screw thread.

The heat sink 40 has a through-hole 46 for allowing passage of the shaft 31 of the electric motor 30 (refer to FIG. 10). The through-hole 46 is provided in a position facing the electronic components including the detection circuit 23. The second raised portion 412A is disposed on one side of the through-hole 46, and the second raised portion 412B is disposed on the other side of the through-hole 46.

The heat sink 40 has through-holes 47A, 47B, and 47C. The power supply terminals Tdc and Tgnd (refer to FIG. 16) are inserted in the through-hole 47A. The CAN terminal Tcan (refer to FIG. 16) is inserted in the through-hole 47B. The input-output terminal Tio (refer to FIG. 16) is inserted in the through-hole 47C. The heat sink 40 also has a through-hole 48. The first coil wiring 321A, 322A, and 323A and the second coil wiring 321B, 322B, and 323B (refer to FIG. 10) are inserted in the through-hole 48.

As illustrated in FIG. 20, the heat sink 40 has a projecting portion 40L provided at a bottom portion 45 of the second surface 40b. The shape and size of the projecting portion 40L correspond to those of the depressed portion 60L of the adapter 60 (refer to FIG. 11). Specifically, when viewed from the Z-axis direction, the projecting portion 40L has the shape of a ring formed of linear portions 40L1 and a curved portion 40L2. A connection portion 40L12 between the linear portion 40L1 and the curved portion 40L2 curves. A connection portion 40L11 between the linear portions 40L1 also curves. As a result, the ring formed by the projecting portion 40L has a non-angular, gradual shape. The adapter 60 is accurately positioned with respect to the heat sink 40 by the projecting portion 40L being fitted in the depressed portion 60L.

An inner area 451 surrounded by the projecting portion 40L is provided in a position facing the adapter 60 (refer to FIG. 10). The adapter 60 is disposed between the heat sink 40 and the electric motor 30. The planar shape of the inner area 451 substantially matches with the planar shape of a mounted surface of the adapter 60. The size in the plan view of the inner area 451 is slightly larger than the size in the plan view of a mounted surface of the adapter 60. The inner area 451 includes a circular first inner area 451A and a second inner area 451B connected to a rim of the first inner area 451A. When viewed from the Z-axis direction, the first inner area 451A is located in a position overlapping the electric motor 30, and the second inner area 451B is located outside the electric motor 30.

An O-ring 456 may be disposed along the projecting portion 40L at an outer circumferential portion of the projecting portion 40L. As described above, since the ring formed by the projecting portion 40L has a gradual shape, the O-ring 456 can be disposed tightly in contact with a side surface of the projecting portion 40L. A first adhesive 656 (refer to FIG. 11) is disposed on the depressed portion 60L of the adapter 60 in a position corresponding to the projecting portion 40L. Disposing the O-ring 456 and the first adhesive 656 at the periphery of the projecting portion 40L can increase the tightness of contact between the heat sink 40 and the adapter 60, and can increase the tightness of sealing of the inner area 451.

The heat sink 40 has a depressed portion 41L provided at the bottom portion 45 of the second surface 40b. The shape and size of the depressed portion 41L correspond to those of the projecting portion CNTL of the connector CNT (refer to FIG. 16). The connector CNT is mounted on the heat sink 40 by the projecting portion CNTL being fitted in the depressed portion 41L. Although not illustrated, an O-ring may be disposed at an outer circumferential portion of the depressed portion 41L. An adhesive may be disposed on the depressed portion 41L. These dispositions can increase the tightness of contact between the heat sink 40 and the connector CNT, and can increase the tightness of sealing of an inner area 452 surrounded by the depressed portion 41L.

The heat sink 40 has a plurality of screw holes 45H1 and a plurality of screw holes 45H2 provided in the second surface 40b. Screws for fastening the adapter 60 to the heat sink 40 are inserted in the respective screw holes 45H1. Screws for fastening the connector CNT to the heat sink 40 are inserted in the respective screw holes 45H2. An inner circumferential surface of each of the screw holes 45H1 and 45H2 is provided with a screw thread. The heat sink 40 includes the pins 45CP provided on the second surface 40b. For example, two pins 45CP are provided. The pins 45CP are provided in positions facing the respective insert holes 60H2 of the adapter 60 (refer to FIG. 12).

The heat sink 40 has an outer circumferential portion 42 surrounding the bottom portions 41 and 45. As illustrated in FIG. 19, the outer circumferential portion 42 includes an outer circumferential portion 42UE located on the upper side in the plan view, an outer circumferential portion 42BE located on the lower side in the plan view, an outer circumferential portion 42LE located on the left side in the plan view, and an outer circumferential portion 42RE located on the right side in the plan view. A groove portion 422 is continuously formed in the outer circumferential portions 42UE, 42LE, 42BE, and 42RE on the first surface 40a.

Figure 21:
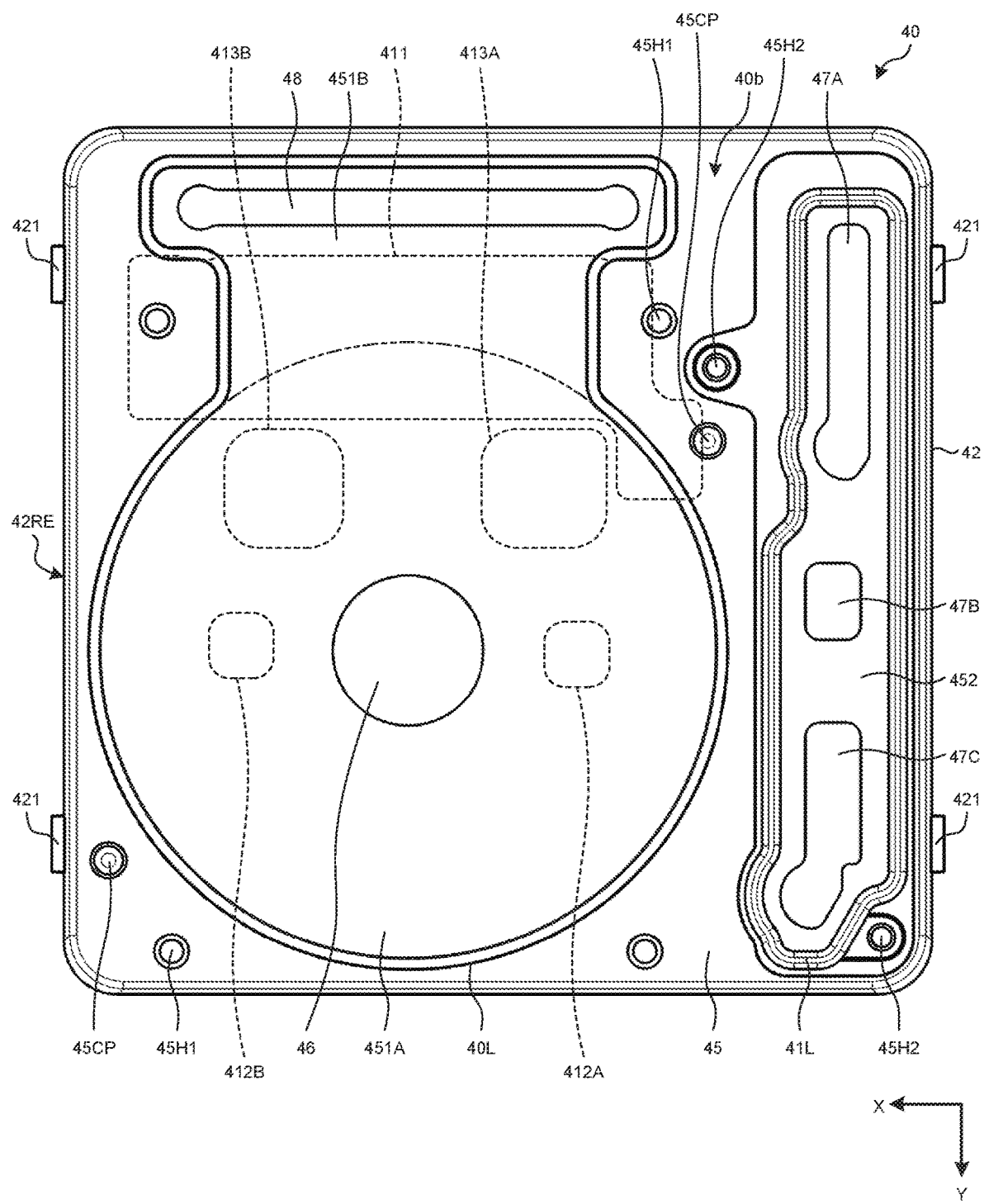
FIG. 21 is a perspective view illustrating a first raised portion, second raised portions, and depressed portions provided on a first surface side of the heat sink according to the first embodiment, when viewed from a second surface side thereof.
Figure 22:
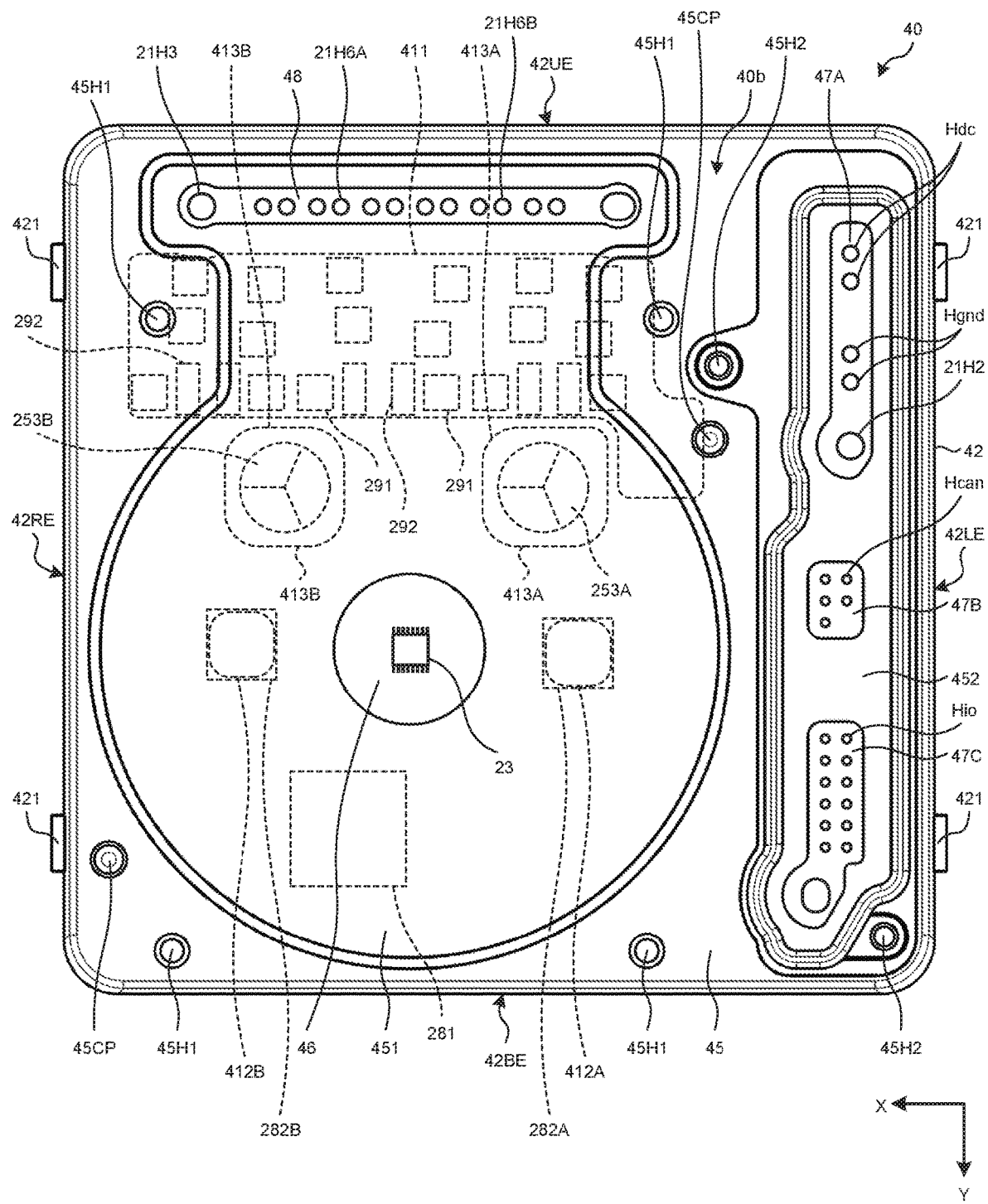
FIG. 22 is a perspective view illustrating the first raised portion, the second raised portions, and the depressed portions provided on the first surface side of the heat sink and the electronic components mounted on the circuit board according to the first embodiment, when viewed from the second surface side of the heat sink.
Figure 23:
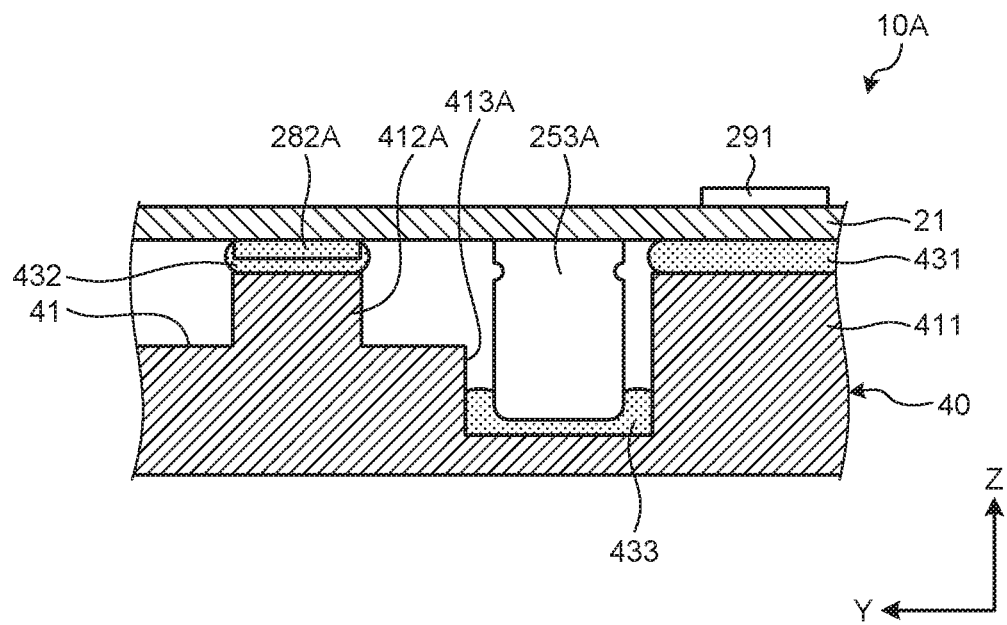
FIG. 23 is a sectional view schematically illustrating a state in which a smoothing capacitor is disposed in one of the depressed portions in the ECU body according to the first embodiment.

FIG. 21 is a perspective view illustrating the first raised portion, the second raised portions, and the depressed portions provided on the first surface side of the heat sink according to the first embodiment, when viewed from the second surface side thereof. FIG. 22 is a perspective view illustrating the first raised portion, the second raised portions, and the depressed portions provided on the first surface side of the heat sink and the electronic components mounted on the circuit board according to the first embodiment, when viewed from the second surface side of the heat sink. FIG. 23 is a sectional view schematically illustrating a state in which one of the electrolytic capacitors is disposed in one of the depressed portions in the ECU body according to the first embodiment. As illustrated in FIGS. 21 to 23, when viewed from the Z-axis direction, the first raised portion 411 overlaps a rim area of the first inner area 451A closer to the second inner area 451B, and the second inner area 451B. When viewed from the Z-axis direction, the electronic components 291 and 292 included in the first power circuit 25A or the second power circuit 25B (refer to FIG. 17A) overlap the first raised portion 411.

When viewed from the Z-axis direction, the second raised portions 412A and 412B and the depressed portions 413A and 413B overlap the first inner area 451A. When viewed from the Z-axis direction, the electronic components 282A and 282B included in the control circuit 24 overlap the second raised portions 412A and 412B, respectively. When viewed from the Z-axis direction, the electrolytic capacitors 253A and 253B disposed on the circuit board 20 overlap the depressed portions 413A and 413B, respectively.

As illustrated in FIG. 23, a third heat dissipation material 433 is provided on a bottom surface of the depressed portion 413A. The third heat dissipation material 433 is, for example, a TIM or thermal grease, in the same way as the first heat dissipation material 431 and the second heat dissipation materials 432. The electrolytic capacitor 253A is accommodated in the depressed portion 413A. The electrolytic capacitor 253A is in contact at the top thereof with the third heat dissipation material 433. Although not illustrated, the third heat dissipation material 433 is also provided on a bottom surface of the depressed portion 413B. The electrolytic capacitor 253B is accommodated in the depressed portion 413B, and is in contact at the top thereof with the third heat dissipation material 433. The top of each of the electrolytic capacitors 253A and 253B refers to a portion thereof on the opposite side of a side connected to the circuit board 20. Side surfaces of the electrolytic capacitors 253A and 253B are close to the heat sink 40, and the top of each of the electrolytic capacitors 253A and 253B is in contact with the third heat dissipation material 433. This configuration can increase the heat dissipation of the electrolytic capacitors 253A and 253B.

Figure 24:
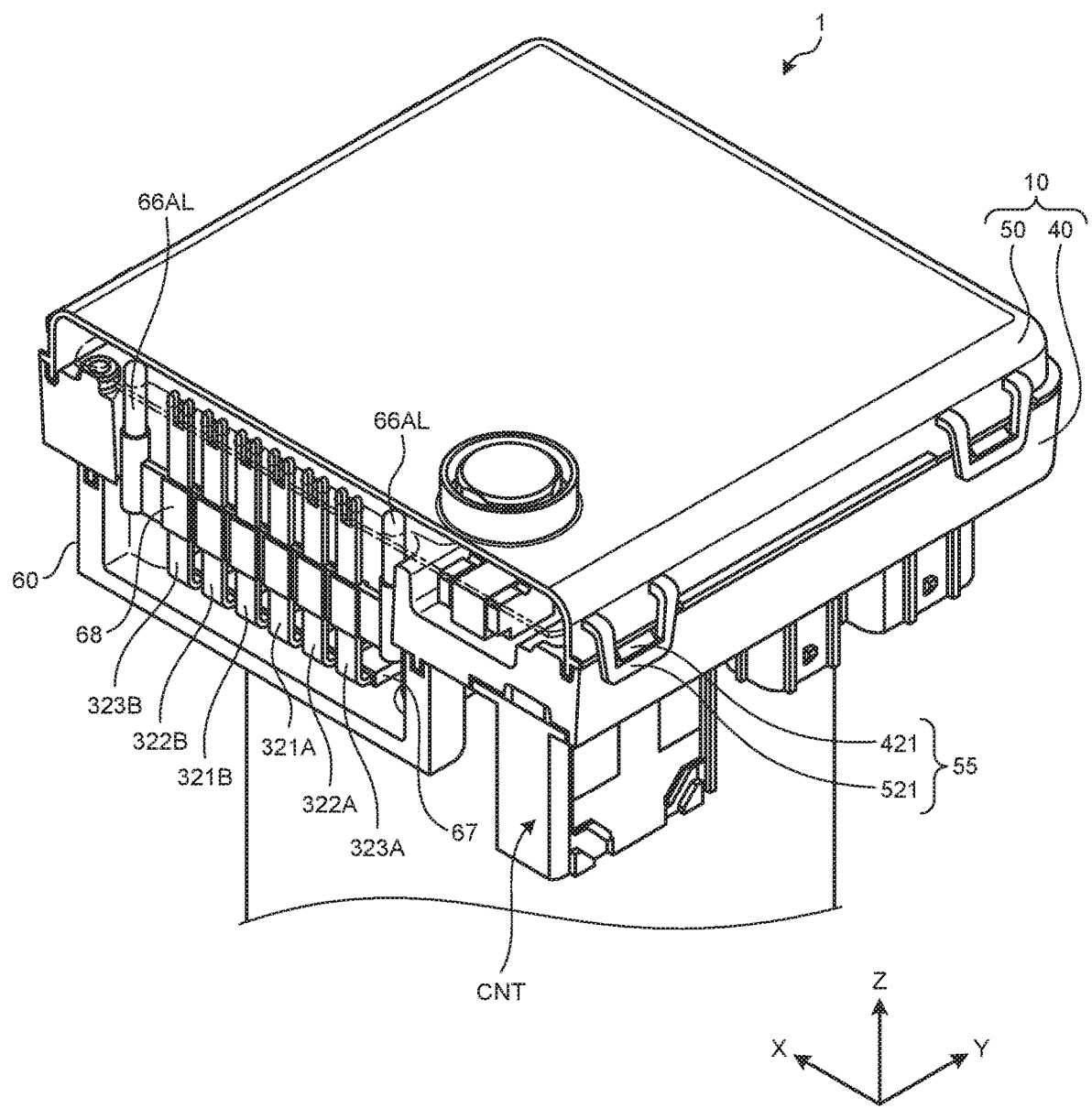
FIG. 24 is a perspective view illustrating a section obtained by cutting the electric drive device along line A1-A2 in FIG. 8.
Figure 25:
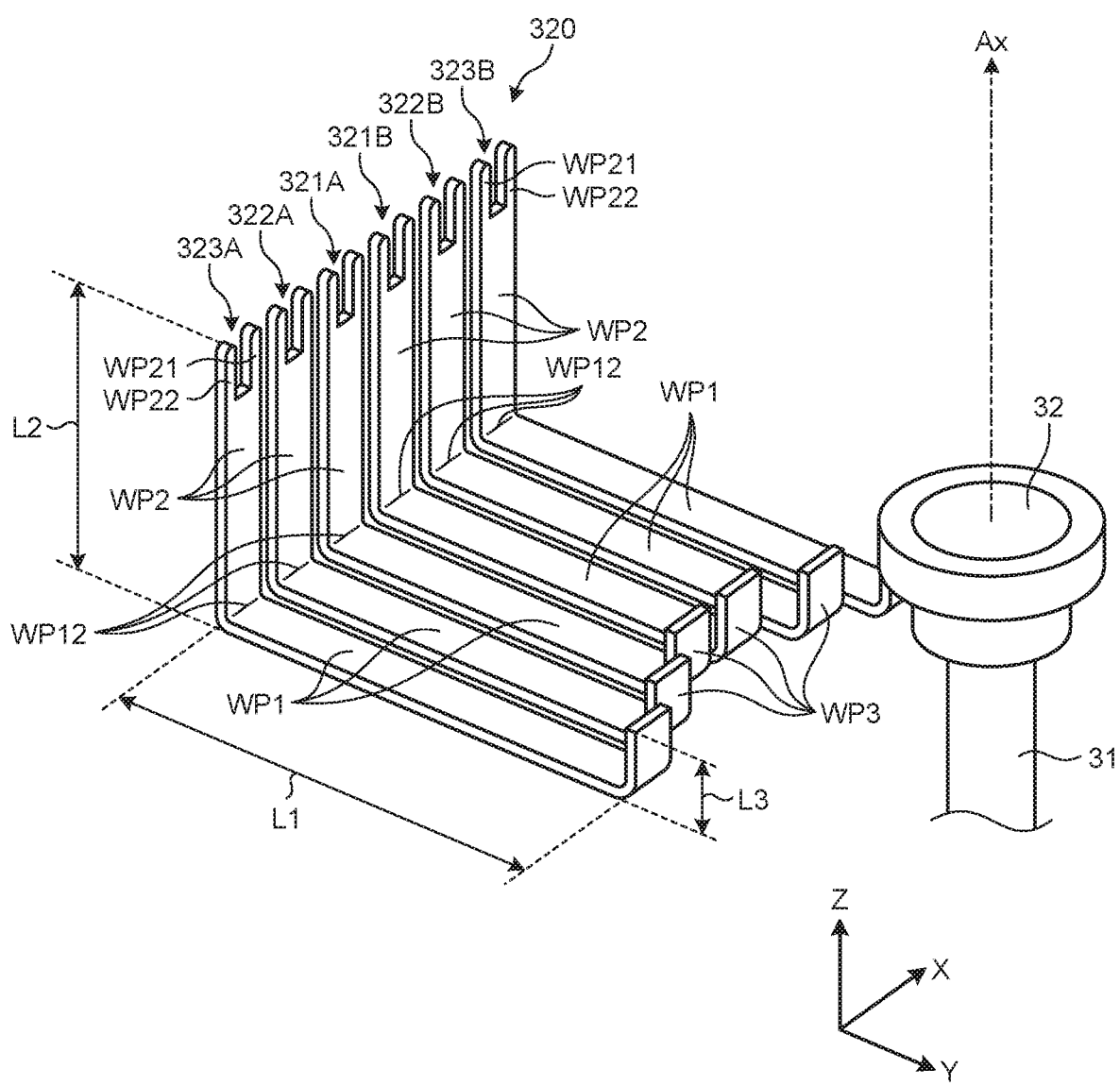
FIG. 25 is a perspective view illustrating a configuration example of first coil wiring and second coil wiring according to the first embodiment.
Figure 26:
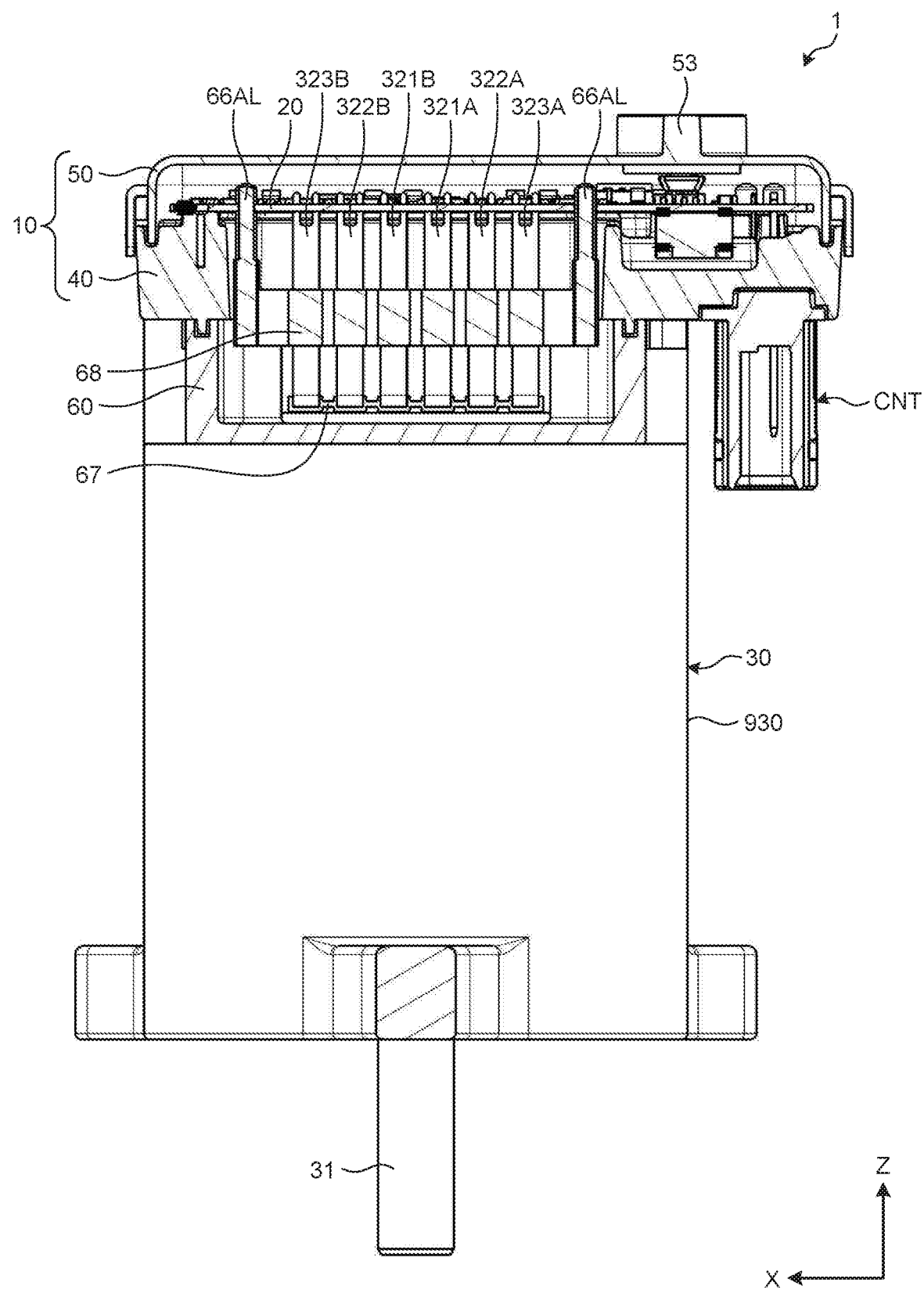
FIG. 26 is a sectional view obtained by cutting the electric drive device along line A3-A4 in FIG. 9.
Figure 27:
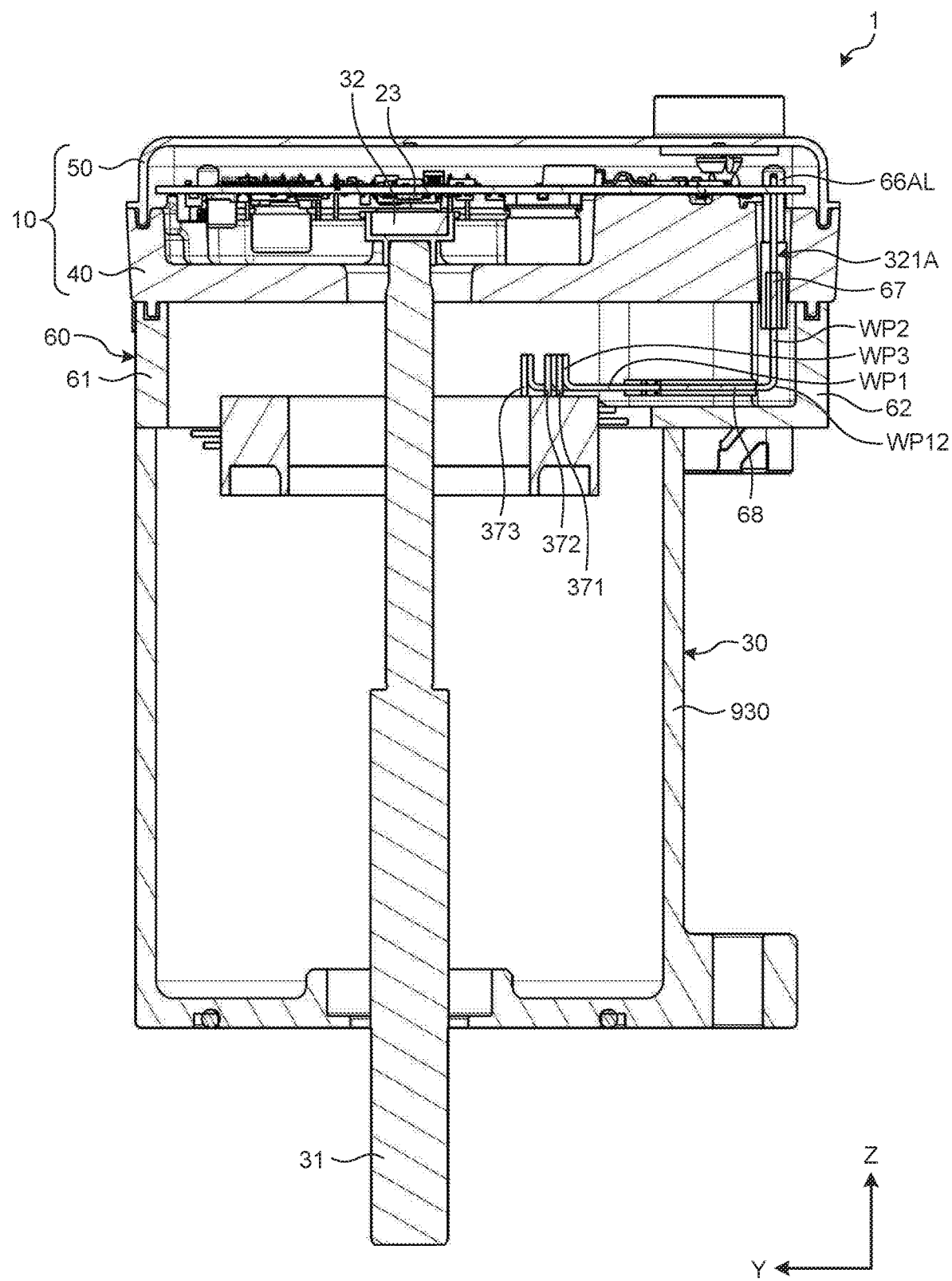
FIG. 27 is a sectional view obtained by cutting the electric drive device along line B1-B2 in FIG. 9.

FIG. 24 is a perspective view illustrating a section obtained by cutting the electric drive device along line A1-A2 in FIG. 8. FIG. 25 is a perspective view illustrating a configuration example of the first coil wiring and the second coil wiring according to the first embodiment. FIG. 26 is a sectional view obtained by cutting the electric drive device along line A3-A4 in FIG. 9. FIG. 27 is a sectional view obtained by cutting the electric drive device along line B1-B2 in FIG. 9.

As illustrated in FIGS. 24 to 27, the electric drive device 1 is provided with the first coil wiring 321A, 322A, and 323A connected to the first coil groups Gr1 (refer to FIG. 4) and the second coil wiring 321B, 322B, and 323B connected to the second coil groups Gr2 (refer to FIG. 4). Each of the first coil wiring 321A, 322A, and 323A and the second coil wiring 321B, 322B, and 323B is a copper wire or an aluminum wire, and is what is called a plate-like rectangular wire. Each of the first coil wiring 321A, 322A, and 323A and the second coil wiring 321B, 322B, and 323B has a first portion WP1, the second portion WP2 connected to one end of the first portion WP1, and a third portion WP3 connected to the other end of the first portion WP1.

The first portion WP1 projects to the outside of the tubular housing 930 in a direction (for example, the Y-direction) intersecting the axial direction Ax of the shaft 31. When viewed from the axial direction of the shaft 31 (for example, the Z-direction), the first portion WP1 projects to the outside of the housing 930. The first portion WP1 is parallel to the Y-direction. The second portion WP2 projects from the first portion WP1 toward the circuit board 20 outside the tubular housing 930. The second portion WP2 is connected to the circuit board 20. The second portion WP2 is parallel to the Z-direction.

As illustrated in FIG. 25, in the first coil wiring 321A, 322A, and 323A and the second coil wiring 321B, 322B, and 323B, the second portions WP2 are arranged in a row in one direction (for example, the X-direction) parallel to the XY-plane. Accordingly, the first power circuit 25A connected to the first coil wiring 321A, 322A, and 323A can be arranged adjacent to the second power circuit 25B connected to the second coil wiring 321B, 322B, and 323B.

In the first coil wiring 321A, 322A, and 323A and the second coil wiring 321B, 322B, and 323B, bent portions WP12 bent between the first portions WP1 and the second portions WP2 are also arranged, for example, in the X-axis direction.

An end of the second portion WP2 on the opposite side of a side connected to the first portion WP1 has a structure branching into two terminal pieces WP21 and WP22. In each of the first coil wiring 321A, 322A, and 323A, each of the terminal pieces WP21 and WP22 is inserted in corresponding one of the first through-holes 21H6A provided in the circuit board 20. Thus, each of the first coil wiring 321A, 322A, and 323A is connected to the first power circuit 25A. Similarly, in each of the second coil wiring 321B, 322B, and 323B, each of the terminal pieces WP21 and WP22 is inserted in corresponding one of the second through-holes 21H6B provided in the circuit board 20. Consequently, each of the second coil wiring 321B, 322B, and 323B is connected to the second power circuit 25B.

For example, press fitting is used to connect the second portions WP2 to the circuit board 20. The press fitting is a solderless electrical connection technique. Specifically, by the press fitting, the terminal pieces WP21 and WP22 are inserted in the first through-holes 21H6A and the second through-holes 21H6B provided in the circuit board 20 and warp such that the outer circumferences of the terminal pieces WP21 and WP22 are elastically deformable. This process connects the second portions WP2 to conductors on inner wall surfaces of the first through-holes 21H6A and conductors on inner wall surfaces of the second through-holes 21H6B. In the first embodiment, the connection of the second portions WP2 to the circuit board 20 is not limited to using the press fitting. Soldering may be used to connect the second portions WP2 to the circuit board 20.

The third portions WP3 are connected to the first coil groups Gr1 or the second coil groups Gr2. The third portions WP3 are parallel to a direction (for example, the Z-direction) intersecting the longitudinal direction of the first portions WP1. A length L3 in the longitudinal direction of the third portions WP3 is smaller than a length L1 in the longitudinal direction of the first portions WP1 and smaller than a length L2 in the longitudinal direction of the second portions WP2. The third portions WP3 are arranged on a circumference of a virtual circle centered on the shaft 31.

As illustrated in FIGS. 24 and 26, the electric drive device 1 includes a first connection member 67 that connects the first portions WP1 of the first coil wiring 321A, 322A, and 323A and the second coil wiring 321B, 322B, and 323B to one another. The electric drive device 1 also includes a second connection member 68 that connects the second portions WP2 of the first coil wiring 321A, 322A, and 323A and the second coil wiring 321B, 322B, and 323B to one another. Each of the first connection member 67 and the second connection member 68 is made of an insulating resin. The first connection member 67 and the second connection member 68 cause the first coil wiring 321A, 322A, and 323A and the second coil wiring 321B, 322B, and 323B to be arranged adjacent to each other in the X-direction in a mutually separated state.

As illustrated in FIG. 27, the electric motor 30 includes, for example, three first terminal pieces 371, 372, and 373 connected to the first coil groups Gr1 and three second terminal pieces (not illustrated) connected to the second coil groups Gr2. Once the heat sink 40 is mounted on the electric motor 30 with the adapter 60 interposed therebetween, the third portions WP3 of the first coil wiring 321A, 322A, and 323A are pressed to come in contact with the first terminal pieces 371, 372, and 373, respectively. The third portions WP3 of the second coil wiring 321B, 322B, and 323B are also pressed to come in contact with the respective second terminal pieces (not illustrated). As a result, the first coil wiring 321A, 322A, and 323A are connected to the first coil groups Gr1 with the first terminal pieces 371, 372, and 373 interposed therebetween, and the second coil wiring 321B, 322B, and 323B are connected to the second coil groups Gr2 with the second terminal pieces interposed therebetween. Resistance welding or laser welding may be used to join the third portions WP3 to the first terminal pieces 371, 372, and 373 or the second terminal pieces.

As illustrated in FIG. 27, each of the bent portions WP12 of the first coil wiring 321A, 322A, and 323A is disposed inside the projecting portion 62 of the adapter 60. Although not illustrated, each of the bent portions WP12 (refer to FIG. 25) of the second coil wiring 321B, 322B, and 323B is also disposed inside the projecting portion 62.

Figure 28:
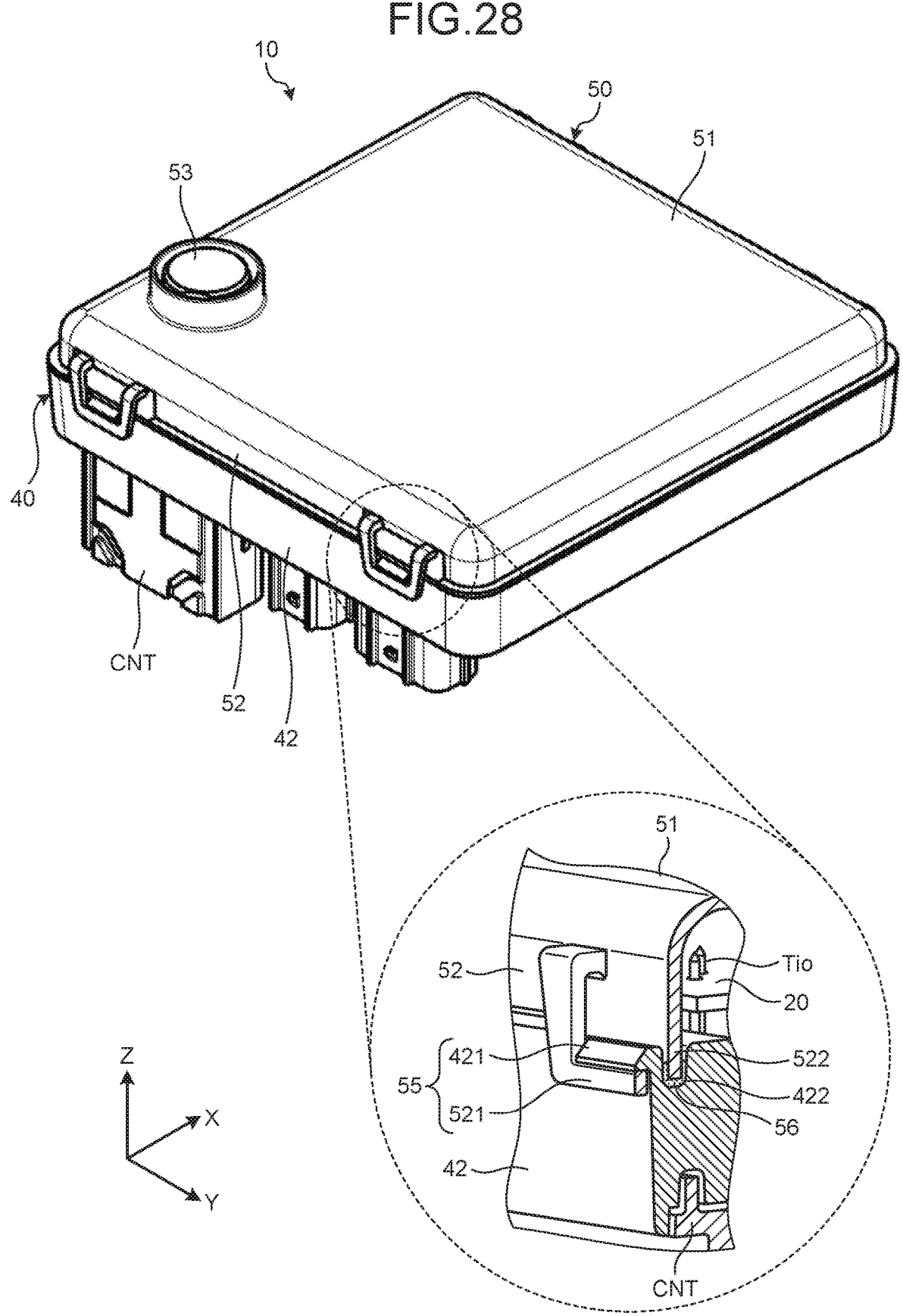
FIG. 28 is a perspective view illustrating an example of snap-fits according to the first embodiment.

FIG. 28 is a perspective view illustrating an example of snap-fits according to the first embodiment. As illustrated in FIG. 28, the ECU 10 is provided with snap-fits 55 for mounting the lid 50 onto the heat sink 40. The lid 50 includes a top board 51 and an outer circumferential portion 52 provided at the rim of the top board 51. The outer circumferential portion 52 rises from the top board 51. For example, the lid 50 is made of a metal or a resin, and the top board 51 and the outer circumferential portion 52 are integrally formed.

Each of the snap-fits 55 includes, for example, a hooking part 521 and a hooked part 421 hooked by the hooking part 521. The hooking parts 521 are provided at the outer circumferential portion 52 of the lid 50. The hooked parts 421 are provided at the outer circumferential portion 42 of the heat sink 40. For example, as illustrated in FIG. 19, the hooked parts 421 are provided at the outer circumferential portion 42LE and the outer circumferential portion 42RE that are adjacent to each other in the X-direction (right-left direction). The hooking parts 521 are provided in positions that overlap the hooked parts 421 in the Z-direction when the lid 50 is mounted on the heat sink 40.

In the first embodiment, in a process of mounting the lid 50 onto the heat sink 40, a second adhesive 56 is first disposed on the groove portion 422. Subsequently, the outer circumferential portion 52 of the lid 50 is fitted in the groove portion 422. For example, an end 522 on one side of the outer circumferential portion 52 facing the heat sink 40 is fitted in the groove portion 422. Subsequently, the hooking parts 521 are latched to the hooked parts 421 of the snap-fits 55. This process temporarily joins the lid 50 to the heat sink 40. Once the second adhesive 56 hardens, the lid 50 is fixed to the heat sink 40 by both the snap-fits 55 and the second adhesive 56.

The heat sink 40 and the lid 50 constitute a container for containing the circuit board 20. Since the second adhesive 56 is interposed between the outer circumferential portion 52 and the groove portion 422, the inside of the above-mentioned container is highly airtight.

The lid 50 is provided with a valve 53. The valve 53 opens and closes based on a pressure difference between the inside and the outside of the above-mentioned container. For example, an increase in the above-mentioned pressure difference caused by a temperature change opens the valve 53 to reduce the pressure difference. The reduction in the pressure difference closes the valve 53 to seal the inside of the container. In this way, the valve 53 can reduce a change in pressure in the container.

As described above, the electric drive device 1 according to the first embodiment is provided with the electric motor 30 and the ECU 10 that is provided on the anti-load side of the shaft 31 to control drive of the electric motor 30. The ECU 10 includes the magnet 32 at the anti-load side end of the shaft 31 and the circuit board 20 disposed on the anti-load side of the shaft 31 on an extended line in the axial direction of the shaft 31 (for example, the Z-direction). The circuit board 20 includes: the detection circuit 23 including the rotation angle sensor 23a for detecting the rotation of the magnet 32; the control circuit 24; the first power circuit 25A; and the second power circuit 25B. The rotation angle sensor 23a is the magnetic sensor that detects the rotation of the magnet 32. The first power circuit 25A includes the electronic components 291 that supply the currents to the first coil groups Gr1. The second power circuit 25B includes the electronic components 291 that supply the currents to the second coil groups Gr2. The control circuit 24 includes, for example, the electronic component 282A that controls the currents supplied by the first power circuit 25A and the electronic component 282B that controls the currents supplied by the second power circuit 25B.

The electric drive device 1 is also provided with the first coil wiring 321A, 322A, and 323A for connecting the first coil groups Gr1 to the circuit board 20 and the second coil wiring 321B, 322B, and 323B for connecting the second coil groups Gr2 to the circuit board 20. The first coil wiring 321A, 322A, and 323A and the second coil wiring 321B, 322B, and 323B may be included in the ECU 10, or may be included in the electric motor 30. Each of the first coil wiring 321A, 322A, and 323A and the second coil wiring 321B, 322B, and 323B includes the first portion WP1 projecting to the outside of the housing 930 in the direction (for example, the Y-direction) intersecting the axial direction of the shaft 31 and the second portion WP2 projecting from the first portion WP1 toward the circuit board 20 outside the housing 930.

This structure allows the first power circuit 25A and the second power circuit 25B to be disposed closer to the outer circumference of the circuit board 20, and thus can increase separation distances of the first power circuit 25A and the second power circuit 25B from the rotation angle sensor 23a. This makes the heat generated in the first power circuit 25A and the second power circuit 25B hard to be transmitted to the rotation angle sensor 23a, thereby preventing temperature increase of the rotation angle sensor 23a. The rotation angle sensor 23a is reduced in errors of detection values thereof caused by variations in temperature, and thus is improved in detection accuracy in rotation angle.

Separation distances of the first coil wiring 321A, 322A, and 323A and the second coil wiring 321B, 322B, and 323B from the rotation angle sensor 23a can also be increased. This configuration can prevent the rotation angle sensor 23a from being affected by magnetic fields generated by currents flowing in the respective wires of the first coil wiring 321A, 322A, and 323A and the second coil wiring 321B, 322B, and 323B. The rotation angle sensor 23a is reduced in errors of detection values thereof caused by the magnetic fields around the wiring, and thus is improved in detection accuracy in rotation angle.

For example, when the torque sensor 94 has detected a large amount of the steering torque, large amounts of the currents I1u, I1v, and I1w (refer to FIG. 16) flow from the first power circuit 25A through the first coil wiring 321A, 322A, and 323A to the electric motor 30, and large amounts of the currents I2u, I2v, and I2w (refer to FIG. 16) flow from the second power circuit 25B through the second coil wiring 321B, 322B, and 323B to the electric motor 30. As a result, strong magnetic fields may be generated around the first coil wiring 321A, 322A, and 323A and around the second coil wiring 321B, 322B, and 323B in response to the large amounts of the currents. However, in the electric drive device 1 according to the first embodiment, each piece of the first coil wiring 321A, 322A, and 323A and the second coil wiring 321B, 322B, and 323B is disposed so as to circumvent the vicinity of the rotation angle sensor 23a. Even when the strong magnetic fields are generated around the first coil wiring 321A, 322A, and 323A and around the second coil wiring 321B, 322B, and 323B, this arrangement can prevent the magnetic fields from affecting the detection accuracy of the rotation angle sensor 23a as much as possible.

As illustrated in FIGS. 24 to 26, the first coil wiring 321A, 322A, and 323A and the second coil wiring 321B, 322B, and 323B are arranged adjacent to each another. For example, the first coil wiring 321A, 322A, and 323A and the second coil wiring 321B, 322B, and 323B are arranged in a row in the X-direction. Accordingly, the first power circuit 25A connected to the first coil wiring 321A, 322A, and 323A can be arranged adjacent to the second power circuit 25B connected to the second coil wiring 321B, 322B, and 323B.

The second portions WP2 of the first coil wiring 321A, 322A, and 323A are connected to the first power circuit 25A at positions closer to the outer circumference of the circuit board 20 than the electronic components 291 and 292 included in the first power circuit 25A are to the outer circumference of the circuit board 20. This configuration further prevents the magnetic fields generated by the currents flowing in the first coil wiring 321A, 322A, and 323A from affecting the rotation angle sensor 23a.

As illustrated in FIG. 18, when viewed from the Z-axis direction, the arrangement positions of the electronic components 291 and 292 included in the first power circuit 25A are between the arrangement position of the detection circuit 23 and the first through-holes 21H6A. This arrangement can locate current paths extending from the first power circuit 25A to the electric motor 30 away from the rotation angle sensor 23a.

When viewed from the Z-axis direction, the arrangement position of the electronic component 282A included in the control circuit 24 is on the opposite side of the first through-holes 21H6A across the arrangement positions of the electronic components 291 and 292 included in the first power circuit 25A. This arrangement can locate the current paths extending from the first power circuit 25A to the electric motor 30 away from the control circuit 24.

The second portions WP2 of the second coil wiring 321B, 322B, and 323B are connected to the second power circuit 25B at positions closer to the outer circumference of the circuit board 20 than the electronic components 291 and 292 included in the second power circuit 25B are to the outer circumference of the circuit board 20. This configuration further prevents the magnetic fields generated around the second coil wiring 321B, 322B, and 323B from affecting the rotation angle sensor 23a.

When viewed from the Z-axis direction, the arrangement positions of the electronic components 291 and 292 included in the second power circuit 25B are between the arrangement position of the detection circuit 23 and the second through-holes 21H6B. This arrangement can locate current paths extending from the second power circuit 25B to the electric motor 30 away from the rotation angle sensor 23a.

When viewed from the Z-axis direction, the arrangement position of the electronic component 282B included in the control circuit 24 is on the opposite side of the second through-holes 21H6B across the arrangement positions of the electronic components 291 and 292 included in the second power circuit 25B. This arrangement can locate the current paths extending from the second power circuit 25B to the electric motor 30 away from the control circuit 24.

When viewed from the Z-axis direction, the arrangement position of the detection circuit 23 is on the opposite side of the arrangement positions of the electronic components 291 and 292 included in the first power circuit 25A or the second power circuit 25B across the arrangement position of the electrolytic capacitor 253A or 253B. This arrangement can further increase the separation distance of the first power circuit 25A or the second power circuit 25B from the rotation angle sensor 23a.

As illustrated in FIG. 18, when viewed from the Z-axis direction, the arrangement position of the detection circuit 23 is on the opposite side of the arrangement positions of the electronic components 291 and 292 included in the first power circuit 25A or the second power circuit 25B across the straight line 20CL passing through the center of the circuit board 20. Accordingly, the electronic components 291 and 292 included in the first power circuit 25A or the second power circuit 25B are disposed only in an area on one side of the circuit board 20 divided by the straight line 20CL. The rotation angle sensor 23a is disposed in an area on the other side of the circuit board 20 divided by the straight line 20CL. This arrangement can further increase separation distances of the electronic components 291 and 292 from the rotation angle sensor 23a.

For example, wiring (not illustrated) made of, for example, copper (Cu) is provided on the circuit board 20. Some pieces of the wiring are connected to the electronic components 291 and 292 included in the first power circuit 25A or the second power circuit 25B. Since larger amounts of currents than those of the detection circuit 23 and the control circuit 24 flow in the first power circuit 25A or the second power circuit 25B, strong magnetic fields may be generated due to large amounts of currents flowing in the wiring connected to the electronic components 291 and 292. However, in the electric drive device 1 according to the first embodiment, the separation distances of the first power circuit 25A and the second power circuit 25B from the rotation angle sensor 23a are large. As a result, even when the strong magnetic fields are generated around the wiring connected to the electronic components 291 and 292, the magnetic fields can be prevented from affecting the detection accuracy of the rotation angle sensor 23a as much as possible.

As illustrated in FIG. 13, the connector CNT is connected to the circuit board 20 from outside the heat sink 40. As illustrated in FIG. 9, when viewed from the Z-axis direction, the connector CNT is disposed outside the electric motor 30. This arrangement can locate the connector CNT away from the rotation angle sensor 23a. For example, as illustrated in FIG. 16, the connector CNT includes the power supply terminals Tdc and Tgnd. When the torque sensor 94 has detected a large amount of the steering torque, a large current PSC flows from the power supply terminal Tdc to the first power circuit 25A and the second power circuit 25B (refer to FIG. 16), and may generate strong magnetic fields around the power supply terminals Tdc and Tgnd. However, in the electric drive device 1 according to the first embodiment, when viewed from the Z-axis direction, the power supply terminals Tdc and Tgnd are disposed outside the electric motor 30, and separation distances of the power supply terminals Tdc and Tgnd from the rotation angle sensor 23a are large. As a result, even when the strong magnetic fields are generated around the power supply terminals Tdc and Tgnd, the magnetic fields can be prevented from affecting the detection accuracy of the rotation angle sensor 23a as much as possible.

The electric drive device 1 is provided with the heat sink 40 that supports the circuit board 20. This configuration efficiently dissipates the heat generated by the circuit board 20.

The heat sink 40 has the first raised portion 411 that faces at least one of the first power circuit 25A and the second power circuit 25B and is raised toward the circuit board 20. The first raised portion 411 faces, for example, both the first power circuit 25A and the second power circuit 25B. In the ECU 10, while the first power circuit 25A and the second power circuit 25B generate a relatively large amount of heat, the first raised portion 411 faces the first power circuit 25A and the second power circuit 25B to increase the heat dissipation efficiency of the circuit board 20. As a result, the heat generated in the first power circuit 25A and the second power circuit 25B can be effectively dissipated.

The electric drive device 1 is provided with the first heat dissipation material 431 provided on the first raised portion 411. This configuration can more effectively dissipate the heat generated in the first power circuit 25A and the second power circuit 25B.

The heat sink 40 faces the control circuit 24, and has the second raised portions 412A and 412B raised toward the circuit board 20. For example, the second raised portion 412A faces the electronic component 282A included in the control circuit 24, and the second raised portion 412B faces the electronic component 282B included in the control circuit 24. The electronic component 282A controls the currents supplied by the first power circuit 25A, and the electronic component 282B controls the currents supplied by the second power circuit 25B. Hence, the electronic components 282A and 282B generate a relatively large amount of heat. However, since the second raised portion 412A faces the electronic component 282A, and the second raised portion 412B faces the electronic component 282B, the heat dissipation efficiency of the circuit board 20 increases. As a result, the heat generated in the control circuit 24 can be effectively dissipated.

The electric drive device 1 is provided with the second heat dissipation materials 432 provided on the second raised portions 412A and 412B. This configuration can more effectively dissipate the heat generated in the electronic components 282A and 282B.

As illustrated in FIG. 23, the electrolytic capacitor 253A is accommodated in the depressed portion 413A of the heat sink 40. In the same way, the electrolytic capacitor 253B is accommodated in the depressed portion 413B of the heat sink 40. This configuration can make the thickness of the ECU body 10A smaller than that when the heat sink 40 has no depressed portion. The side surfaces of the electrolytic capacitors 253A and 253B can be made closer to the heat sink 40. Therefore, the heat dissipation of the electrolytic capacitors 253A and 253B can be increased.

As illustrated in FIG. 25, the first coil wiring 321A, 322A, and 323A and the second coil wiring 321B, 322B, and 323B have the bent portions WP12 bent between the first portions WP1 and the second portions WP2. As illustrated in FIG. 27, each of the bent portions WP12 of the first coil wiring 321A, 322A, and 323A and the second coil wiring 321B, 322B, and 323B is disposed inside the adapter 60 (for example, in the projecting portion 62). This arrangement can locate the first coil wiring 321A, 322A, and 323A and the second coil wiring 321B, 322B, and 323B further away from the rotation angle sensor 23a.

As described above, in the electric drive device 1, the power supply terminals Tdc and Tgnd, the first power circuit 25A, the second power circuit 25B, the first coil wiring 321A, 322A, and 323A, and the second coil wiring 321B, 322B, and 323B, in which the large amounts of currents flow in response to the steering torque, are located away from the rotation angle sensor 23a. With this arrangement, even when the large amounts of currents flow in the above-listed portions to generate heat in the portions, or generate strong magnetic fields around the portions, the heat or the magnetic fields can be prevented from affecting the detection accuracy of the rotation angle sensor 23a as much as possible.

As illustrated in FIG. 20, the heat sink 40 has the projecting portion 40L provided at the bottom portion 45 of the second surface 40b. As illustrated in FIG. 11, the adapter 60 has the depressed portion 60L provided on the surface thereof facing the heat sink 40. The projecting portion 40L is fitted in the depressed portion 60L. This configuration can position the adapter 60 with respect to the heat sink 40. The first embodiment may be an aspect in which the heat sink 40 is provided with a depressed portion, and the adapter 60 is provided with a projecting portion, the projecting portion of the adapter 60 being fitted in the depressed portion of the heat sink 40. This aspect also allows the adapter 60 to be positioned with respect to the heat sink 40.

As illustrated in FIG. 11, the first adhesive 656 is disposed on the depressed portion 60L of the adapter 60. The first adhesive 656 is disposed on the depressed portion 60L. The first adhesive 656 bonds the heat sink 40 to the adapter 60. This configuration can prevent the adapter 60 from separating from the heat sink 40.

The electric drive device 1 is provided with the lid 50 that covers the circuit board 20, and the snap-fits 55 that fix the lid 50 to the heat sink 40. One of each of the hooking parts 521 and each of the hooked parts 421 of the snap-fits 55 is provided on the outer circumferential portion 52 of the lid 50. The other of each of the hooking parts 521 and each of the hooked parts 421 is provided on the outer circumferential portion 42 of the heat sink 40. This configuration can easily fix the lid 50 to the heat sink 40.

The electric drive device 1 is provided with the valve 53 provided on the lid 50. The lid 50 and the heat sink 40 constitute the container for containing the circuit board 20. The valve 53 opens and closes based on the pressure difference between the inside and the outside of the container. Consequently, the valve 53 can reduce the change in pressure in the container caused by the temperature change.

The heat sink 40 has the groove portion 422 provided on the outer circumferential portion 42. The outer circumferential portion 52 of the lid 50 is fitted in the groove portion 422. This configuration can accurately position the lid 50 with respect to the heat sink 40.

The electric drive device 1 is provided with the second adhesive 56 disposed on the groove portion 422. The second adhesive 56 bonds the lid 50 to the heat sink 40. As a result, the lid 50 is fixed to the heat sink 40 by both the snap-fits 55 and the second adhesive 56.

The electric power steering device 100 is provided with the above-described electric drive device 1, and the electric drive device 1 generates the steering assist torque.

Modifications of First Embodiment

While the first embodiment described above has the configuration in which the first coil wiring 321A, 322A, and 323A and the second coil wiring 321B, 322B, and 323B are arranged in a row in the X-direction, the arrangement of the first coil wiring 321A, 322A, and 323A and the second coil wiring 321B, 322B, and 323B is not limited thereto. For example, the second portions WP2 of the first coil wiring 321A, 322A, and 323A and the second coil wiring 321B, 322B, and 323B may be arranged in a staggered manner toward the X-direction.

Figure 29:
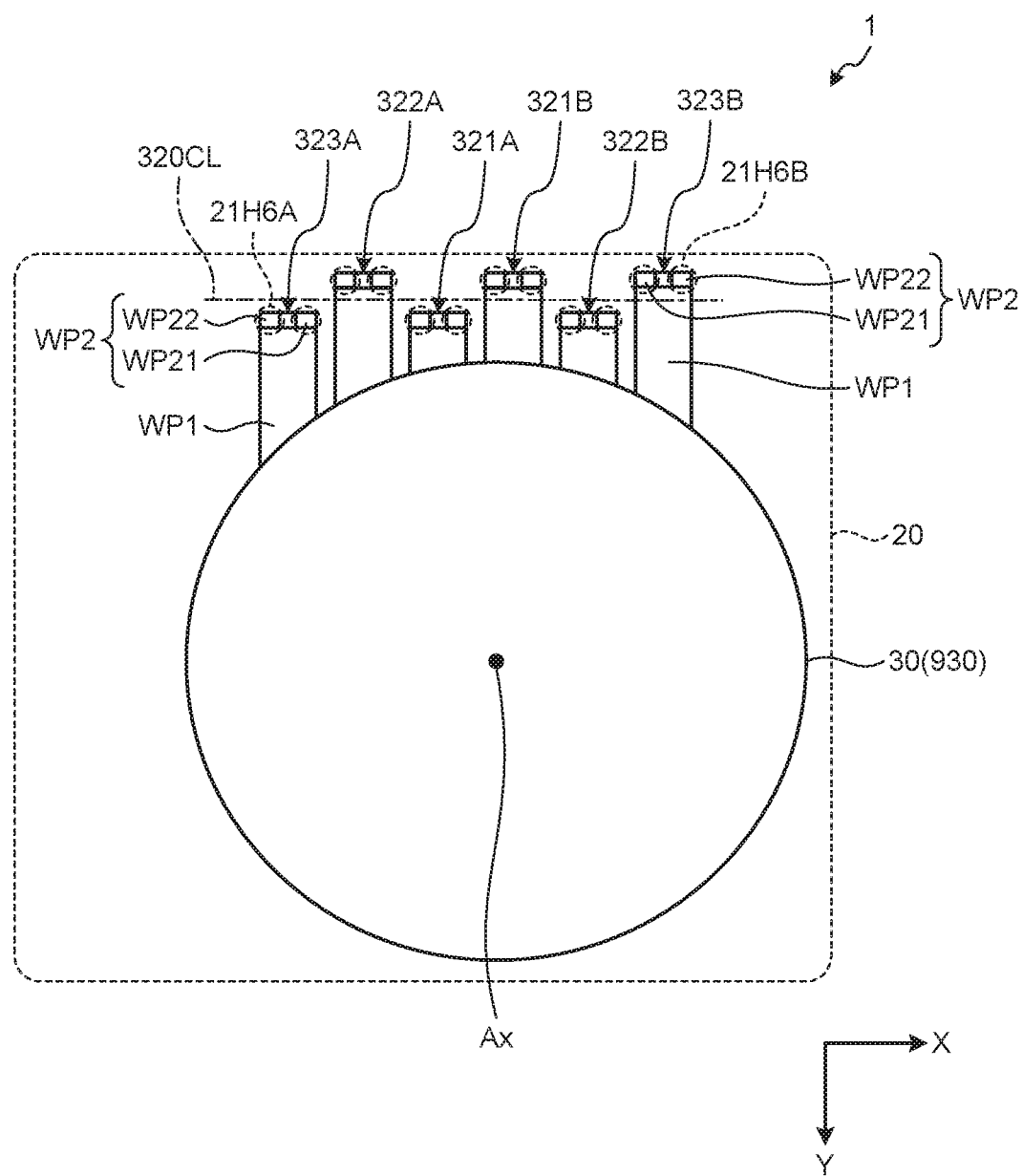
FIG. 29 is a schematic diagram illustrating a configuration of the electric drive device according to a first modification of the first embodiment.

FIG. 29 is a schematic diagram illustrating a configuration of the electric drive device according to a first modification of the first embodiment. As illustrated in FIG. 29, in the first modification of the first embodiment, the second portions WP2 of the first coil wiring 321A, 322A, and 323A and the second coil wiring 321B, 322B, and 323B are arranged in a staggered manner with two alternate rows in the X-direction. For example, in the plan view from the axial direction Ax, the second portions WP2 of the first coil wiring 321A, 322A, and 323A and the second coil wiring 321B, 322B, and 323B are located outside the housing 930 of the motor 30. These second portions WP2 are alternately arranged between one side and the other side across a straight line 320CL toward the X-direction. The straight line 320CL is a virtual line that is located outside the housing 930 of the electric motor 30 and is parallel to the X-direction.

Also in the first modification illustrated in FIG. 29, the second portions WP2 of the first coil wiring 321A, 322A, and 323A and the second portions WP2 of the second coil wiring 321B, 322B, and 323B are arranged side by side in one direction (for example, the X-direction) parallel to the XY-plane. Accordingly arrangement, the first power circuit 25A connected to the first coil wiring 321A, 322A, and 323A can be arranged adjacent to the second power circuit 25B connected to the second coil wiring 321B, 322B, and 323B.

The second portions WP2 of the first coil wiring 321A, 322A, and 323A and the second coil wiring 321B, 322B, and 323B may be arranged side by side in the circumferential direction of a circle centered on the axial direction Ax.

Figure 30:
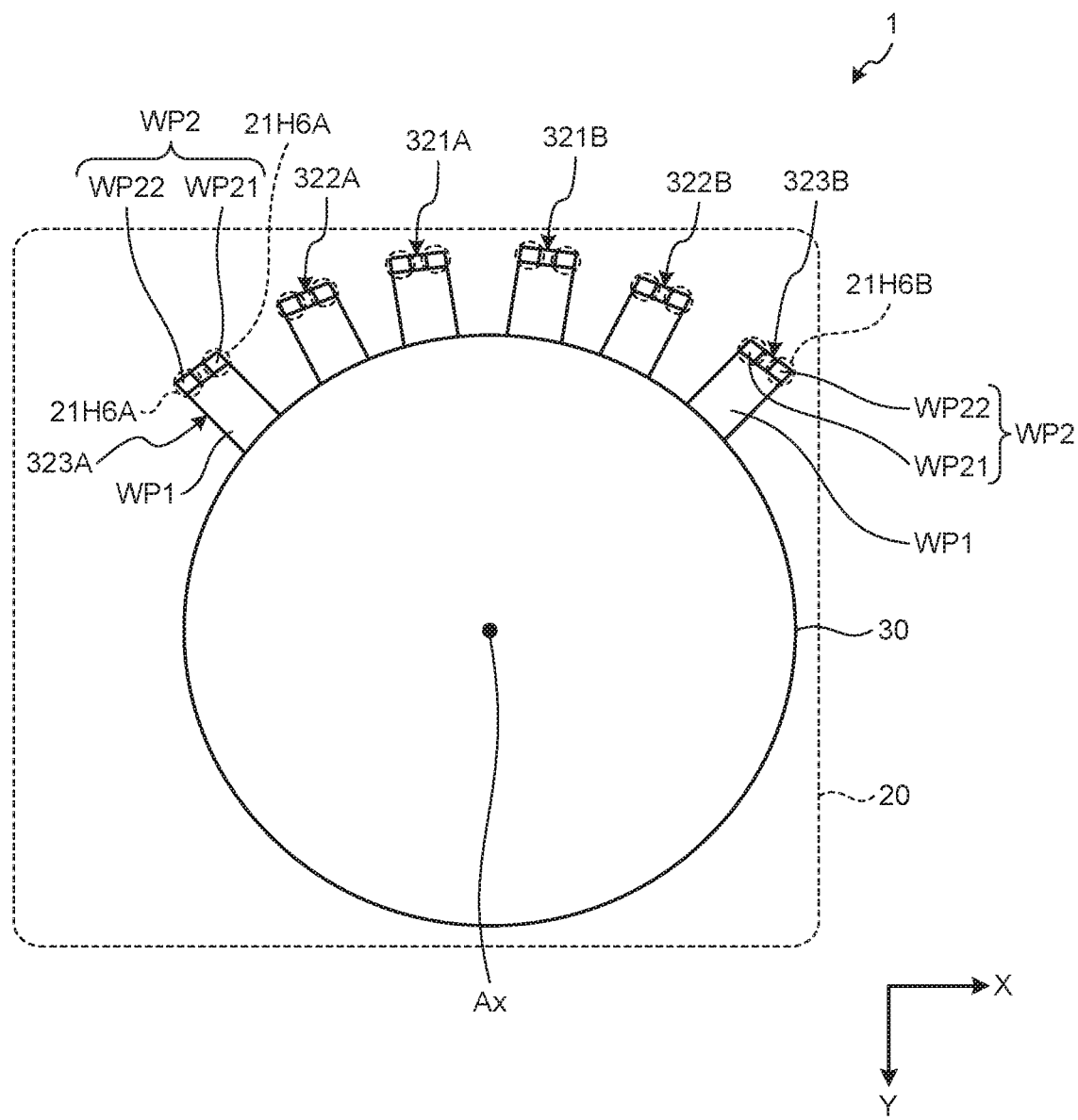
FIG. 30 is a schematic diagram illustrating a configuration of the electric drive device according to a second modification of the first embodiment.

FIG. 30 is a schematic diagram illustrating a configuration of the electric drive device according to a second modification of the first embodiment. As illustrated in FIG. 30, in the second modification of the first embodiment, the second portions WP2 of the first coil wiring 321A, 322A, and 323A and the second coil wiring 321B, 322B, and 323B are arranged side by side in the circumferential direction of the circle (virtual circle) centered on the axial direction Ax. For example, in the plan view from the axial direction Ax, the second portions WP2 of the first coil wiring 321A, 322A, and 323A and the second coil wiring 321B, 322B, and 323B are located outside the housing 930 of the electric motor 30. These second portions WP2 are arranged parallel to an outer circumferential surface of the housing 930. The planar shape of the housing 930 is a perfect circle, and the center thereof overlaps the axial direction Ax.

Also in the second modification illustrated in FIG. 30, the first coil wiring 321A, 322A, and 323A and the second coil wiring 321B, 322B, and 323B are arranged side by side in one direction (for example, the circumferential direction of a circle concentric with the housing of the electric motor 30) parallel to the XY-plane. Accordingly, the first power circuit 25A connected to the first coil wiring 321A, 322A, and 323A can be arranged adjacent to the second power circuit 25B connected to the second coil wiring 321B, 322B, and 323B.

In the first embodiment described above, the electrolytic capacitors 253A and 253B have been described to be accommodated in the depressed portions 413A and 413B, respectively, of the heat sink 40. At least apart of the inner circumferential surface of each of the depressed portions 413A and 413B may have a shape matching or substantially matching with the outer circumferential surface of corresponding one of the electrolytic capacitors 253A and 253B.

Figure 31:
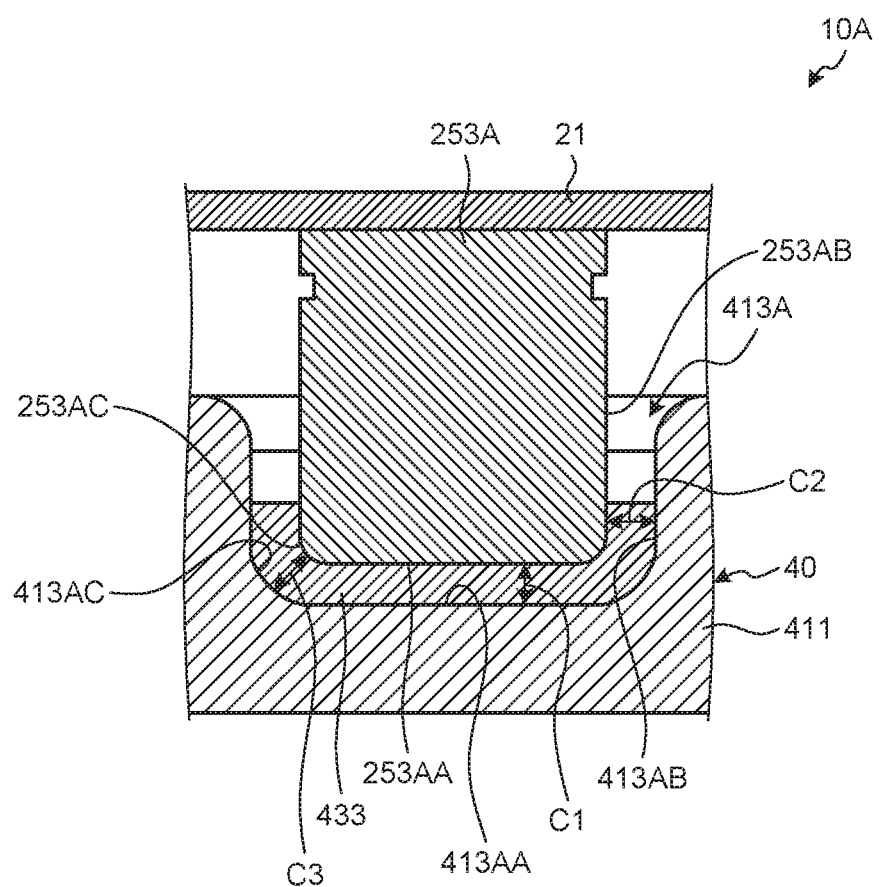
FIG. 31 is a sectional view illustrating a configuration of one of the depressed portions according to a third modification of the first embodiment.

FIG. 31 is a sectional view illustrating a configuration of one of the depressed portions according to a third modification of the first embodiment. As illustrated in FIG. 31, an end surface 253AA of the electrolytic capacitor 253A extends along a bottom surface 413AA of the depressed portion 413A. A width C1 between the end surface 253AA and the bottom surface 413AA is preferably constant. In other words, the end surface 253AA is preferably parallel to the bottom surface 413AA.

As illustrated in FIG. 31, the bottom surface 413AA of the depressed portion 413A is substantially parallel to the end surface 253AA. An inner circumferential surface 413AB of the depressed portion 413A extends along the outer circumferential surface of the electrolytic capacitor 253A. The inner circumferential surface 413AB of the depressed portion 413A is a cylindrical curved surface. In a section obtained by cutting the electrolytic capacitor 253A and the heat sink 40 along a plane parallel to the end surface 253AA, each of an outer circumferential surface 253AB of the electrolytic capacitor 253A and the inner circumferential surface 413AB of the depressed portion 413A forms a circle. A width C2 between the outer circumferential surface 253AB and the inner circumferential surface 413AB is preferably constant.

The electrolytic capacitor 253A is provided with a convex curved surface 253AC connecting the end surface 253AA and the outer circumferential surface 253AB. The depressed portion 413A is provided with a concave curved surface 413AC connecting the bottom surface 413AA and the inner circumferential surface 413AB. The curved surface 413AC is a curved surface convex with respect to the electrolytic capacitor 253A. In the section illustrated in FIG. 31, the curved surface 413AC forms a circular arc. The radius of curvature of the circular arc formed by the curved surface 413AC is larger than the radius of curvature of the circular arc formed by the curved surface 253AC of the electrolytic capacitor 253A. In the section illustrated in FIG. 31, the center of the circular arc formed by the curved surface 413AC of the depressed portion 413A is preferably the same as the center of the circular arc formed by the curved surface 253AC of the electrolytic capacitor 253A. A width C3 of a gap between the curved surface 253AC and the curved surface 413AC illustrated in FIG. 31 is preferably constant.

The third heat dissipation material 433 is a material for facilitating conduction of the heat generated at the circuit board 20 (refer to FIG. 16) to the heat sink 40. The third heat dissipation material 433 is, for example, a material obtained by mixing a silicone polymer with a thermally conductive filler. The third heat dissipation material 433 has, for example, a paste form. The third heat dissipation material 433 has a viscosity of approximately 45 Pa·s. The third heat dissipation material 433 is in contact with the electrolytic capacitor 253A and an inner wall of the depressed portion 413A. More specifically, the third heat dissipation material 433 is in contact with the end surface 253AA, the curved surface 253AC, and the outer circumferential surface 253AB of the electrolytic capacitor 253A, and with the bottom surface 413AA, the curved surface 413AC, and the inner circumferential surface 413AB of the depressed portion 413A.

The third heat dissipation material 433 having a higher thermal conductivity than air is in contact with the electrolytic capacitor 253A and the heat sink 40. Thus, the heat dissipation efficiency is higher than that when the third heat dissipation material 433 is not provided. The axial length and the outside diameter of the electrolytic capacitor 253A may have manufacturing errors. For example, the axial length of the electrolytic capacitor 253A has an error of approximately ±0.3 mm or ±0.5 mm, although being variable depending on the outside diameter. The outside diameter has an error of approximately ±0.5 mm. The position of the electrolytic capacitor 253A may deviate from a designed position due to a manufacturing error (deflection) of the board body 21 and an assembly error when the circuit board 20 is mounted on the heat sink 40.

The width C1 illustrated in FIG. 31 is preferably equal to or larger than a predetermined lower limit value (for example, 0.5 mm) and equal to or smaller than a predetermined upper limit value (for example, 1.5 mm) even when the manufacturing error in the axial length of the electrolytic capacitor 253A, the manufacturing error of the board body 21, and the assembly error have occurred. Setting the width C1 equal to or larger than the lower limit value makes it easier to interpose a predetermined amount of the third heat dissipation material 433 between the end surface 253AA and the bottom surface 413AA. As a result, the heat dissipation efficiency increases. Setting the width C1 equal to or smaller than the upper limit value reduces the amount of the third heat dissipation material 433 used for obtaining a predetermined heat dissipation efficiency of the electrolytic capacitor 253A.

The width C2 illustrated in FIG. 31 is preferably equal to or larger than a predetermined lower limit value (for example, 0.5 mm) and equal to or smaller than a predetermined upper limit value (for example, 1.5 mm) even when the manufacturing error in the outside diameter of the electrolytic capacitor 253A and the assembly error have occurred. Setting the width C2 equal to or larger than the lower limit value makes it easier to interpose a predetermined amount of the third heat dissipation material 433 between the outer circumferential surface 253AB and the inner circumferential surface 413AB. As a result, the heat dissipation efficiency increases. Setting the width C2 equal to or smaller than the upper limit value reduces the amount of the third heat dissipation material 433 used for obtaining the predetermined heat dissipation efficiency of the electrolytic capacitor 253A.

The width C3 illustrated in FIG. 31 is preferably equal to or larger than a predetermined lower limit value (for example, 0.5 mm) and equal to or smaller than a predetermined upper limit value (for example, 1.5 mm) even when the manufacturing errors in the axial length and the outside diameter of the electrolytic capacitor 253A, the manufacturing error of the board body 21, and the assembly error have occurred. Setting the width C3 equal to or larger than the lower limit value makes it easier to interpose a predetermined amount of the third heat dissipation material 433 between the curved surface 253AC and the curved surface 413AC. As a result, the heat dissipation efficiency increases. Setting the width C3 equal to or smaller than the upper limit value reduces the amount of the third heat dissipation material 433 used for obtaining the predetermined heat dissipation efficiency of the electrolytic capacitor 253A.

In the third modification described above, the depressed portion 413A and the electrolytic capacitor 253A accommodated in the depressed portion 413A have been described. This description is also applied to the depressed portion 413B and the electrolytic capacitor 253B accommodated in the depressed portion 413B. For example, in FIG. 31, the depressed portion 413A may be replaced with the depressed portion 413B, and the electrolytic capacitor 253A may be replaced with the electrolytic capacitor 253B.

While the first embodiment has been described above, the present invention is not limited to the above-described embodiment. While the configuration has been described in which the first raised portion 411 is separated from the second raised portions 412A and 412B, the first raised portion 411 may be connected so as to be integrated with the second raised portions 412A and 412B, for example.

Second Embodiment

In an embodiment of the present invention, the heat sink may be provided with a ring-shaped wall portion. A ring of the wall portion may be provided therein with the through-hole through which the shaft passes. With this configuration, the magnet provided at the anti-load side end of the shaft is surrounded by the wall portion.

Figure 32:
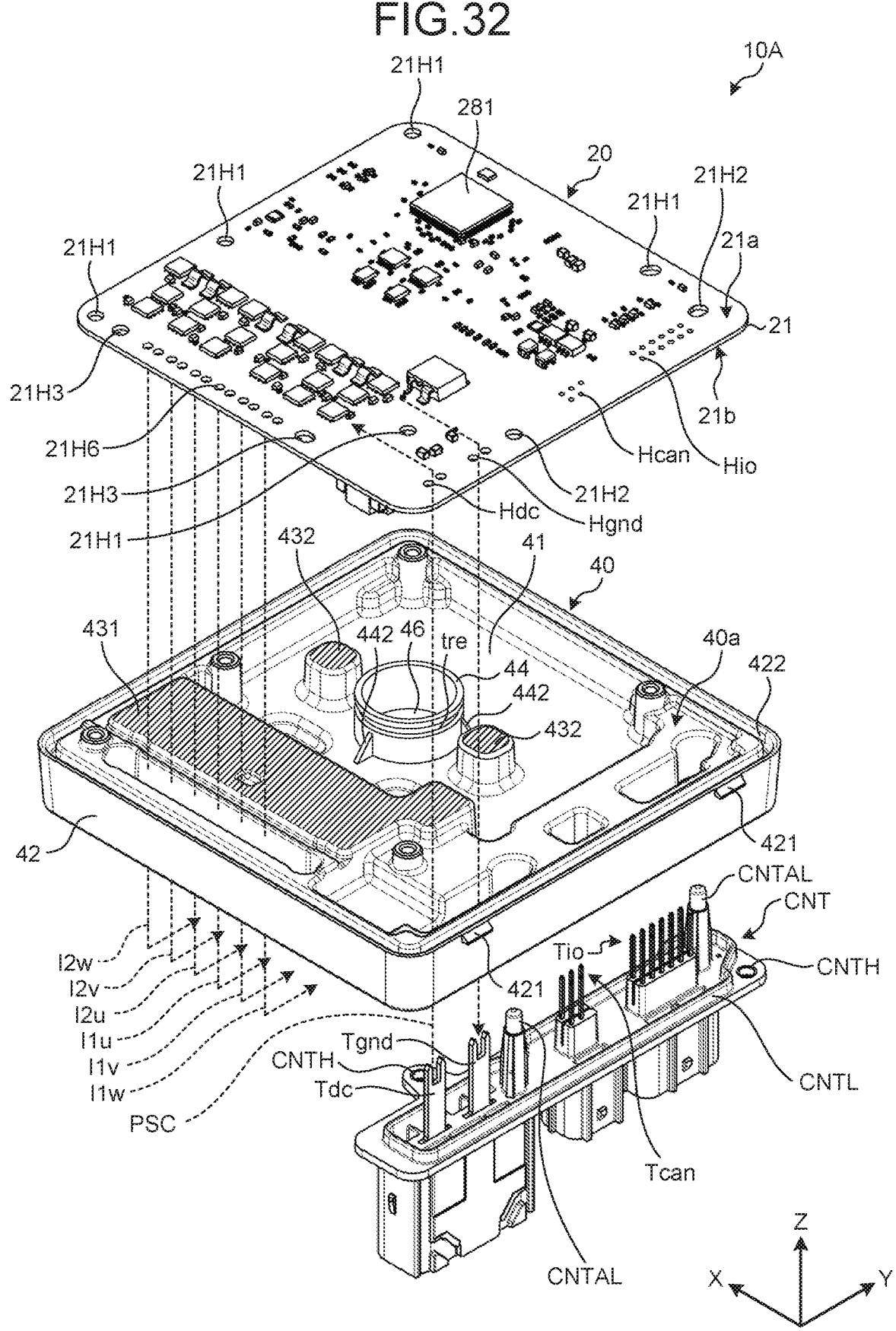
FIG. 32 is an exploded perspective view illustrating a configuration example of the ECU body according to a second embodiment of the present invention.

FIG. 32 is an exploded perspective view illustrating a configuration example of the ECU body according to a second embodiment of the present invention. Dotted lines in FIG. 32 represent the current paths from the power supply terminals Tdc and Tgnd through the ECU body 10A to the electric motor 30 (refer to FIG. 10). Also in the second embodiment, the ECU 10 (refer to FIG. 10) is provided with the ECU body 10A and the lid 50 (refer to FIG. 7). The ECU body 10A includes the circuit board 20, the heat sink 40 that supports the circuit board 20, and the connector CNT. The circuit board 20 and the connector CNT are mounted on the heat sink 40. The connector CNT is connected to the circuit board 20 from outside the heat sink 40. When viewed from the Z-axis direction, the connector CNT is disposed outside the electric motor 30.

Figure 33:
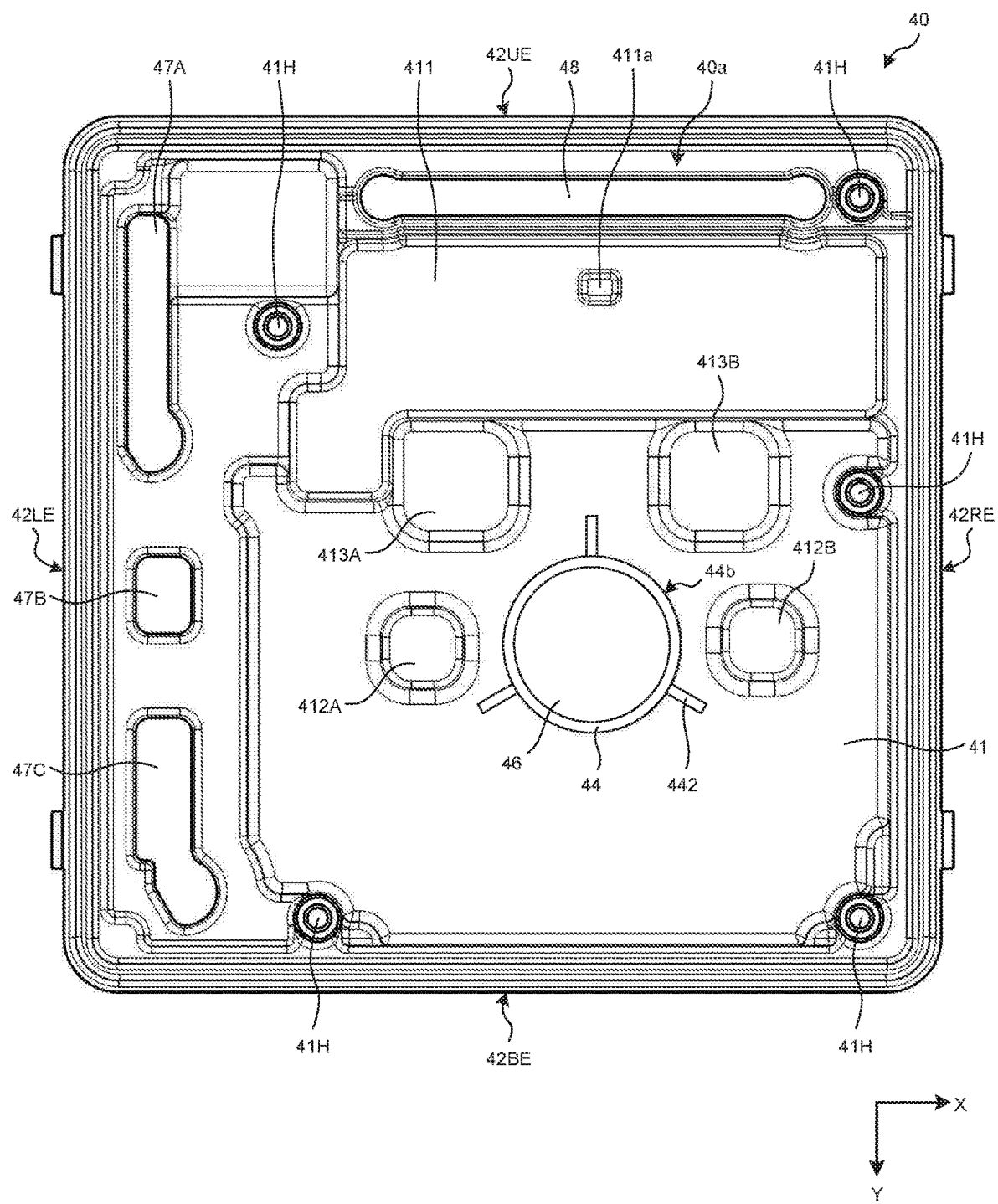
FIG. 33 is a front view illustrating a configuration example of the heat sink according to the second embodiment.
Figure 34:
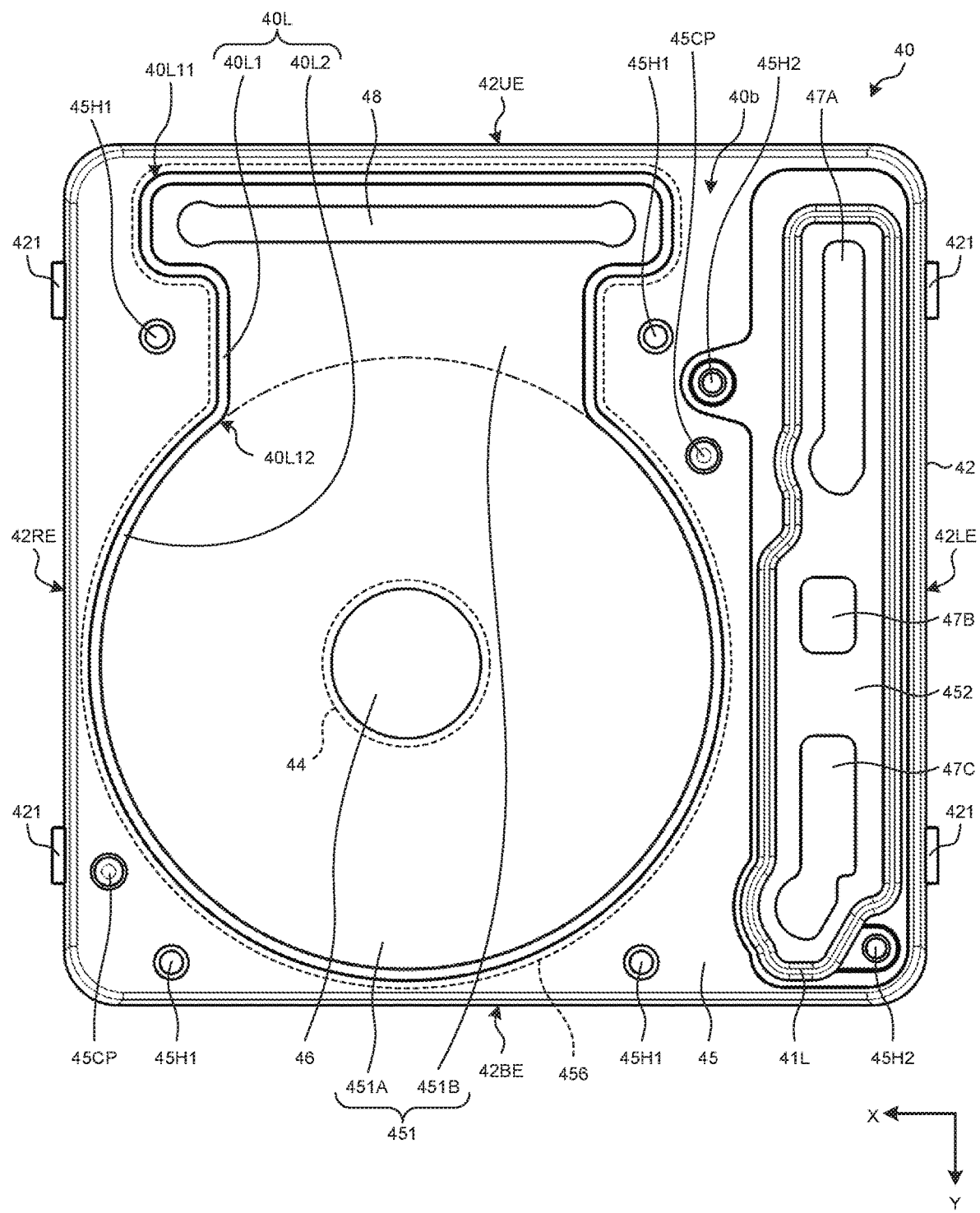
FIG. 34 is a rear view illustrating the configuration example of the heat sink according to the second embodiment.
Figure 35:
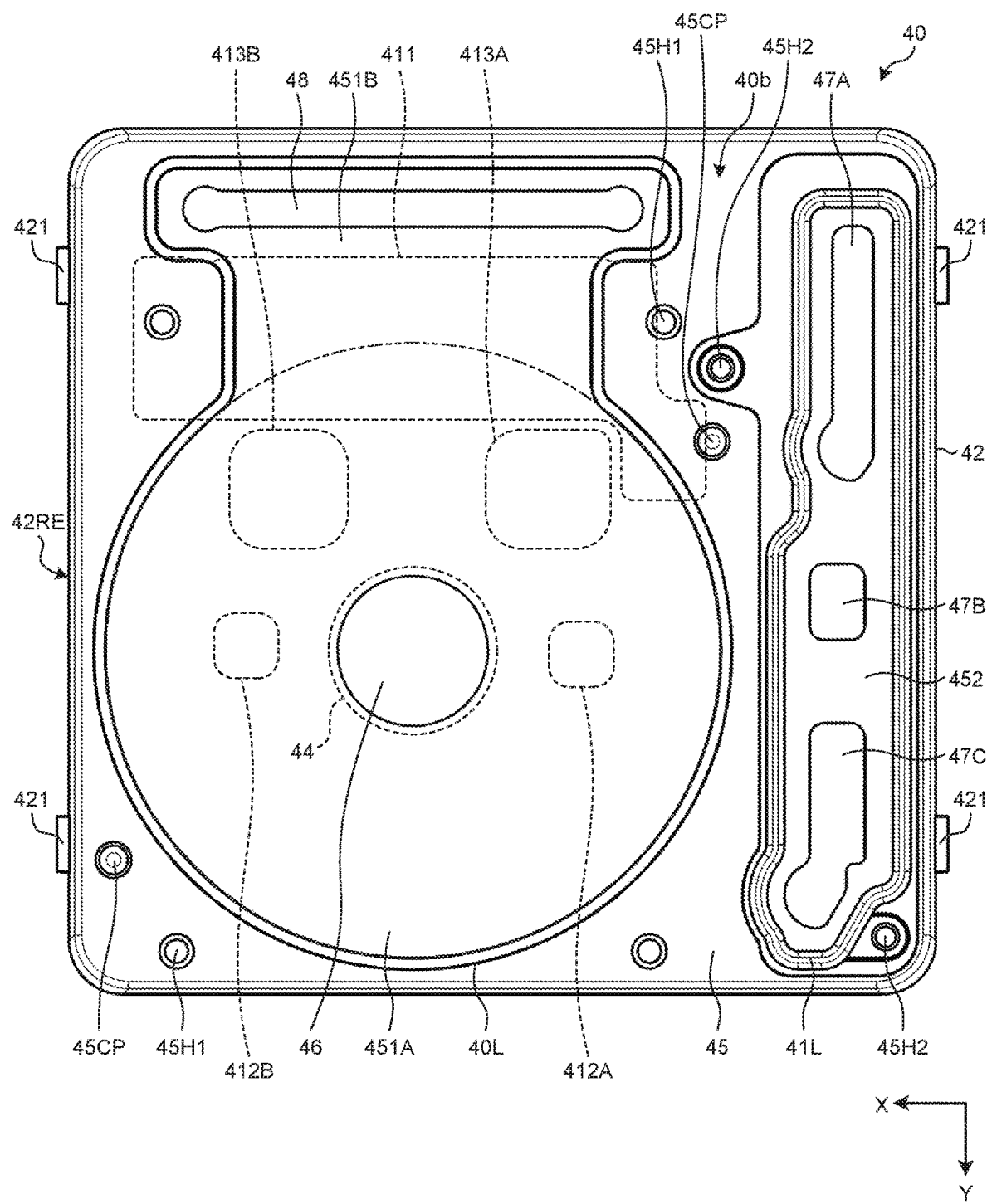
FIG. 35 is a perspective view illustrating the first raised portion, the second raised portions, and the depressed portions provided on the first surface side of the heat sink according to the second embodiment, when viewed through from the second surface side thereof.
Figure 36:
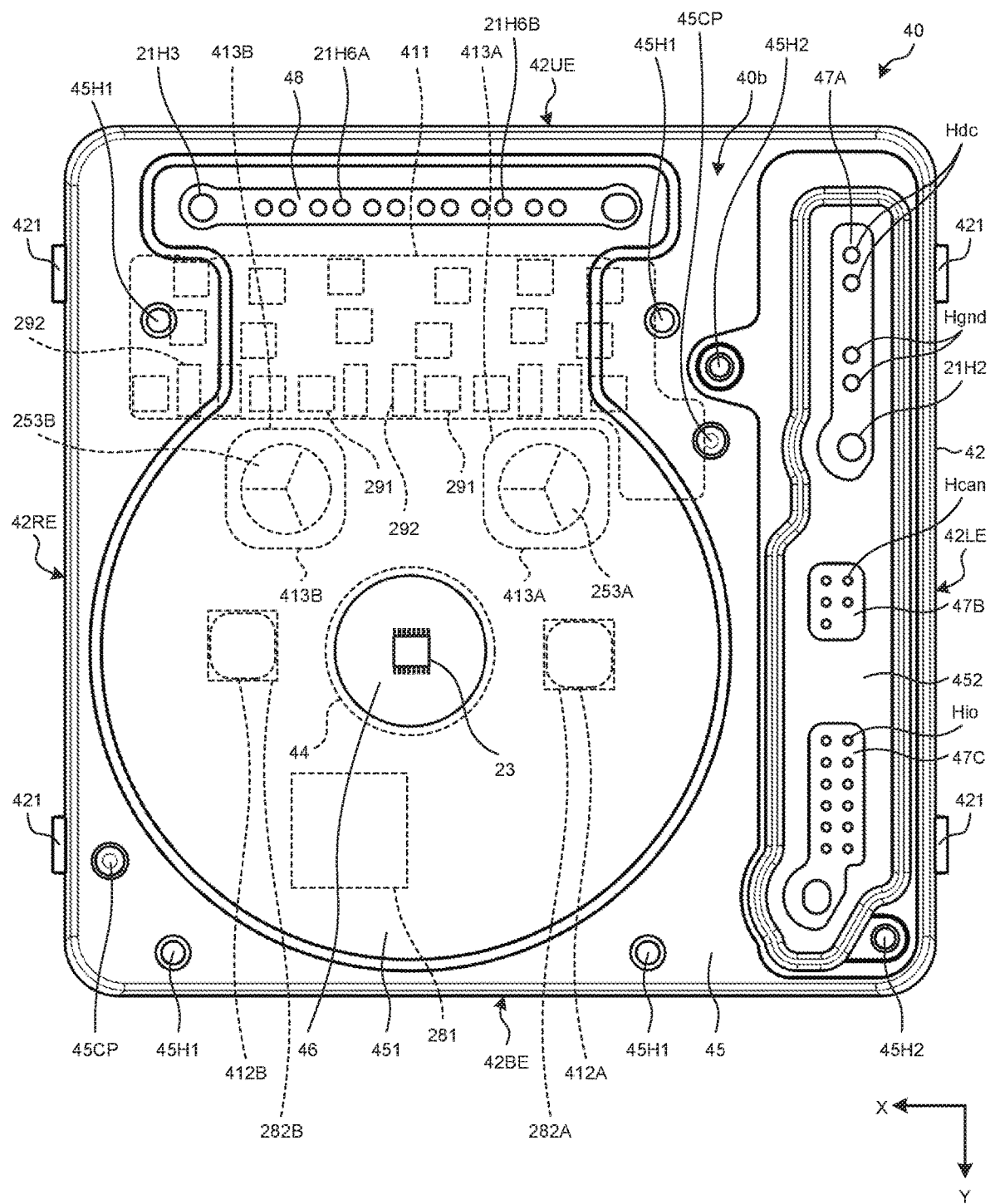
FIG. 36 is a perspective view illustrating the first raised portion, the second raised portions, and the depressed portions provided on the first surface side of the heat sink and the electronic components mounted on the circuit board according to the second embodiment, when viewed through from the second surface side of the heat sink.

FIG. 33 is a front view illustrating a configuration example of the heat sink according to the second embodiment. FIG. 34 is a rear view illustrating the configuration example of the heat sink according to the second embodiment. FIG. 35 is a perspective view illustrating the first raised portion, the second raised portions, and the depressed portions provided on the first surface side of the heat sink according to the second embodiment, when viewed from the second surface side thereof. FIG. 36 is a perspective view illustrating the first raised portion, the second raised portions, and the depressed portions provided on the first surface side of the heat sink and the electronic components mounted on the circuit board according to the second embodiment, when viewed from the second surface side of the heat sink.

As illustrated in FIGS. 32 to 36, the heat sink 40 includes a ring-shaped wall portion 44 and a plurality of ribs 442 provided at the bottom portion 41 of the first surface 40a. In the plan view from the axial direction Ax of the shaft 31 (Z-axis direction), the wall portion 44 surrounds the through-hole 46, and the inside of the ring of the wall portion 44 overlaps the through-hole 46. The wall portion 44 is provided along the outer circumference of the through-hole 46, and rises upward (toward the circuit board 20) from the bottom portion 41 of the first surface 40a. In the plan view from the Z-axis direction, the ring of the wall portion 44 has a perfectly circular shape. In the plan view from the Z-axis direction, the center of the ring of the wall portion 44 matches or substantially matches with the center of the through-hole 46. An outer circumferential surface 44b of the wall portion 44 is provided with a groove portion tre for fixing a cap 57 to be described later (refer to FIG. 38).

The ribs 442 connect the outer circumferential surface 44b of the wall portion 44 to the bottom portion 41 of the first surface 40a. In the plan view from the Z-axis direction, the ribs 442 are arranged at regular intervals around the wall portion 44.

The wall portion 44 and the ribs 442 are formed integrally with the heat sink 40. In the same way as the heat sink 40, the wall portion 44 and the ribs 442 are made of a metal, such as aluminum or copper. This configuration allows the wall portion 44 to block the magnetism between the inside and the outside of the ring of the wall portion 44.

Figure 37:
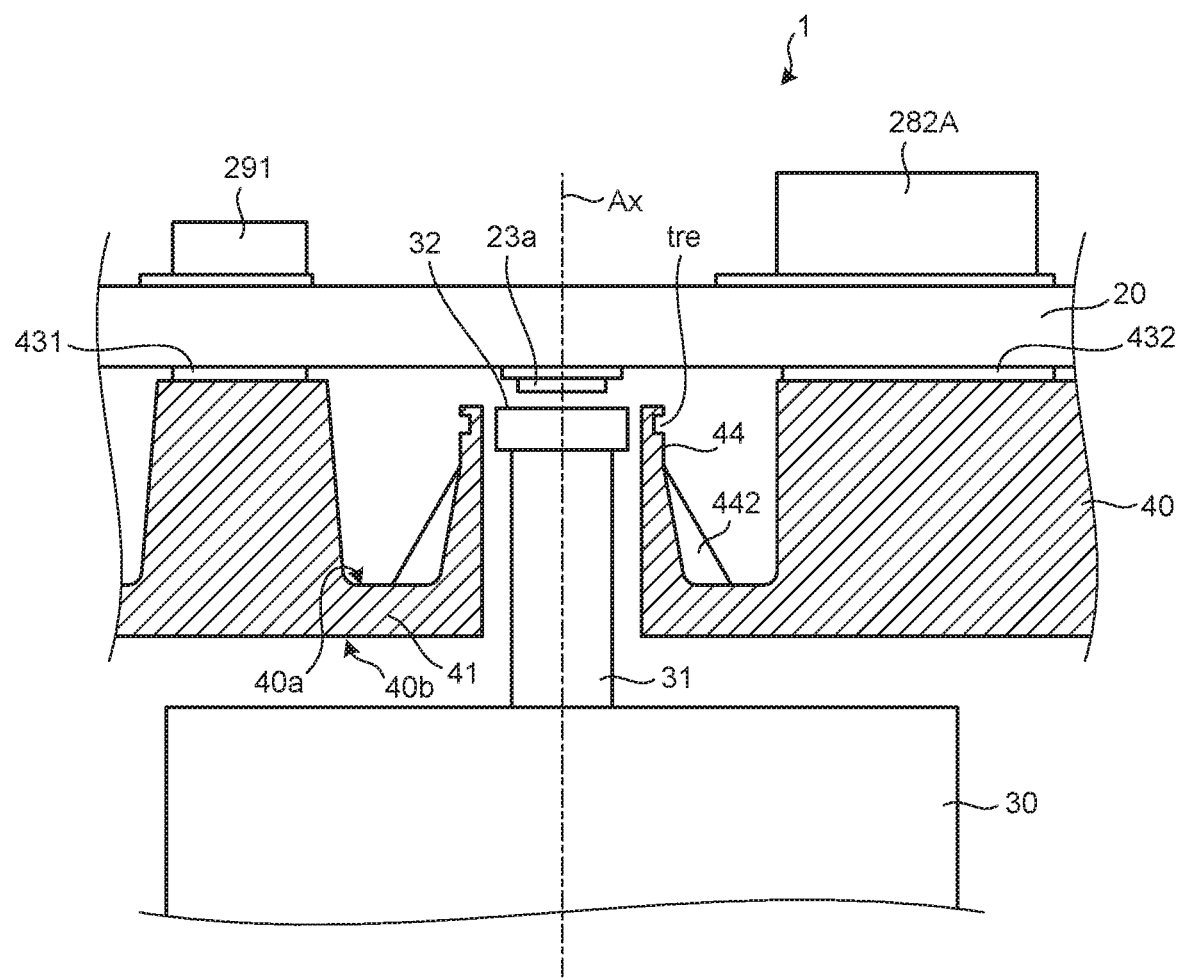
FIG. 37 is a sectional view illustrating a configuration example of the electric drive device according to the second embodiment.
Figure 38:
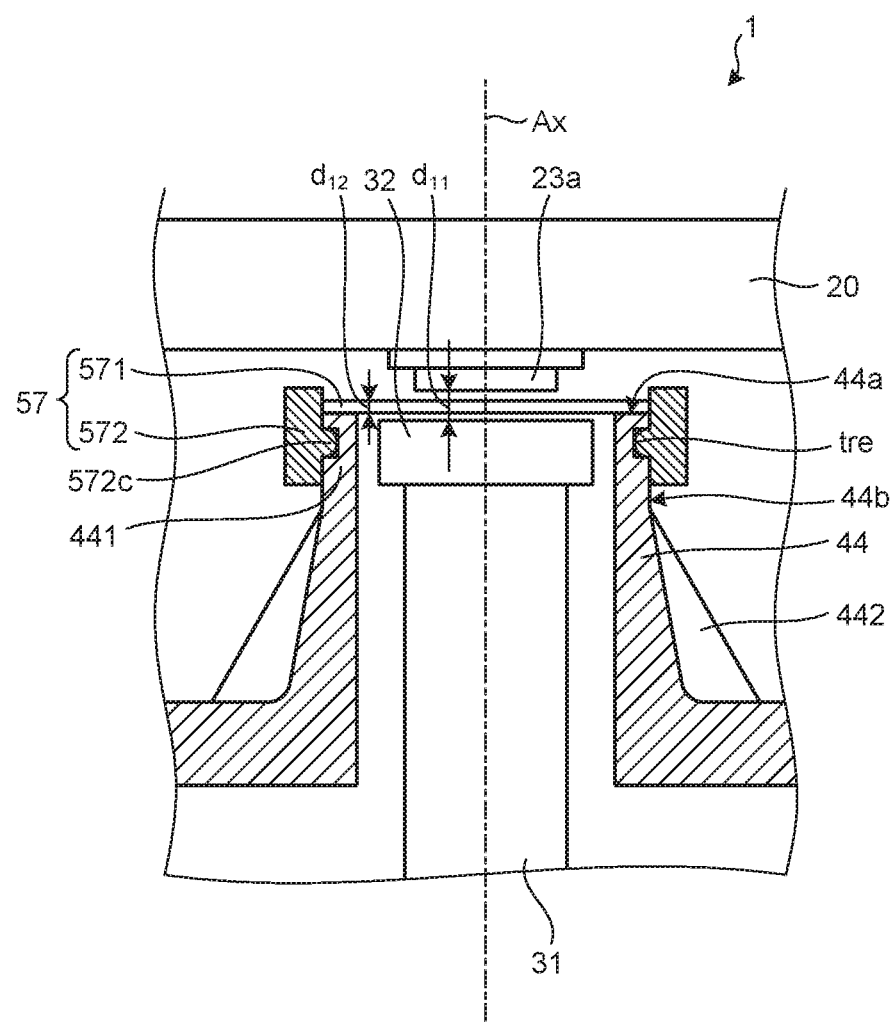
FIG. 38 is a sectional view illustrating a wall portion and a periphery thereof in FIG. 37 in an enlarged scale.
Figure 39:
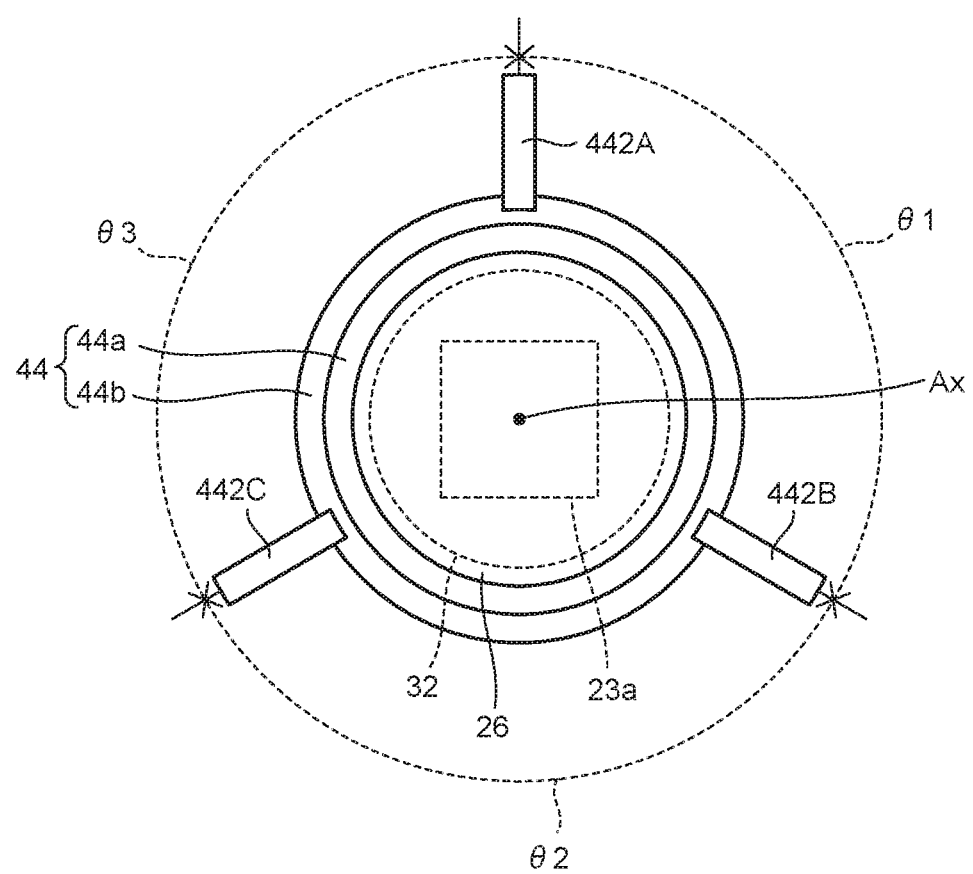
FIG. 39 is a plan view illustrating a configuration example of the wall portion and a plurality of ribs according to the second embodiment.

FIG. 37 is a sectional view illustrating a configuration example of the electric drive device according to the second embodiment. FIG. 38 is a sectional view illustrating the wall portion and the periphery thereof in FIG. 37 in an enlarged scale. FIG. 38 illustrates a state in which the cap is mounted on the wall portion. FIG. 39 is a plan view illustrating a configuration example of the wall portion and the ribs according to the second embodiment. In the plan view from the Z-axis direction in FIG. 39, the magnet 32 and the rotation angle sensor 23a are indicated by dotted lines to illustrate positional relations of the wall portion 44 with the magnet 32 and the rotation angle sensor 23a.

As illustrated in FIGS. 37 and 38, the outer circumferential surface 44b of the wall portion 44 is provided with the groove portion tre. The wall portion 44 surrounds the magnet 32 from lateral sides thereof. A top surface 44a of the wall portion 44 is located closer to the circuit board 20 than the magnet 32. The cap 57 is mounted on an end portion (hereinafter "upper end portion") 441 on the circuit board 20 side of the wall portion 44.

As illustrated in FIG. 39, in the second embodiment, for example, three ribs 442A, 442B, and 442C are arranged as the ribs 442. The three ribs 442A, 442B, and 442C are arranged at regular intervals around the wall portion 44. For example, in the plan view from the Z-axis direction, the center of the ring of the wall portion 44 overlaps the axial direction Ax of the shaft 31. The three ribs 442A, 442B, and 442C are arranged at regular intervals along a perfect circle centered on the axial direction Ax. The rib 442B is arranged in a position apart from the rib 442A by an angle θ1 in the circumferential direction. The rib 442C is arranged in a position apart from the rib 442B by an angle θ2 in the circumferential direction. The rib 442A is arranged in a position apart from the rib 442C by an angle θ3 in the circumferential direction. In the example illustrated in FIG. 39, θ1=θ2=θ3=120 degrees.

Figure 40A:
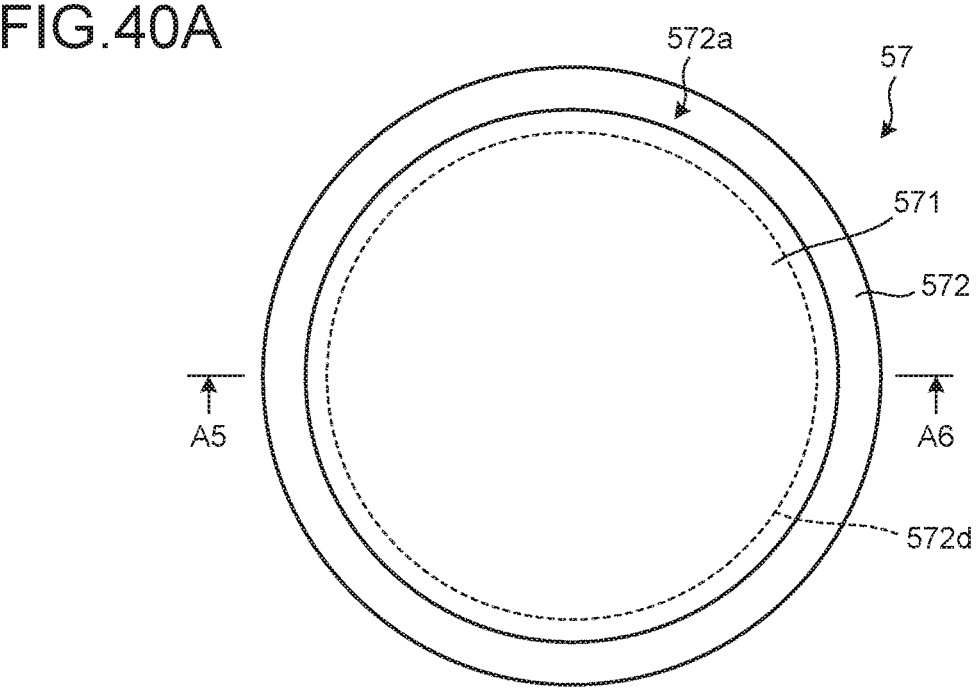
FIG. 40A is a plan view illustrating a configuration example of a cap according to the second embodiment.
Figure 40B:
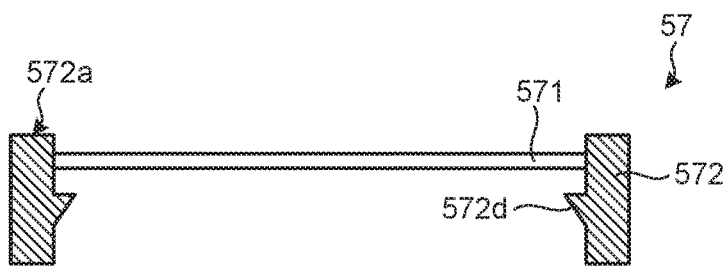
FIG. 40B is a sectional view illustrating the configuration example of the cap according to the second embodiment.
Figure 40C:
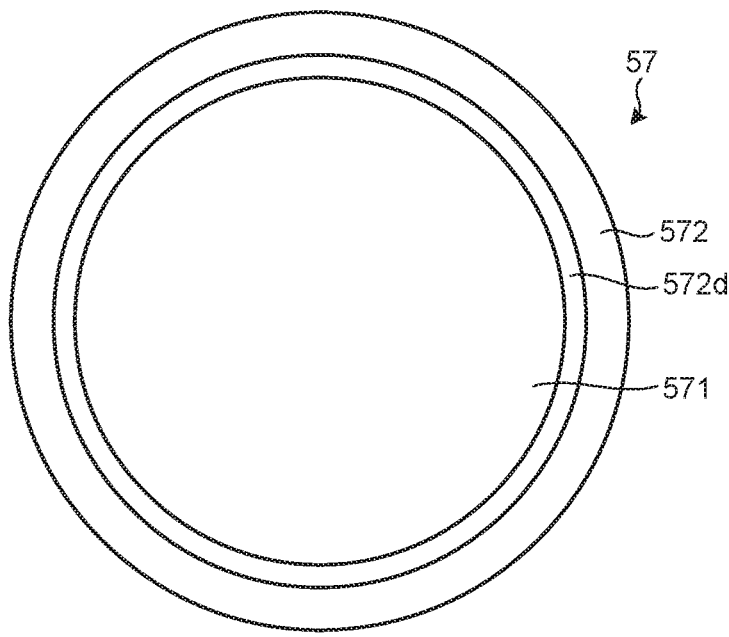
FIG. 40C is a bottom view illustrating the configuration example of the cap according to the second embodiment.

FIG. 40A is a plan view illustrating a configuration example of the cap according to the second embodiment. FIG. 40B is a sectional view illustrating the configuration example of the cap according to the second embodiment. FIG. 40B illustrates the sectional view obtained by cutting the plan view illustrated in FIG. 40A along line A5-A6. FIG. 40C is a bottom view illustrating the configuration example of the cap according to the second embodiment. As illustrated in FIGS. 40A to 40C, the cap 57 includes a top board portion 571 and a rim portion 572 that supports the outer circumference of the top board portion 571. As illustrated in FIG. 38 (or FIGS. 40A to 40C), the rim portion 572 has a projecting portion 572c (or a projecting portion 572d) projecting to the inside of the cap 57. The top board portion 571 is formed integrally with the rim portion 572 and the projecting portion 572c (or the projecting portion 572d).

The projecting portion 572c differs from the projecting portion 572d only in shape. Unlike the projecting portion 572c, a lower side surface (surface on a side facing the first surface 40a of the heat sink 40 (refer to FIG. 37)) of the projecting portion 572d is an inclined plane, having a shape easily fittable to the groove portion tre. The projecting portion included in the rim portion 572 may be either the projecting portion 572c or the projecting portion 572d.

The material of the cap 57 is a resin. For example, the material of the cap 57 is an elastic resin. Examples of the elastic resin include an elastomer-based resin having a rubber elasticity. This material allows the rim portion 572 and the projecting portion 572c or 572d to be elastically deformable, and thereby facilitates detachable mounting of the cap 57 on the wall portion 44. The material of the cap 57 may be a vinyl resin or a polyester resin.

The material of the top board portion 571 may differ from the material of the rim portion 572 and the projecting portion 572c or 572d. For example, the top board portion 571 may be a film made of a vinyl resin or a polyester resin, and the rim portion 572 and the projecting portion 572c or 572d may be of an elastomer-based resin.

The material or materials of the cap 57 may be transparent and colorless or transparent and colored. In particular, the top board portion 571 is preferably transparent. The term "transparent" refers to having a light transmitting property (property to transmit visible light). When the top board portion 571 is transparent, a worker (or manufacturing equipment) can observe the inside of the ring of the wall portion 44 through the cap 57.

As illustrated in FIG. 38, once the cap 57 is put over the upper end portion 441 of the wall portion 44, and the top board portion 571 comes in contact with the top surface 44a of wall portion 44, the projecting portion 572c engages with the groove portion tre. In this way, the cap 57 is detachably mounted on the wall portion 44. Once the cap 57 is mounted on the wall portion 44, and the circuit board 20 is mounted on the first surface 40a side of the heat sink 40, the top board portion 571 is placed in a state of being interposed between the magnet 32 and the rotation angle sensor 23a. In this state, the top board portion 571 is separated from both the rotation angle sensor 23a and the magnet 32. When $d_{11}$ denotes the separation distance between the rotation angle sensor 23a and the magnet 32, and $d_{12}$ denotes the thickness of the top board portion 571, the separation distance $d_{11}$ is larger than the thickness $d_{12}$ ($d_{11} > d_{12}$). The thickness $d_{12}$ of the top board portion 571 is, for example, several tens of micrometers or several hundred micrometers.

As described above, the electric drive device 1 according to the second embodiment includes the heat sink 40 and the ring-shaped wall portion 44. The heat sink 40 has the first surface 40a and the second surface 40b located on the opposite side of the first surface 40a, and supports the circuit board 20 on the first surface 40a side. The heat sink 40 has the through-hole 46 that is provided between the first surface 40a and the second surface 40b, and through which the shaft 31 passes. The wall portion 44 is disposed between the first surface 40a and the circuit board 20. In the plan view from the axial direction Ax of the shaft 31 (Z-axis direction), the through-hole 46 is located in the ring of the wall portion 44. With this configuration, the wall portion 44 has the end portion on the circuit board 20 side thereof, and the cap 57 can be detachably mounted on the end portion. This configuration can prevent foreign matter from getting into the ring of the wall portion 44 from the first surface 40a side of the heat sink 40. Since the magnet 32 is located inside the ring of the wall portion 44, the foreign matter is prevented from adhering to the magnet 32.

Assume a case where the electric motor 30 is manufactured in a clean room. In this case, the electric motor 30 is manufactured in the clean room; the manufactured electric motor 30 is mounted on the heat sink 40; and the cap 57 is mounted on the wall portion 44. This process can keep the inside of the ring of the wall portion 44 in the environment of the clean room even when the electric motor 30 has been carried out of the clean room. Since the cap 57 is mounted on the wall portion 44, the process proceeds to an assembly process of the ECU 10 while the inside of the ring of the wall portion 44 is kept in the clean state (low contamination state). The assembly process of the ECU 10 includes, for example, assembling the ECU body 10A, and mounting the lid 50 on the ECU body 10A.

In the assembly process of the ECU 10, the worker (or manufacturing equipment) may or may not remove the cap 57. Since the cap 57 is detachably mounted on the wall portion 44, the cap 57 can be either removed from the wall portion 44 or left on the wall portion 44.

The cap 57 is transparent. Accordingly, the worker (or manufacturing equipment) can observe the inside of the ring of the wall portion 44 through the cap 57. The cap 57 keeps the inside of the ring of the wall portion 44 in the clean state, and while this state is kept, the worker (or manufacturing equipment) can observe the inside of the ring of the wall portion 44, and check the appearance of the magnet 32 located in the ring.

Based on, for example, the result of the appearance inspection mentioned above, the worker (or manufacturing equipment) may once remove the cap 57 from the wall portion 44, make correction processing or the like, and then mount the cap 57 on the wall portion 44. Such processing can be made because the cap 57 is mountable on and removable from the wall portion 44.

The electric drive device 1 is further provided with the ribs 442 that connect the outer circumferential surface 44b of the wall portion 44 to the first surface 40a. This configuration can increase strength of the connection between the wall portion 44 and the heat sink 40.

The ribs 442 are arranged at regular intervals along the circumference of the wall portion 44. This arrangement can prevent the strength of the connection between the wall portion 44 and the heat sink 40 from being biased on the circumference of the wall portion 44.

The electric drive device 1 is provided with the cap 57. The cap 57 is mounted on the end portion on the circuit board 20 side of the wall portion 44. The cap 57 includes the top board portion 571 facing the magnet 32 and the rim portion 572 supporting the outer circumference of the top board portion 571. The material of the top board portion 571 is a resin. Accordingly, a magnetic flux generated from the magnet 32 can pass through the top board portion 571 of the cap 57, and the rotation angle sensor 23a can detect the magnetic flux. The cap 57 need not be removed from the end portion of the wall portion 44 in order to let the magnetic flux pass. As a result, no process is required to remove the cap 57 in the assembly process of the electric drive device 1. Thus, the number of processes can be prevented from increasing. After the circuit board 20 is mounted on the heat sink 40, and the electric drive device 1 is completed, the cap 57 remains being mounted on the wall portion 44. As a result, the foreign matter continues to be prevented from adhering to the magnet 32.

The wall portion 44 includes the groove portion tre provided on the outer circumferential surface 44b. The rim portion 572 of the cap 57 has the projecting portion 572c provided in a position that overlaps the groove portion tre. The projecting portion 572c engages with the groove portion tre. This engagement fixes the cap 57 to the wall portion 44.

The wall portion 44 and the ribs 442 are formed integrally with the heat sink 40. In the same way as the heat sink 40, the wall portion 44 and the ribs 442 are made of a metal, such as aluminum or copper. With this configuration, no boundary of connection is present between the wall portion 44 and the heat sink 40, between the ribs 442 and the heat sink 40, and between the wall portion 44 and the ribs 442. Consequently, the strength of the connection between the wall portion 44 and the heat sink 40 can be increased. The material of the wall portion 44 is the same as that of the heat sink 40, and is, for example, a metal. When the material of the wall portion 44 is a metal, the magnetism is interrupted between the inside and the outside of the ring of the wall portion 44. As a result, the inside of the ring of the wall portion 44 can be prevented from being affected by the magnetic fields generated by the currents flowing in the respective wires of the first coil wiring 321A, 322A, and 323A and the second coil wiring 321B, 322B, and 323B. The rotation angle sensor 23a is further reduced in errors of detection values thereof caused by the magnetic fields around the wiring, and thus is further improved in detection accuracy in rotation angle.

Modifications of Second Embodiment

Figure 41:
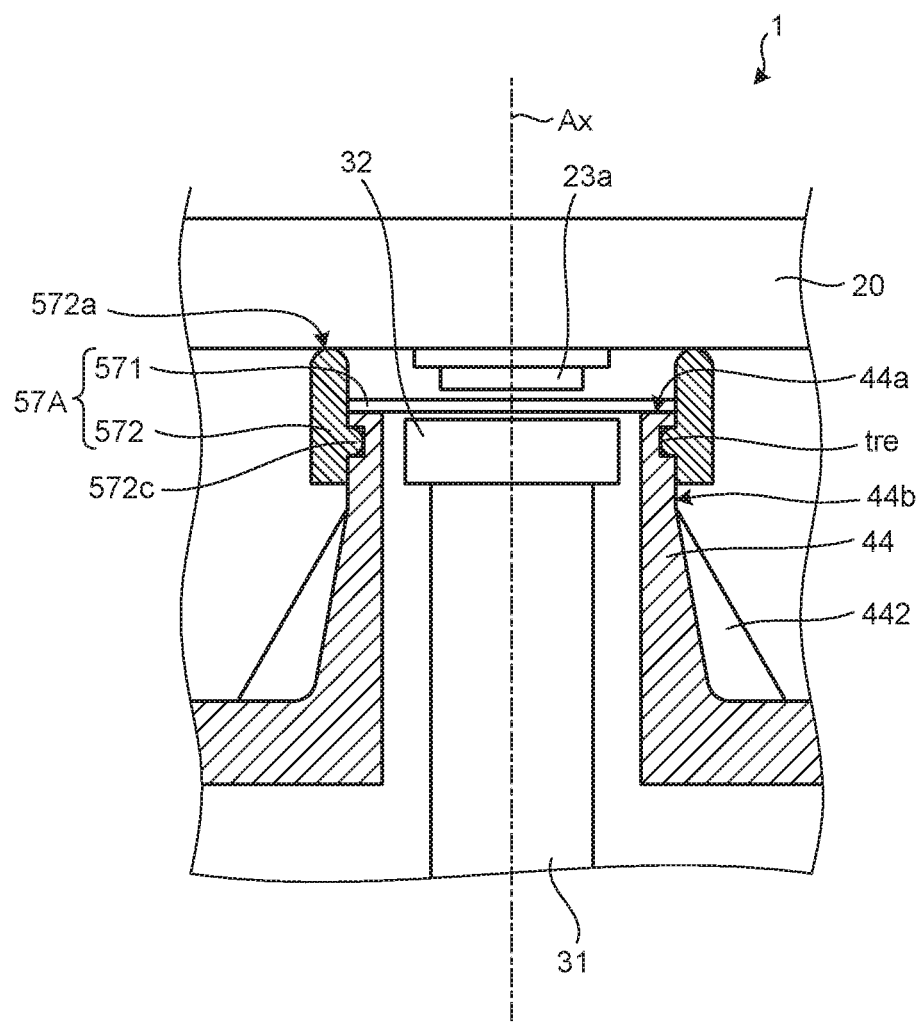
FIG. 41 is a sectional view illustrating a configuration of a cap according to a first modification of the second embodiment.

FIG. 41 is a sectional view illustrating a configuration of a cap according to a first modification of the second embodiment. As illustrated in FIG. 41, a cap 57A according to the first modification includes the top board portion 571 and the rim portion 572 that supports the outer circumference of the top board portion 571. The rim portion 572 has the projecting portion 572c projecting to the inside of the cap 57A.

In the first modification, once the cap 57A is mounted on the wall portion 44, and the circuit board 20 is mounted on the first surface 40a side of the heat sink 40, a top surface 572a of the rim portion 572 comes in contact with the circuit board 20. For example, once the screws are inserted in the through-holes 21H1 of the circuit board 20 (refer to FIG. 32), and the circuit board 20 is fastened to the heat sink 40, the circuit board 20 presses the top surface 572a of the rim portion 572, and the circuit board 20 comes in tight contact with the top surface 572a. As a result, the circuit board 20 is supported by both the heat sink 40 and the cap 57. Accordingly, the circuit board 20 is prevented from vibrating relative to the heat sink 40.

The rotation angle sensor 23a is mounted on the circuit board 20. Thus, the circuit board 20 is prevented from vibrating, whereby the rotation angle sensor 23a is also prevented from vibrating. Accordingly, the separation distance $d_{11}$ between the magnet 32 and the rotation angle sensor 23a (refer to FIG. 38) can be kept constant. As a result, the rotation angle sensor 23a can accurately detect the rotation angle of the magnet. The material of the rim portion 572 may be a resin. The rim portion 572 of a resin can absorb the vibration of the circuit board 20, thereby enhancing the anti-vibration effect of the circuit board 20.

Figure 42:
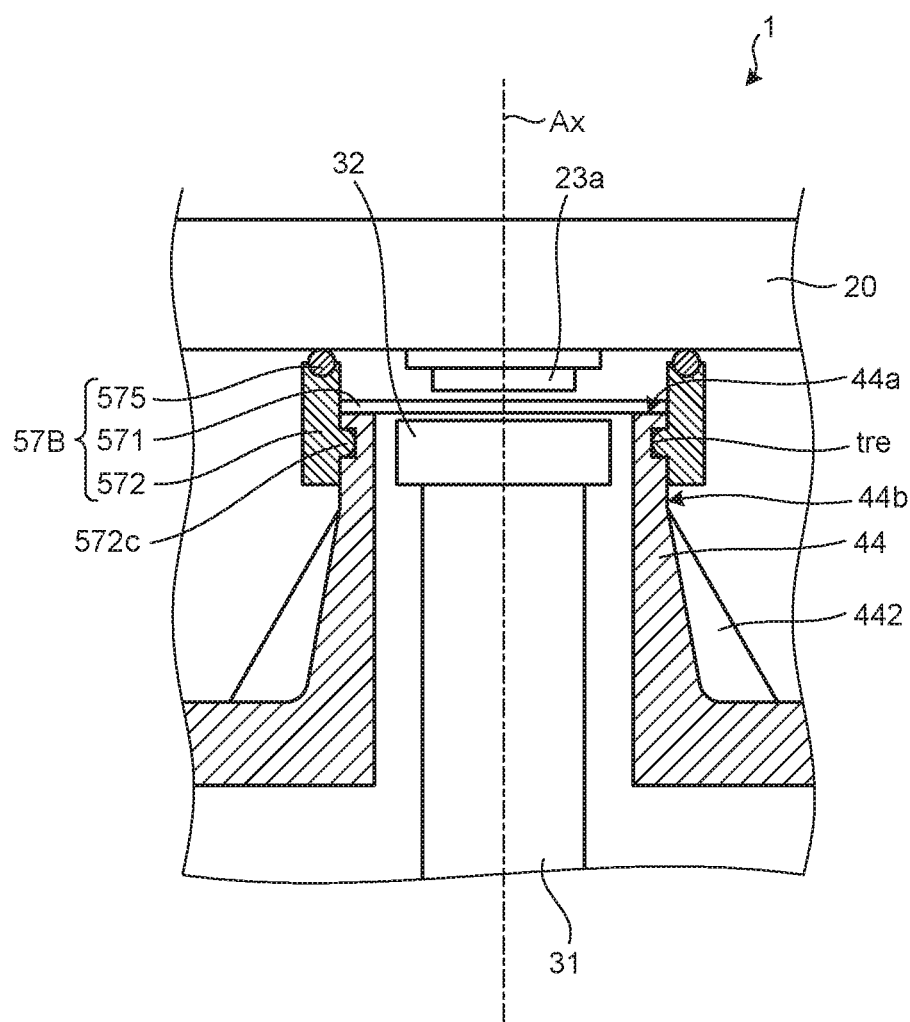
FIG. 42 is a sectional view illustrating a configuration of a cap according to a second modification of the second embodiment.

FIG. 42 is a sectional view illustrating a configuration of a cap according to a second modification of the second embodiment. As illustrated in FIG. 42, a cap 57B according to the second modification includes the top board portion 571, the rim portion 572 that supports the outer circumference of the top board portion 571, and an elastic ring 575 supported on the top surface 572a of the rim portion 572 (refer to FIGS. 43A to 43C). The material of the elastic ring 575 is, for example, an insulating resin. The rim portion 572 has the projecting portion 572c projecting to the inside of the cap 57B. In the second modification, once the cap 57B is mounted on the wall portion 44, and the circuit board 20 is mounted on the first surface 40a side of the heat sink 40, the circuit board 20 presses the elastic ring 575 onto the first surface 40a side of the heat sink 40. As a result, the elastic ring 575 comes in tight contact with the circuit board 20 and the rim portion 572. The elastic ring 575 is, for example, an O-ring.

Figure 43A:
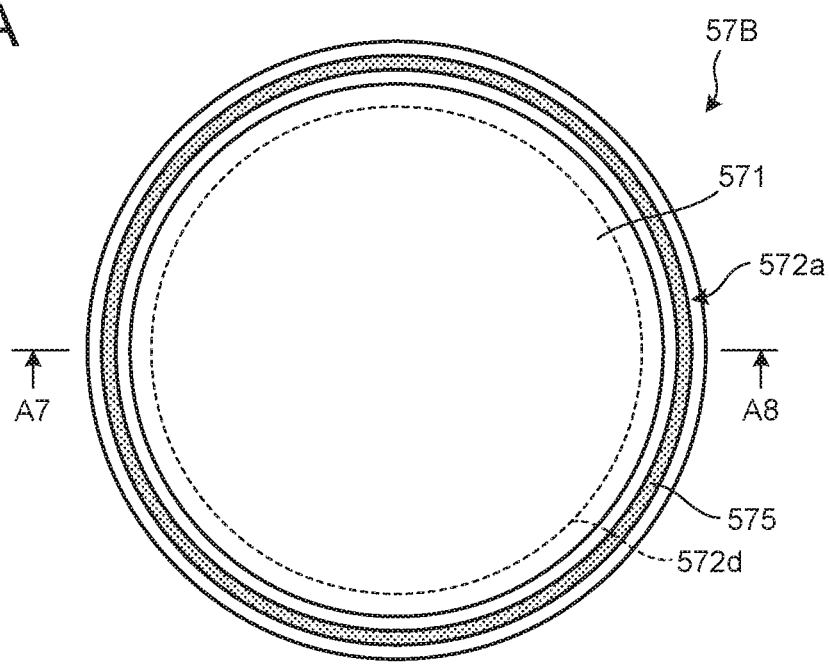
FIG. 43A is a plan view illustrating the configuration of the cap according to the second modification of the second embodiment.
Figure 43B:
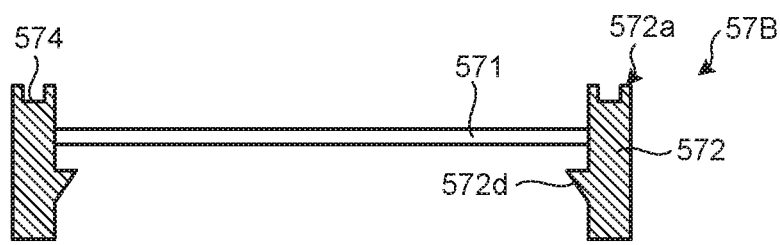
FIG. 43B is a sectional view illustrating the configuration of the cap according to the second modification of the second embodiment.
Figure 43C:
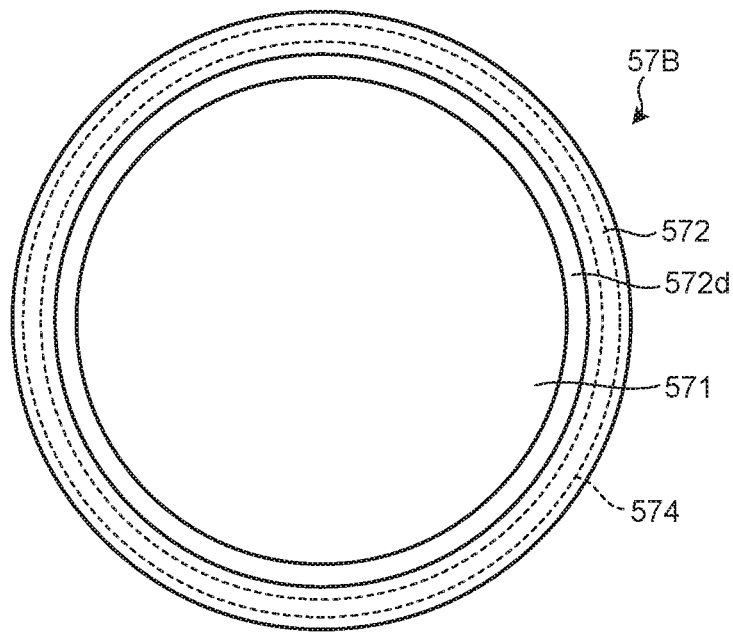
FIG. 43C is a bottom view illustrating the configuration of the cap according to the second modification of the second embodiment.

FIG. 43A is a plan view illustrating the configuration of the cap according to the second modification of the second embodiment. FIG. 43B is a sectional view illustrating the configuration of the cap according to the second modification of the second embodiment. FIG. 43B illustrates the sectional view obtained by cutting the plan view illustrated in FIG. 43A along line A7-A8. FIG. 43C is a bottom view illustrating the configuration of the cap according to the second modification of the second embodiment. FIG. 43A illustrates a state in which the elastic ring 575 is fitted in a groove portion 574 of the cap 57B according to the second modification. As illustrated in FIGS. 43A to 43C, the top surface 572a of the rim portion 572 of the cap 57B is provided with the groove portion 574. In the plan view from the Z-axis direction, the groove portion 574 has a ring shape. The elastic ring 575 is fitted in the ring-shaped groove portion 574.

In the second modification, once the circuit board 20 is mounted on the first surface 40a side of the heat sink 40, the elastic ring 575 comes in contact with the circuit board 20. For example, once the screws are inserted in the through-holes 21H1 of the circuit board 20 (refer to FIG. 32), and the circuit board 20 is fastened to the heat sink 40, the circuit board 20 presses the elastic ring 575, and the circuit board 20 comes in tight contact with the elastic ring 575. As a result, the circuit board 20 is supported by both the heat sink 40 and the cap 57B. Accordingly, the circuit board 20 is prevented from vibrating relative to the heat sink 40. The elastic ring 575 can absorb the vibration of the circuit board 20, so that the anti-vibration effect of the circuit board 20 can be enhanced.

Figure 44A:
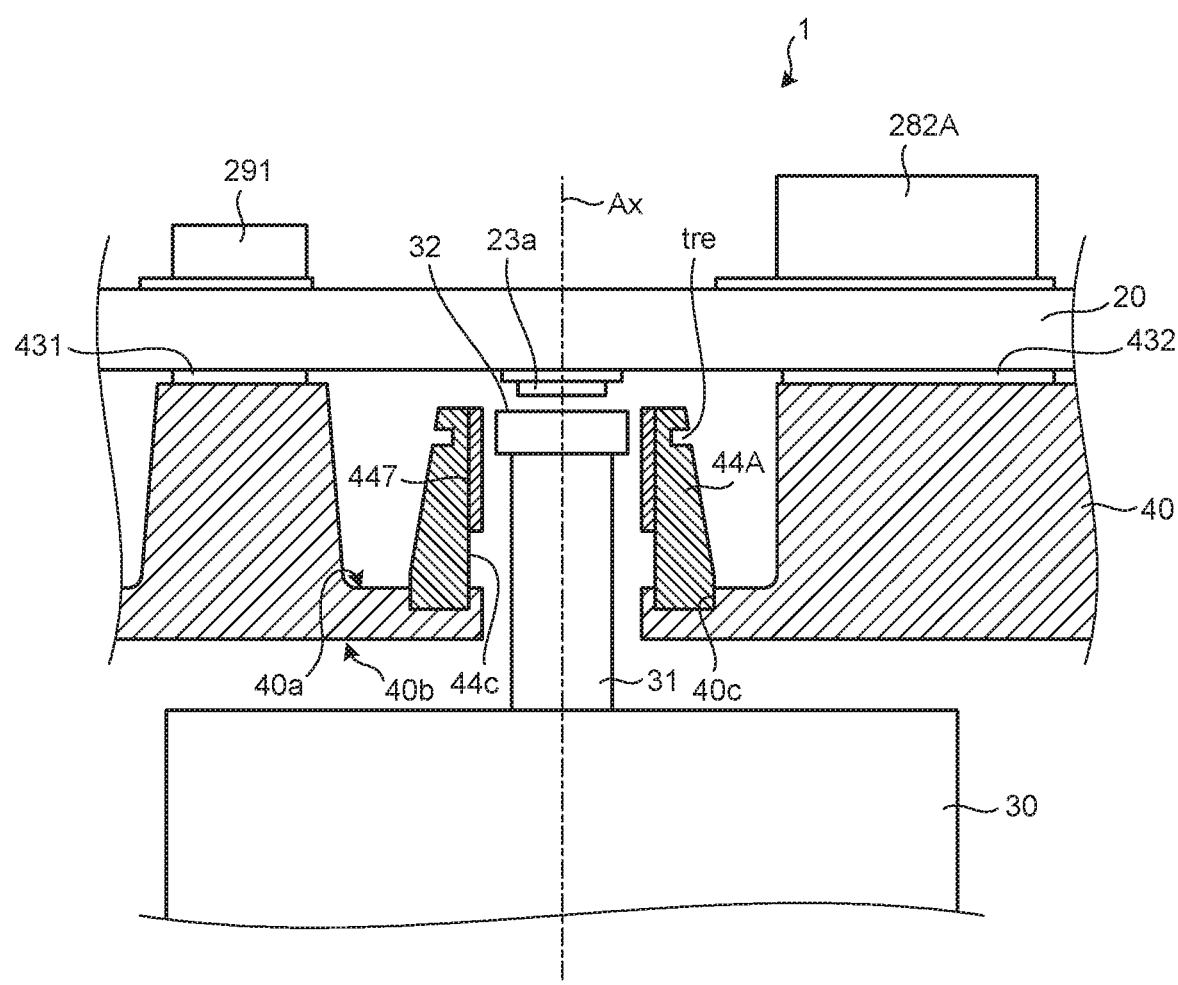
FIG. 44A is a sectional view illustrating a wall portion and a periphery thereof according to a third modification of the second embodiment.
Figure 44B:
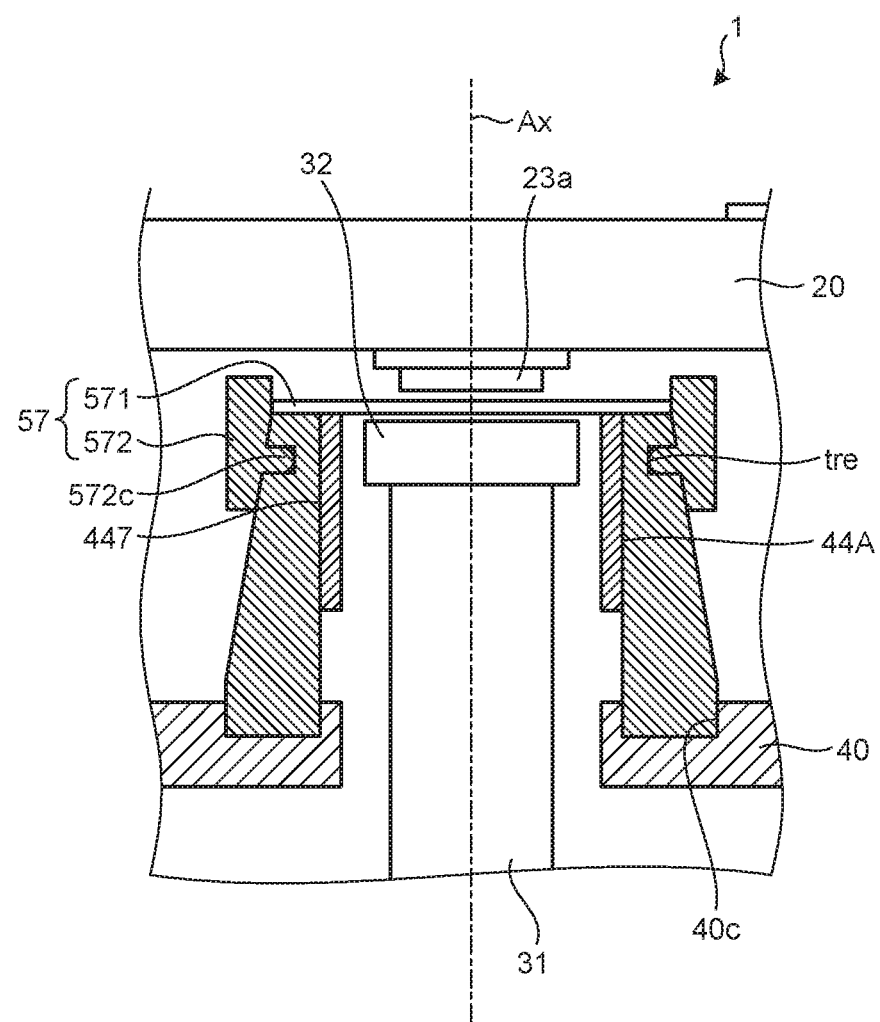
FIG. 44B is a sectional view illustrating a state in which the cap is mounted on the wall portion according to the third modification of the second embodiment.

FIG. 44A is a sectional view illustrating a wall portion and a periphery thereof according to a third modification of the second embodiment. FIG. 44B is a sectional view illustrating a state in which the cap is mounted on the wall portion according to the third modification of the second embodiment. In the third modification, the heat sink and the wall portion may be provided separately from each other. For example, in the third modification, as illustrated in FIG. 44A, the bottom portion 41 of the first surface 40a of the heat sink 40 is provided with a depressed portion 40c. A bottom portion of a wall portion 44A according to the third modification is fitted in the depressed portion 40c. As a result, the wall portion 44A is fixed to the heat sink 40. Such a configuration also allows the cap 57 to be mounted on the wall portion 44A, as illustrated in FIG. 44B. The cap 57 can prevent the foreign matter from getting into the ring of the wall portion 44A from the first surface 40a side of the heat sink 40. As a result, the foreign matter is prevented from adhering to the magnet 32.

In the third modification, the heat sink 40 and the wall portion 44A can be separately manufactured. Accordingly, the heat sink 40 can have a simpler shape. This makes it easier to manufacture the heat sink 40 using, for example, a mold.

The material of the wall portion 44A may be a metal, such as aluminum or copper, or may be a resin, such as an engineering plastic. When the material of the wall portion 44A is a resin, the wall portion 44A can be provided by injection molding. Consequently, the wall portion 44A can be easily manufactured.

As illustrated in FIGS. 44A and 44B, a magnetic shielding layer 447 may be pasted or applied onto an inner circumferential surface 44c of the wall portion 44A. This configuration blocks the magnetism between the inside and the outside of the wall portion 44A even when the wall portion 44A is made of a resin.

Figure 45:
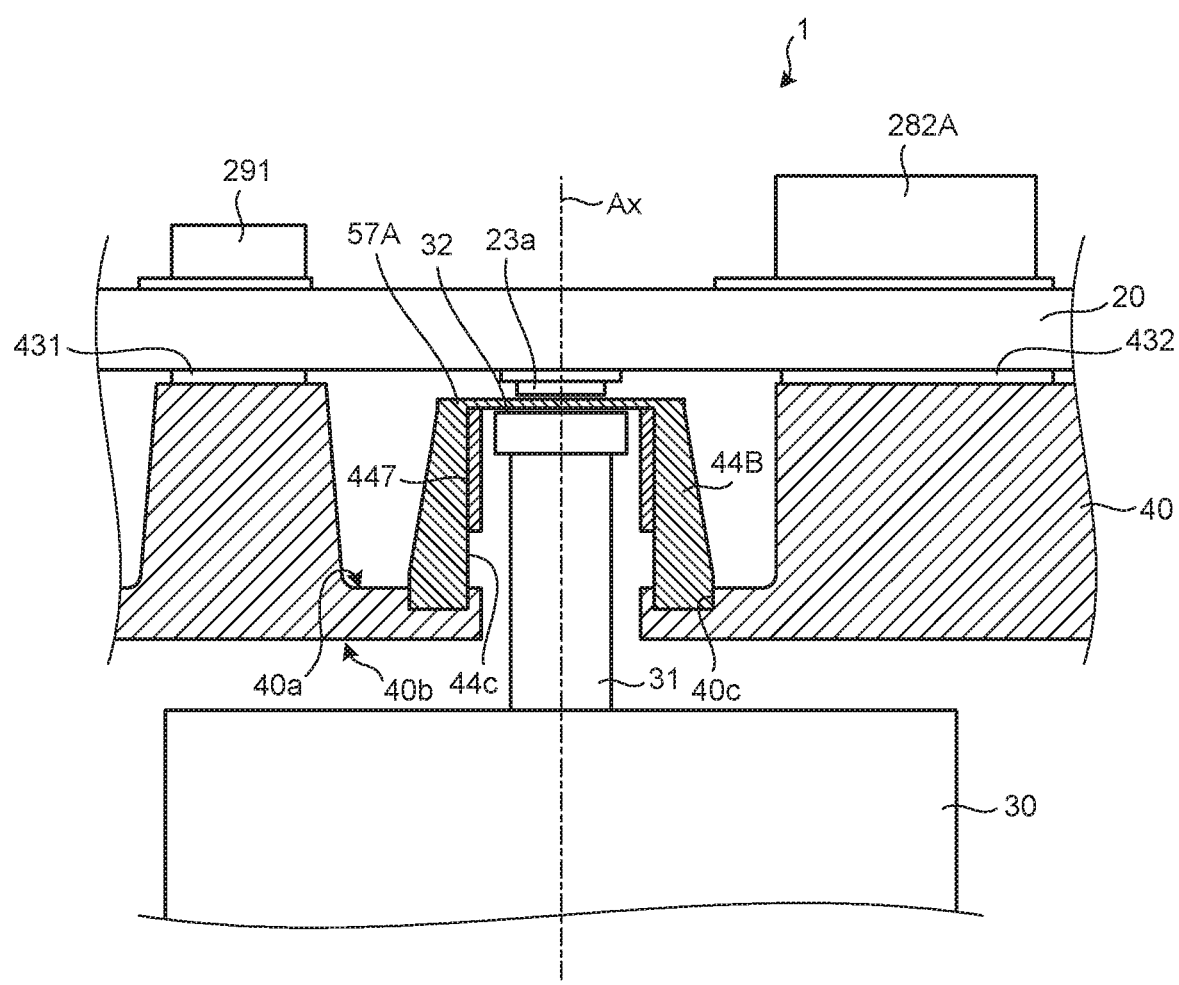
FIG. 45 is a sectional view illustrating a wall portion and a periphery thereof according to a fourth modification of the second embodiment.

FIG. 45 is a sectional view illustrating a wall portion and a periphery thereof according to a fourth modification of the second embodiment. The material of a wall portion 44B according to the fourth modification is a resin. The wall portion 44B of a resin is formed integrally with the cap 57A of a resin. Such a configuration also allows the cap 57A to prevent the foreign matter from getting into the ring of the wall portion 44B from the first surface 40a side of the heat sink 40. As a result, the foreign matter is prevented from adhering to the magnet 32. No process is required to mount the cap 57A on the wall portion 44B in the assembly process of the electric drive device 1. Thus, the number of processes can be prevented from increasing.

While the second embodiment has been described above, the present invention is not limited to the above-described embodiment. For example, the shape of the ring of each of the wall portions 44 and 44A is not limited to a perfectly circular shape. The shape of the ring of each of the wall portions 44 and 44A may be an oval, or may be a triangle or a polygon with four or more sides.

Third Embodiment

In an embodiment of the present invention, the ring-shaped wall portion need not be provided with any cap. The ring-shaped wall portion may be directly in contact with the circuit board, or an elastic body may be disposed between the ring-shaped wall portion and the circuit board. The elastic body may be in contact with the ring-shaped wall portion and the circuit board.

Figure 46:
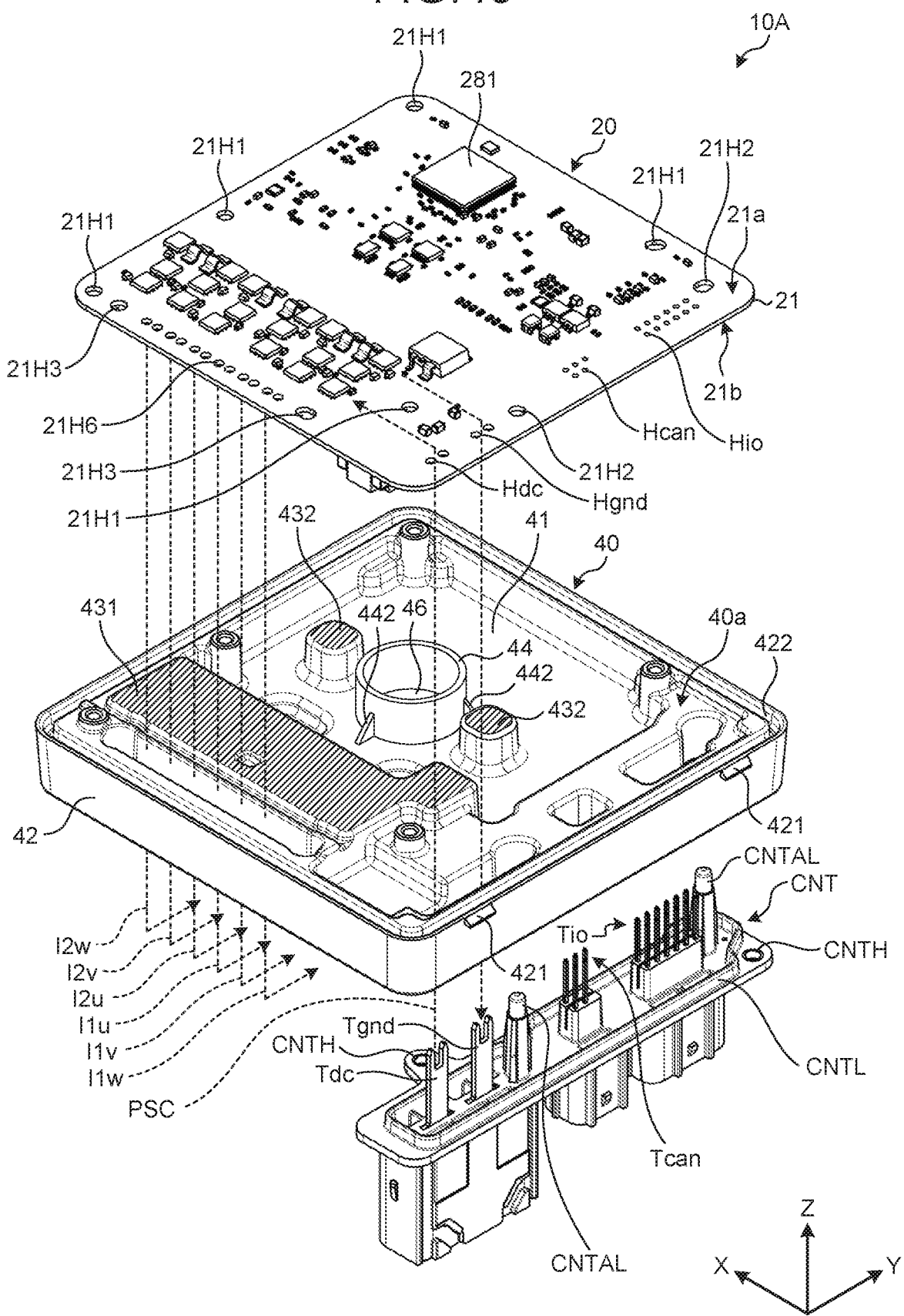
FIG. 46 is an exploded perspective view illustrating a configuration example of the ECU body according to a third embodiment.
Figure 47:
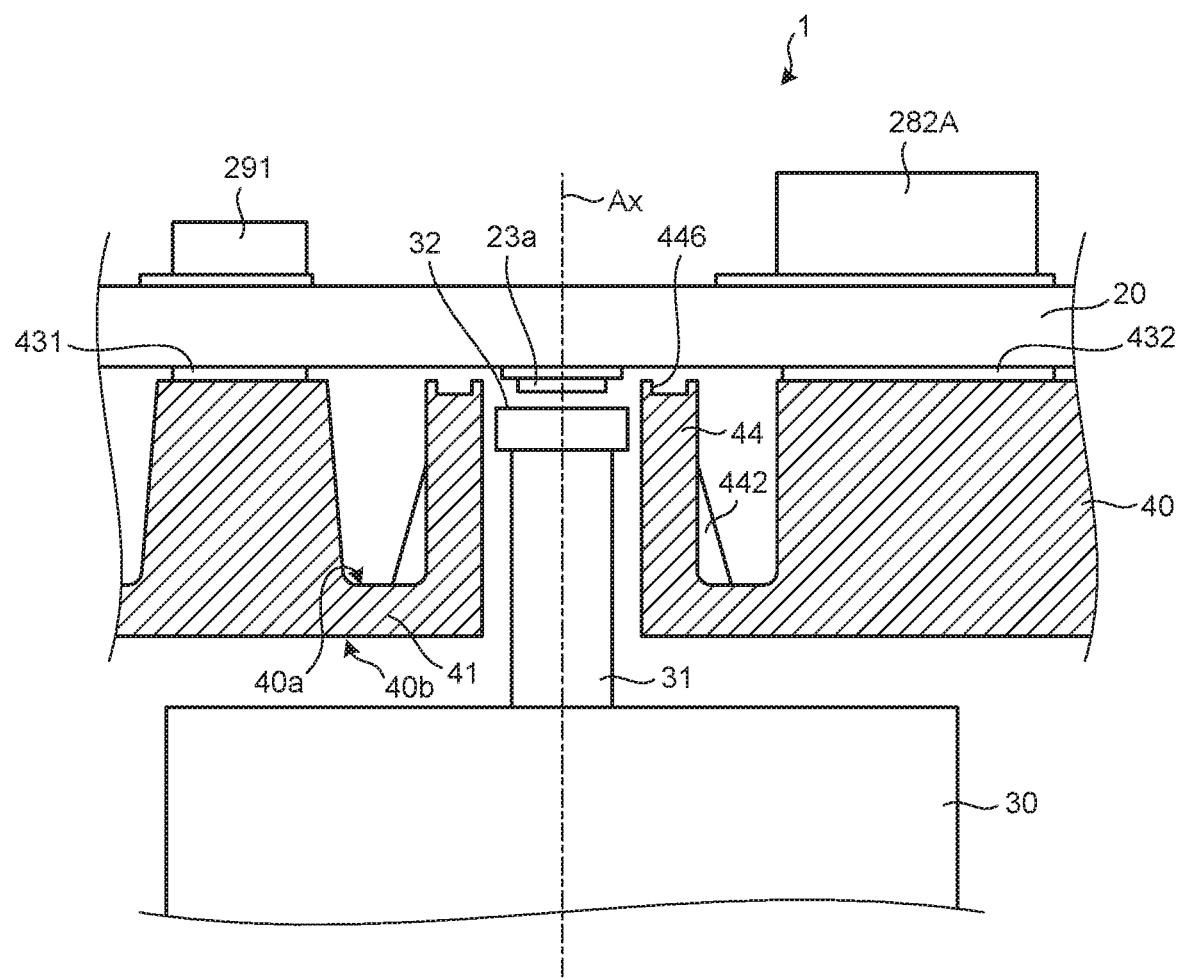
FIG. 47 is a sectional view illustrating a configuration example of the electric drive device according to the third embodiment of the present invention.
Figure 48:
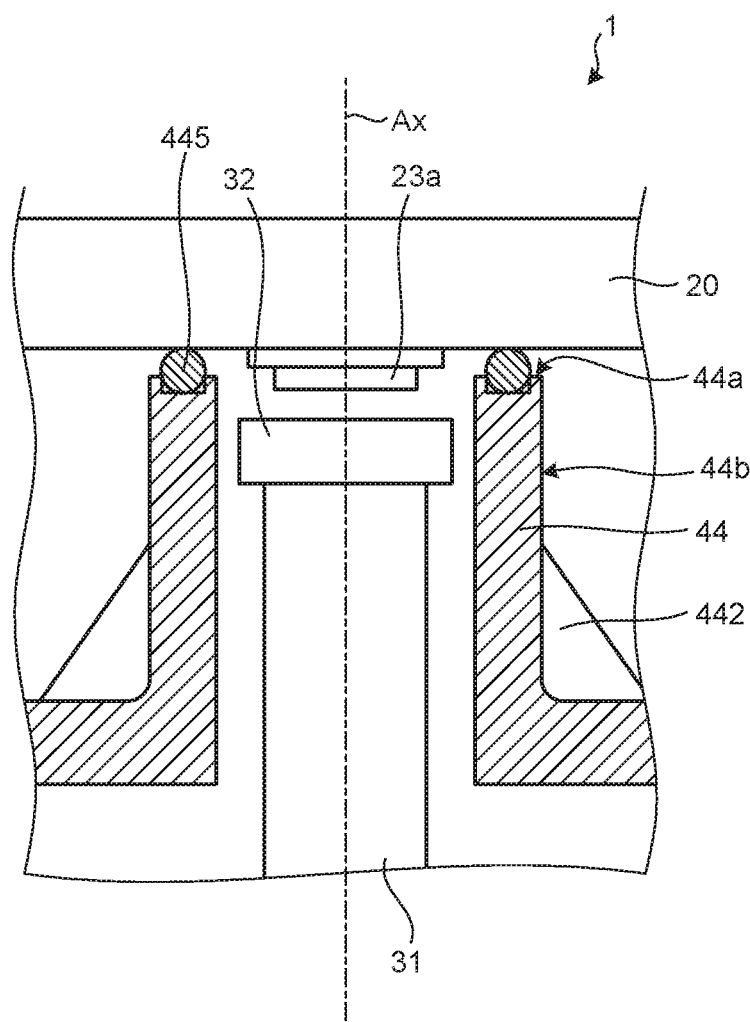
FIG. 48 is a sectional view illustrating a wall portion and a periphery thereof in FIG. 47 in an enlarged scale.
Figure 49:
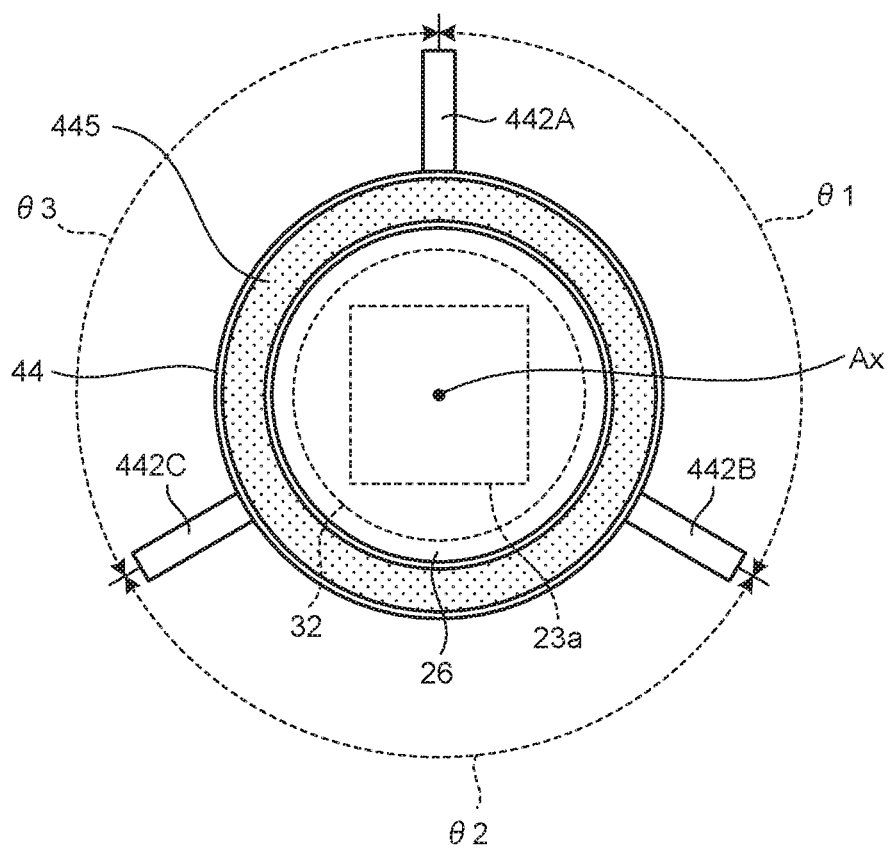
FIG. 49 is a plan view illustrating a configuration example of the wall portion and the ribs according to the third embodiment.

FIG. 46 is an exploded perspective view illustrating a configuration example of the ECU body according to a third embodiment of the present invention. FIG. 47 is a sectional view illustrating the configuration example of the electric drive device according to the third embodiment. FIG. 48 is a sectional view illustrating a wall portion and a periphery thereof in FIG. 47 in an enlarged scale. FIG. 48 illustrates a state in which an elastic ring 445 is mounted on the wall portion. FIG. 49 is a plan view illustrating a configuration example of the wall portion and the ribs according to the third embodiment. FIG. 49 illustrates a state in which the elastic ring 445 is fitted in a groove portion 446 provided on the top surface 44a of the wall portion 44. In the plan view from the Z-axis direction in FIG. 49, the magnet 32 and the rotation angle sensor 23a are indicated by dotted lines to illustrate positional relations of the elastic ring 445 with the magnet 32 and the rotation angle sensor 23a.

As illustrated in FIGS. 46 to 49, in the third embodiment, the ring-shaped wall portion 44 is not provided with the groove portion tre (refer to FIG. 32) for fixing a cap. In the third embodiment, the top surface of the wall portion 44 is provided with the groove portion 446 for fitting therein the elastic ring 445.

As illustrated in FIGS. 47 to 49, the wall portion 44 surrounds the magnet 32 from lateral sides thereof. The top surface 44a of the wall portion 44 is located closer to the circuit board 20 than the magnet 32. The elastic ring 445 is disposed on the top surface 44a of the wall portion 44. For example, the top surface 44a of the wall portion 44 is provided with the ring-shaped groove portion 446. In the plan view from the Z-axis direction, the shape of the groove portion 446 is the same as the shape of the wall portion 44, and is, for example, a perfect circle. As illustrated in FIG. 49, the elastic ring 445 is fitted in the top surface of the wall portion 44.

The material of the elastic ring 445 is, for example, an insulating resin. Once the circuit board 20 is mounted on the first surface 40a side of the heat sink 40, the circuit board 20 presses the elastic ring 445 onto the first surface 40a side of the heat sink 40. As a result, the elastic ring 445 comes in tight contact with the circuit board 20 and the wall portion 44. The elastic ring 445 is, for example, an O-ring.

As described above, the electric drive device 1 according to the third embodiment includes the heat sink 40, the ring-shaped wall portion 44, and the elastic ring 445 (elastic body) disposed between the wall portion 44 and the circuit board 20. The heat sink 40 has the first surface 40a and the second surface 40b located on the opposite side of the first surface 40a, and supports the circuit board 20 on the side of the first surface 40a. The heat sink 40 has the through-hole 46 that is provided between the first surface 40a and the second surface 40b, and through which the shaft 31 passes. The wall portion 44 is disposed between the first surface 40a and the circuit board 20. In the plan view from the axial direction Ax of the shaft 31 (Z-axis direction), the through-hole 46 is located in the ring of the wall portion 44.

With this configuration, the elastic ring 445 comes in tight contact with the wall portion 44 and the circuit board 20, thereby preventing the circuit board 20 from vibrating and preventing the rotation angle sensor 23a from vibrating relative to the magnet 32. As a result, the separation distance between the rotation angle sensor 23a and the magnet 32 can be kept more constant. The rotation angle sensor 23a can accurately detect the rotation angle of the magnet 32.

When the circuit board 20 vibrates, loads are applied to joints between the circuit board 20 and various components (for example, the rotation angle sensor 23a, the electronic components 281, 282A, and 282B, and the electrolytic capacitors 253A and 253B). In the third embodiment, the loads applied to the joints can be reduced because the circuit board 20 is prevented from vibrating.

In the plan view from the axial direction Ax of the shaft 31 (Z-axis direction), a through-hole 26 is located in the elastic ring 445. With this configuration, once the elastic ring 445 comes in tight contact with the wall portion 44 and the circuit board 20, the ring of the wall portion 44 is closed by the circuit board 20. This closing can prevent the foreign matter from getting into the ring of the wall portion 44 from the first surface 40a side of the heat sink 40. Since the magnet 32 is located in the ring of the wall portion 44, the foreign matter is prevented from adhering to (contaminating) the magnet 32.

The wall portion 44 has the groove portion 446 provided on the top surface 44a (surface facing the circuit board 20). The elastic ring 445 is fitted in the groove portion 446. This configuration facilitates disposition of the elastic ring 445 on the top surface 44a of the wall portion 44, and can prevent the elastic ring 445 from being displaced with respect to the wall portion 44.

The elastic ring 445 has an insulating property. This property allows the elastic ring 445 to isolate the circuit board 20 from the wall portion 44. For example, the elastic ring 445 can prevent any current from flowing between the wall portion 44 and the circuit board 20 even when the wall portion 44 is made of a metal.

Modification of Third Embodiment

Figure 50:
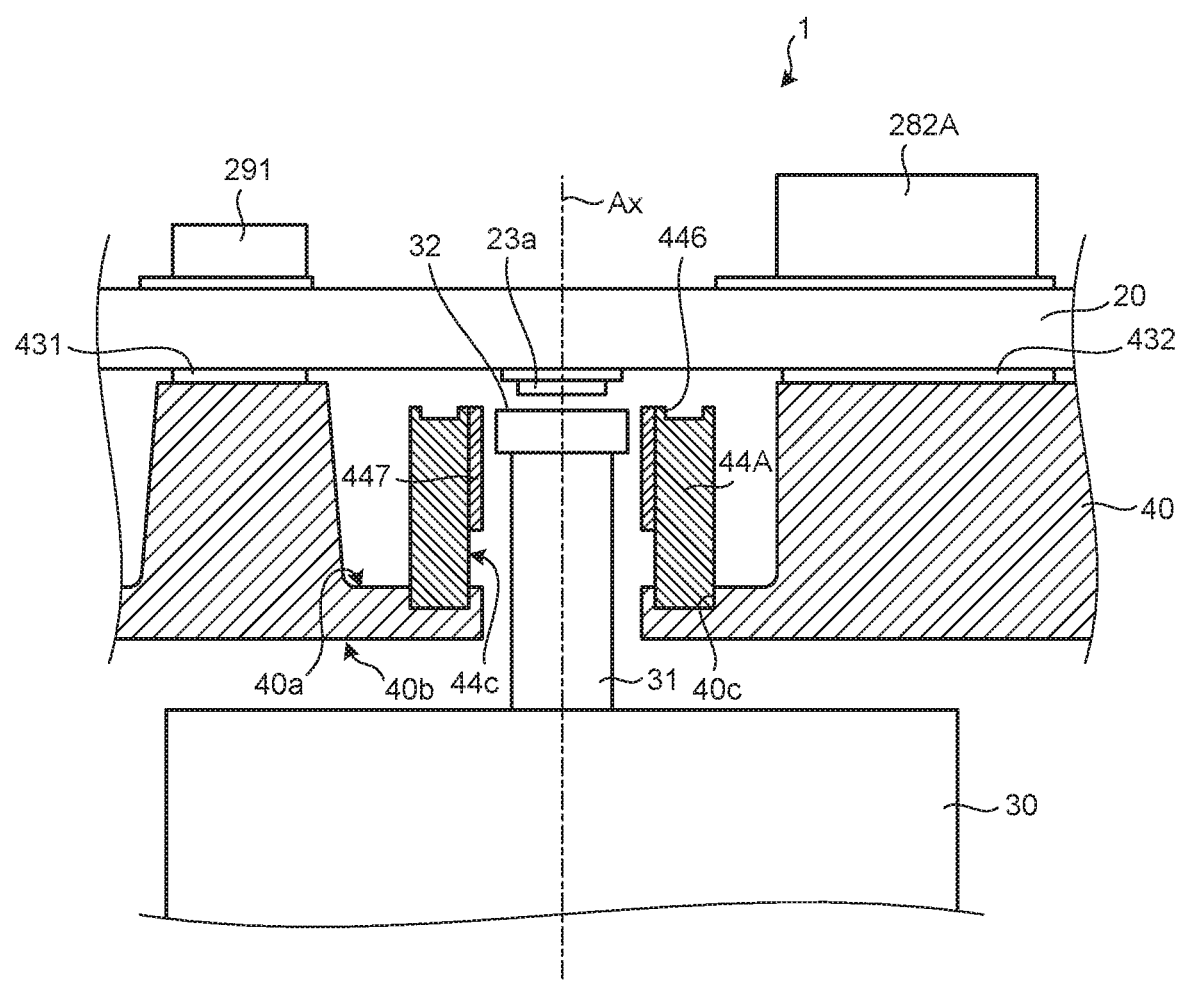
FIG. 50 is a sectional view illustrating the wall portion and the periphery thereof according to a modification of the third embodiment.

FIG. 50 is a sectional view illustrating the wall portion and the periphery thereof according to a modification of the third embodiment. In the third embodiment, the heat sink and the wall portion may be provided separately from each other. For example, as illustrated in FIG. 50, in the modification, the bottom portion 41 of the first surface 40a of the heat sink 40 is provided with the depressed portion 40c. The bottom portion of the wall portion 44A according to the modification is fitted in the depressed portion 40c. As a result, the wall portion 44A is fixed to the heat sink 40. Such a configuration also allows the elastic ring 445 (refer to FIG. 48) to be fitted in the groove portion 446 of the wall portion 44A. The elastic ring 445 comes in tight contact with the wall portion 44A and the circuit board 20, thereby preventing the circuit board 20 from vibrating and preventing the rotation angle sensor 23a from vibrating relative to the magnet 32. As a result, the separation distance between the rotation angle sensor 23a and the magnet 32 can be kept more constant. The rotation angle sensor 23a can accurately detect the rotation angle of the magnet 32.

In the modification, the heat sink 40 and the wall portion 44A can be separately manufactured. Accordingly, the heat sink 40 can have a simpler shape. This makes it easier to manufacture the heat sink 40 using, for example, a mold.

Also in the third embodiment, the material of the wall portion 44A may be a metal, such as aluminum or copper, or may be a resin, such as an engineering plastic. When the material of the wall portion 44A is a resin, the wall portion 44A can be provided by injection molding. Consequently, the wall portion 44A can be easily manufactured.

As illustrated in FIG. 50, the magnetic shielding layer 447 may be pasted or applied onto the inner circumferential surface 44c of the wall portion 44A. This configuration blocks the magnetism between the inside and the outside of the wall portion 44A even when the wall portion 44A is made of a resin.

The third embodiment has been described above. Also in the third embodiment, the shape of the ring of each of the wall portions 44 and 44A is not limited to a perfectly circular shape. The shape of the ring of each of the wall portions 44 and 44A may be an oval, or may be a triangle or a polygon with four or more sides.

Fourth Embodiment

In the first to third embodiments described above, an aspect has been described in which the connector is mounted on the heat sink. However, in an embodiment of the present invention, the connector is not limited to being mounted on the heat sink. The connector may be provided on the lid instead of on the heat sink.

Figure 51:
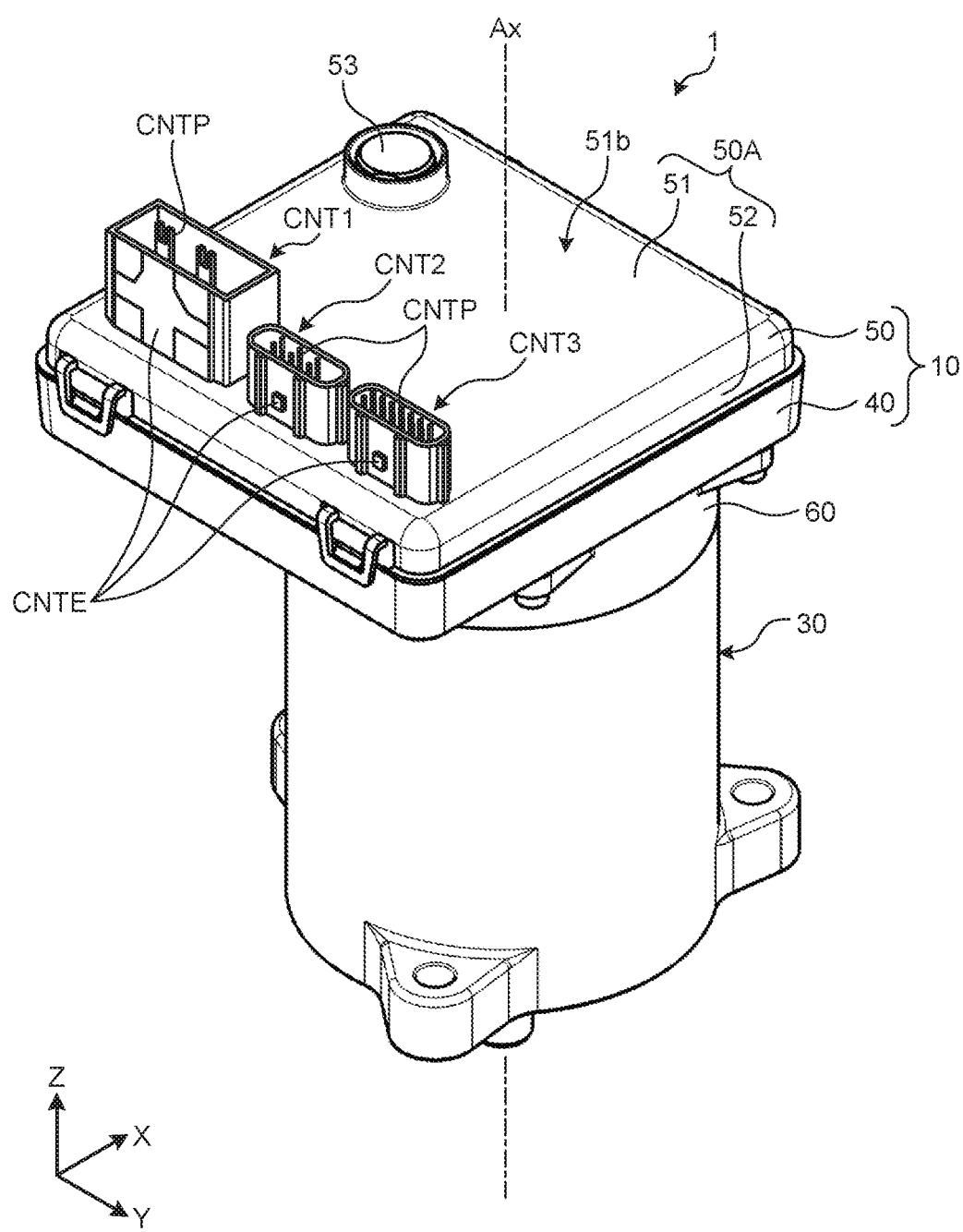
FIG. 51 is a perspective view illustrating a configuration example of the electric drive device according to a fourth embodiment of the present invention.
Figure 52:
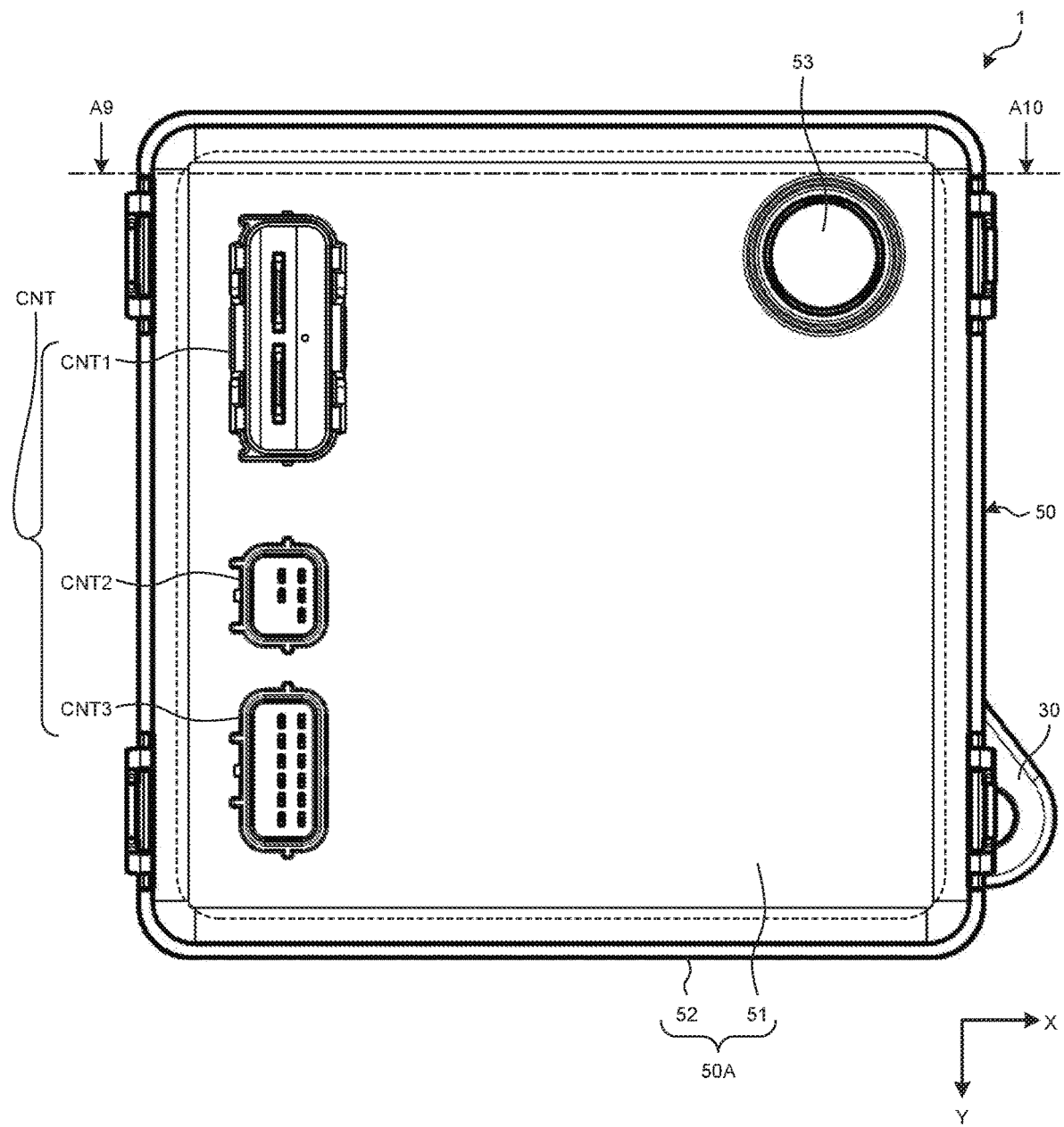
FIG. 52 is a plan view illustrating the configuration example of the electric drive device according to the fourth embodiment.
Figure 53:
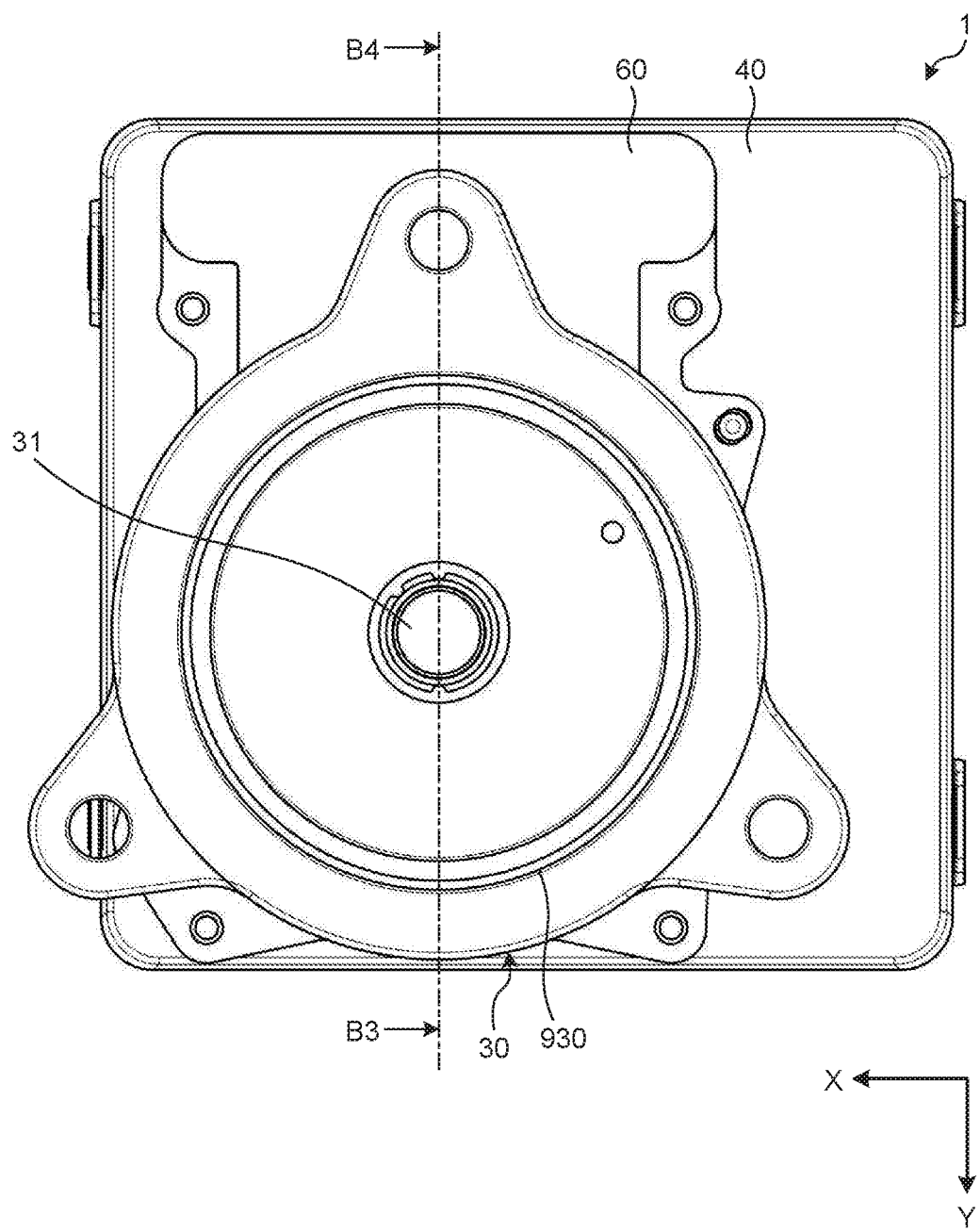
FIG. 53 is a bottom view illustrating the configuration example of the electric drive device according to the fourth embodiment.
Figure 54:
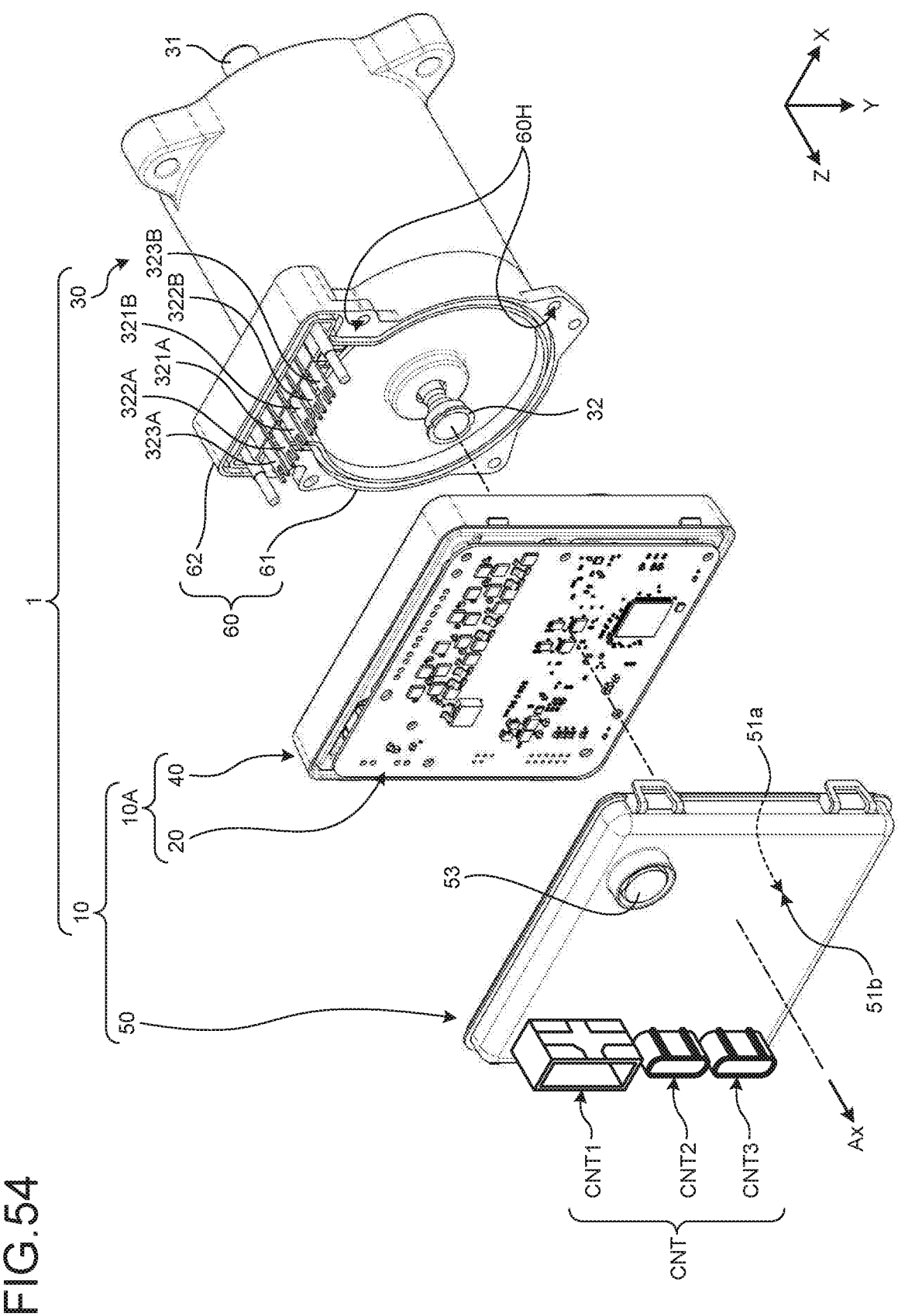
FIG. 54 is an exploded perspective view illustrating the configuration example of the electric drive device according to the fourth embodiment.
Figure 55:
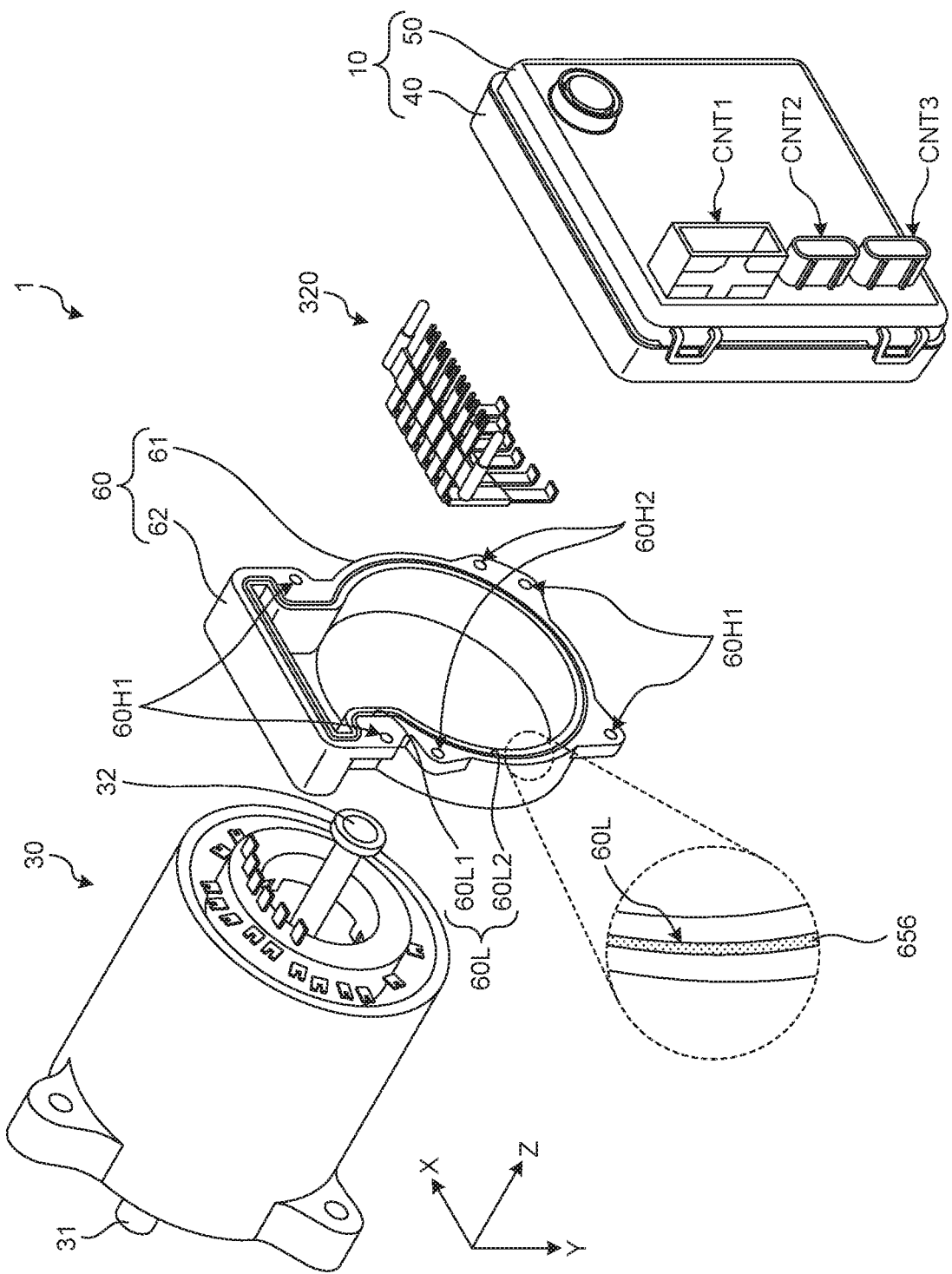
FIG. 55 is another exploded perspective view illustrating the configuration example of the electric drive device according to the fourth embodiment.
Figure 56:
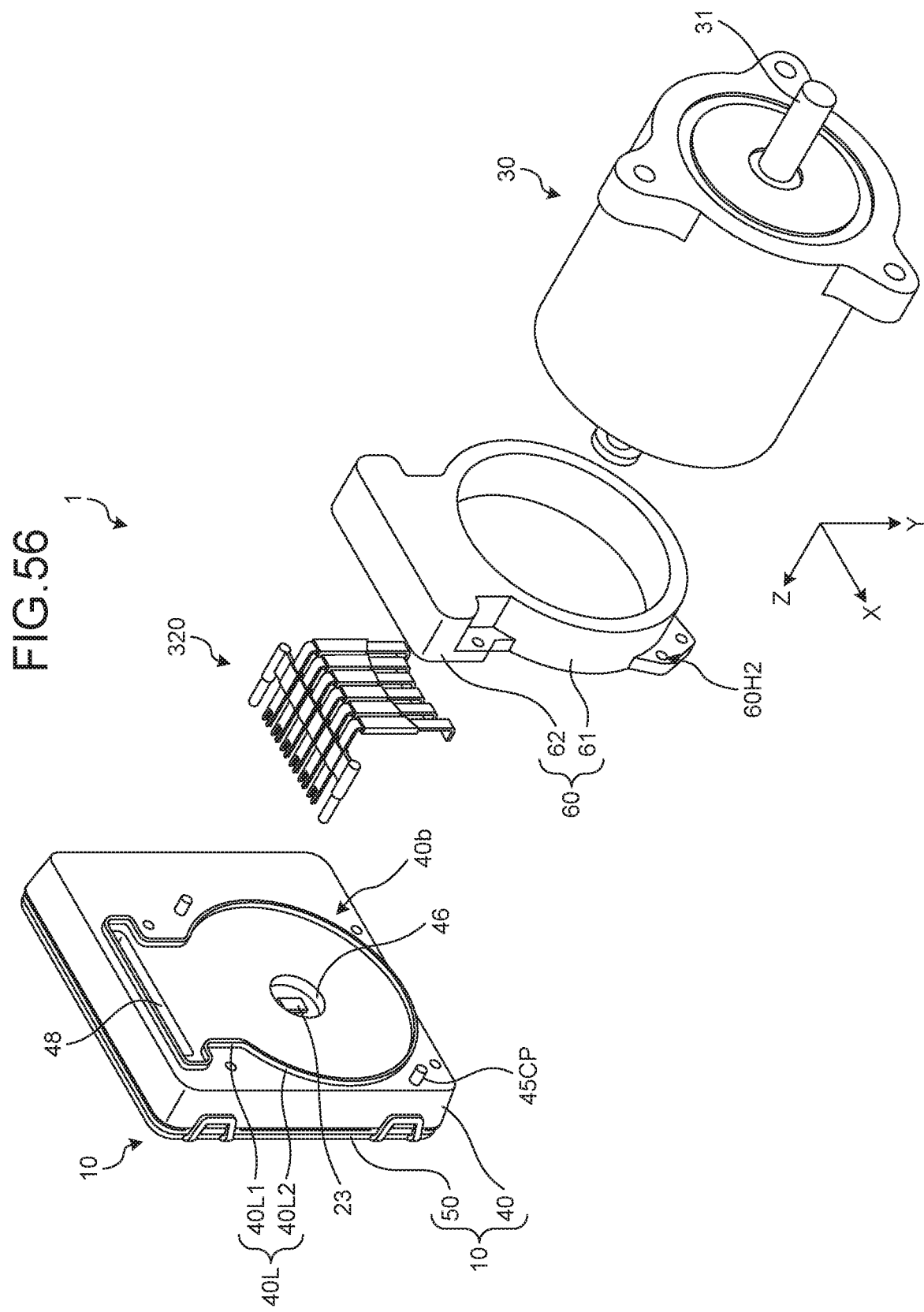
FIG. 56 is still another exploded perspective view illustrating the configuration example of the electric drive device according to the fourth embodiment.
Figure 57:
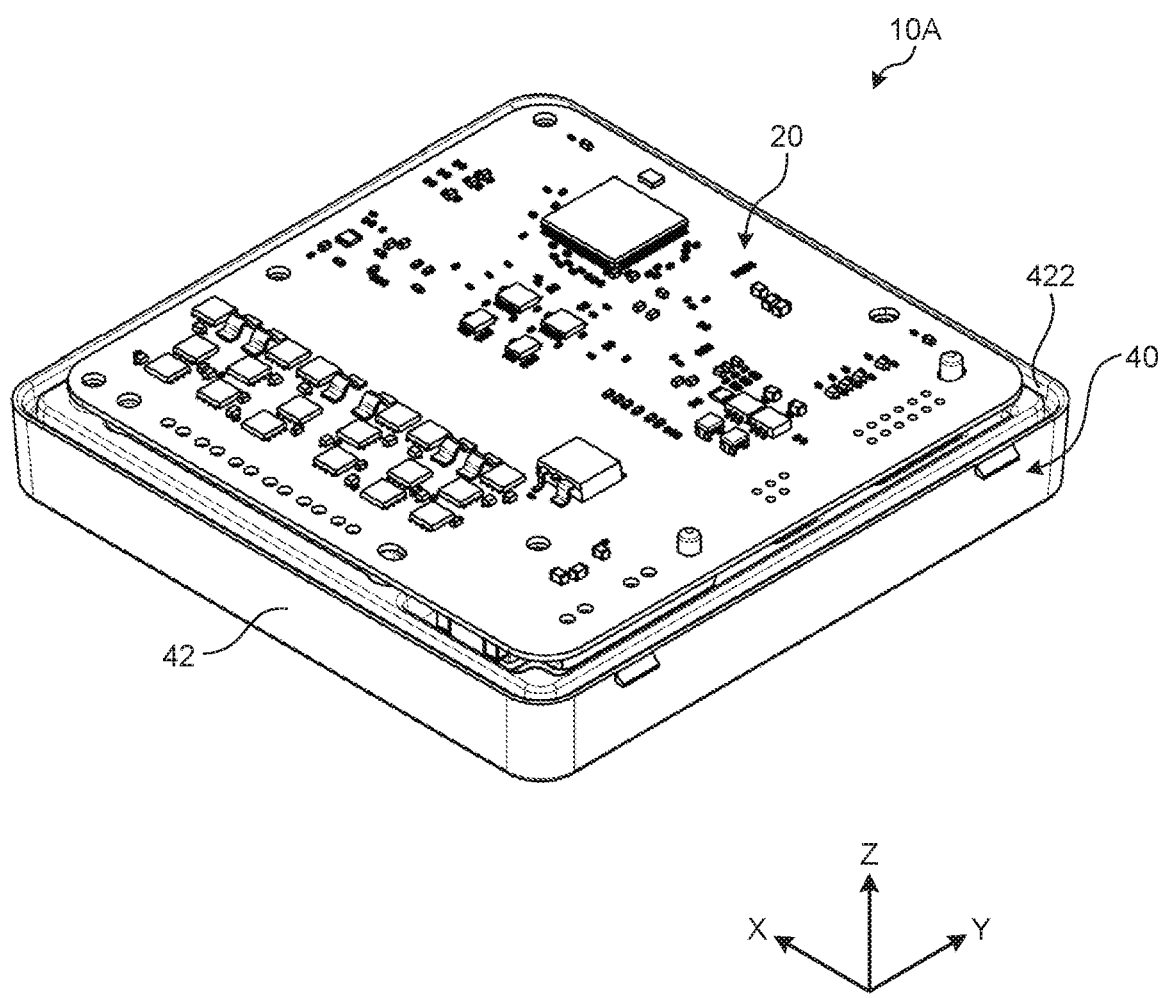
FIG. 57 is a perspective view illustrating a configuration example of the ECU body according to the fourth embodiment.
Figure 58:
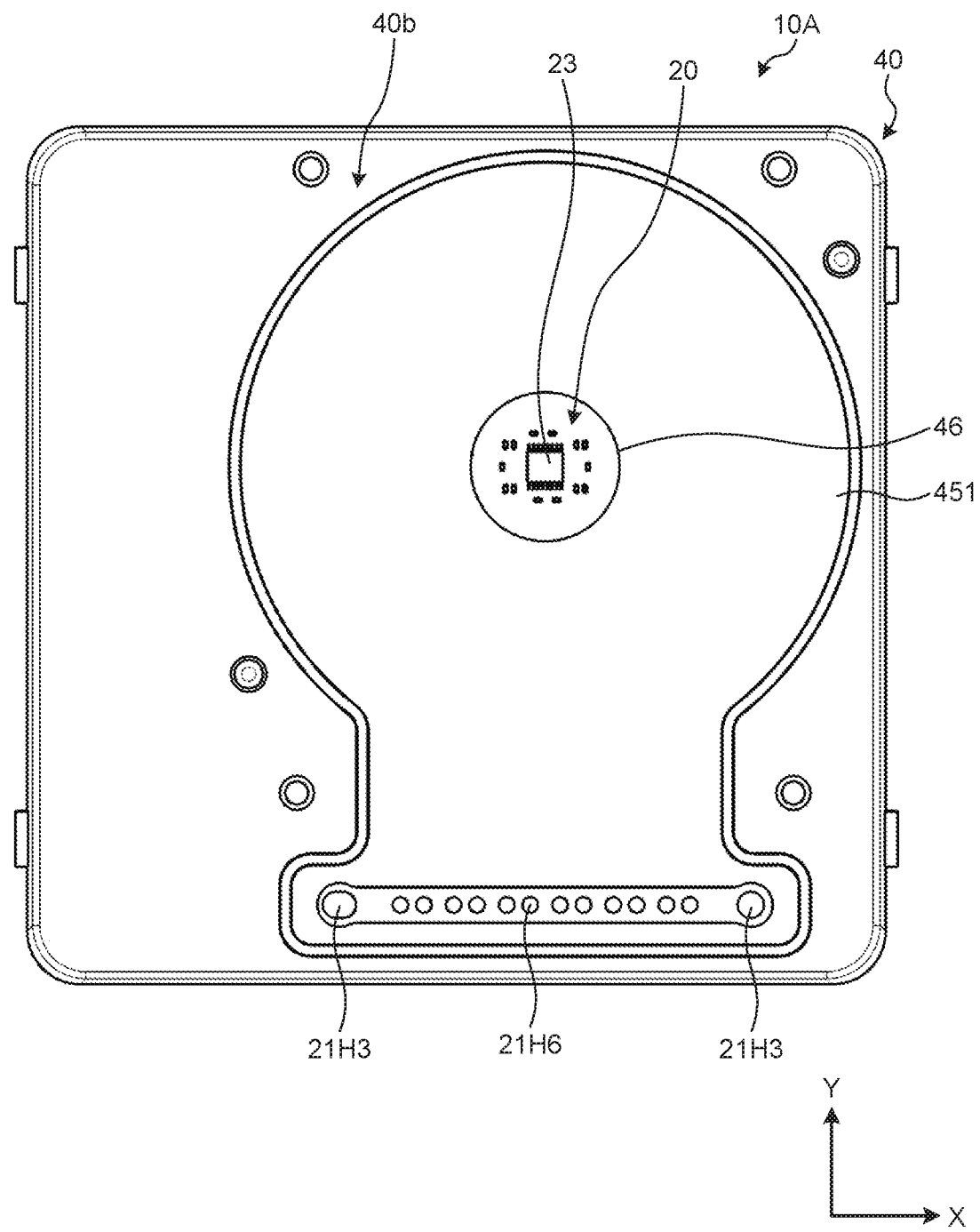
FIG. 58 is a bottom view illustrating the configuration example of the ECU body according to the fourth embodiment.
Figure 59:
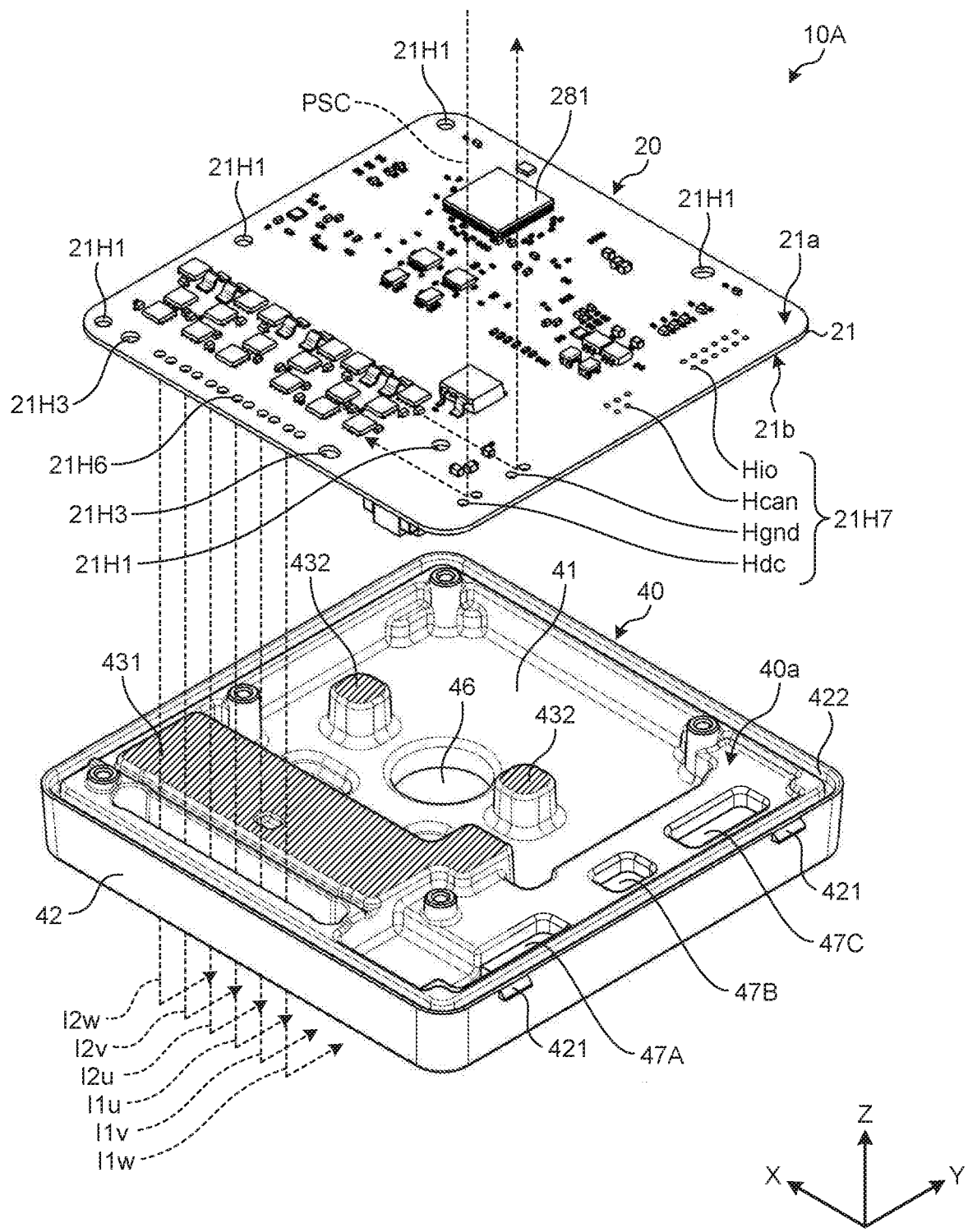
FIG. 59 is an exploded perspective view illustrating the configuration example of the ECU body according to the fourth embodiment.

FIG. 51 is a perspective view illustrating a configuration example of the electric drive device according to a fourth embodiment of the present invention. FIG. 52 is a plan view illustrating the configuration example of the electric drive device according to the fourth embodiment. FIG. 53 is a bottom view illustrating the configuration example of the electric drive device according to the fourth embodiment. FIGS. 54 to 56 are exploded perspective views each illustrating the configuration example of the electric drive device according to the fourth embodiment. FIG. 57 is a perspective view illustrating a configuration example of the ECU body according to the fourth embodiment. FIG. 58 is a bottom view illustrating the configuration example of the ECU body according to the fourth embodiment. FIG. 59 is an exploded perspective view illustrating the configuration example of the ECU body according to the fourth embodiment. Dotted lines in FIG. 59 represent the current paths from the power supply terminals Tdc and Tgnd through the ECU body 10A to the electric motor 30 (refer to FIG. 54).

As illustrated in FIGS. 51 to 59, the ECU 10 according to the fourth embodiment is provided with the ECU body 10A and the lid 50. The ECU body 10A includes the circuit board 20 and the heat sink 40 that supports the circuit board 20.

As illustrated in FIGS. 51 and 52, the lid 50 includes the top board 51, the outer circumferential portion 52 provided at the rim of the top board 51, and the connector CNT provided on the top board 51. The outer circumferential portion 52 rises from the rim of the top board 51 toward the heat sink 40. The connector CNT includes a first connector CNT1, a second connector CNT2, and a third connector CNT3. Each of the first connector CNT1, the second connector CNT2, and the third connector CNT3 includes an exterior portion CNTE and a plurality of terminals CNTP arranged in the exterior portion CNTE. The top board 51 has a first surface 51a that faces the circuit board 20 mounted on the heat sink 40, and a second surface 51b located on the opposite side of the first surface 51a. The exterior portion CNTE of each of the first connector CNT1, the second connector CNT2, and the third connector CNT3 projects from the second surface 51b of the top board 51 to the outside of the lid 50 (to the opposite side of the circuit board 20 with the top board 51 interposed therebetween). The first connector CNT1, the second connector CNT2, and the third connector CNT3 are connected to the circuit board 20 from the outside of the heat sink 40. When viewed from the Z-axis direction, each of the first connector CNT1, the second connector CNT2, and the third connector CNT3 is disposed outside the electric motor 30.

In the fourth embodiment, the top board 51 and the outer circumferential portion 52 constitute a lid body 50A. The top board 51 and the outer circumferential portion 52 are integrally formed. The lid body 50A and the exterior portion CNTE are also integrally formed. For example, the lid 50 is made of a metal or a resin. The top board 51, the outer circumferential portion 52, and the exterior portion CNTE are integrally formed by resin molding. The terminals CNTP are made of a metal.

The first connector CNT1 is used for power feeding. The first connector CNT1 includes, for example, two of the terminals CNTP. One of the two terminals CNTP included in the first connector CNT1 is the power supply terminal Tdc (refer to FIG. 6), and the other thereof is the power supply terminal Tgnd (refer to FIG. 6). The power supply terminal Tdc supplies the power supply voltage Vdc of the power supply device 83 (refer to FIG. 2). The power supply terminal Tgnd supplies the negative power supply voltage (for example, the reference voltage, such as the ground voltage) of the power supply device 83. The power wiring PW (refer to FIG. 2) for transmitting the power from the power supply device 83 is connected to both the first power circuit 25A and the second power circuit 25B through the power supply terminals Tdc and Tgnd, respectively.

The second connector CNT2 and the third connector CNT3 are used for input and output of signals or data. For example, the second connector CNT2 is a CAN terminal for performing the CAN communication. The third connector CNT3 is an input-output terminal for receiving and outputting the data using a method other than the CAN communication. The signal transmission wiring for transmitting the input-output signals, for example, the steering torque signal T and the vehicle speed signal SV, is connected to the control calculator 241 of the control circuit 24 (refer to FIG. 6) through the second connector CNT2 and the third connector CNT3.

As illustrated in FIG. 59, the board body 21 is provided with the through-holes 21H1, 21H3, 21H6, and 21H7 penetrating between the first surface 21a and the second surface 21b. The screws for fastening the circuit board 20 to the heat sink 40 are inserted in the through-holes 21H1. The rod-like connection members 66AL (refer to FIG. 66) are inserted in the through-holes 21H3 to position the first coil wiring 321A, 322A, and 323A and the second coil wiring 321B, 322B, and 323B (refer to FIG. 27) with respect to the circuit board 20. The through-holes 21H6 include the first through-holes 21H6A and the second through-holes 21H6B. The first coil wiring 321A, 322A, and 323A (refer to FIG. 27) are inserted in the first through-holes 21H6A. The second coil wiring 321B, 322B, and 323B (refer to FIG. 27) are inserted in the second through-holes 21H6B.

The terminals CNTP (refer to FIG. 51) are inserted in the through-holes 21H7. For example, the through-holes 21H7 include the through-holes Hdc, Hgnd, Hcan, and Hio. The terminals CNTP of the first connector CNT1 (refer to FIG. 51) are inserted in the through-holes Hdc and Hgnd. The terminals CNTP of the second connector CNT2 (refer to FIG. 51) are inserted in the through-holes Hcan. The terminals CNTP of the third connector CNT3 (refer to FIG. 51) are inserted in the through-holes Hio.

Figure 60:
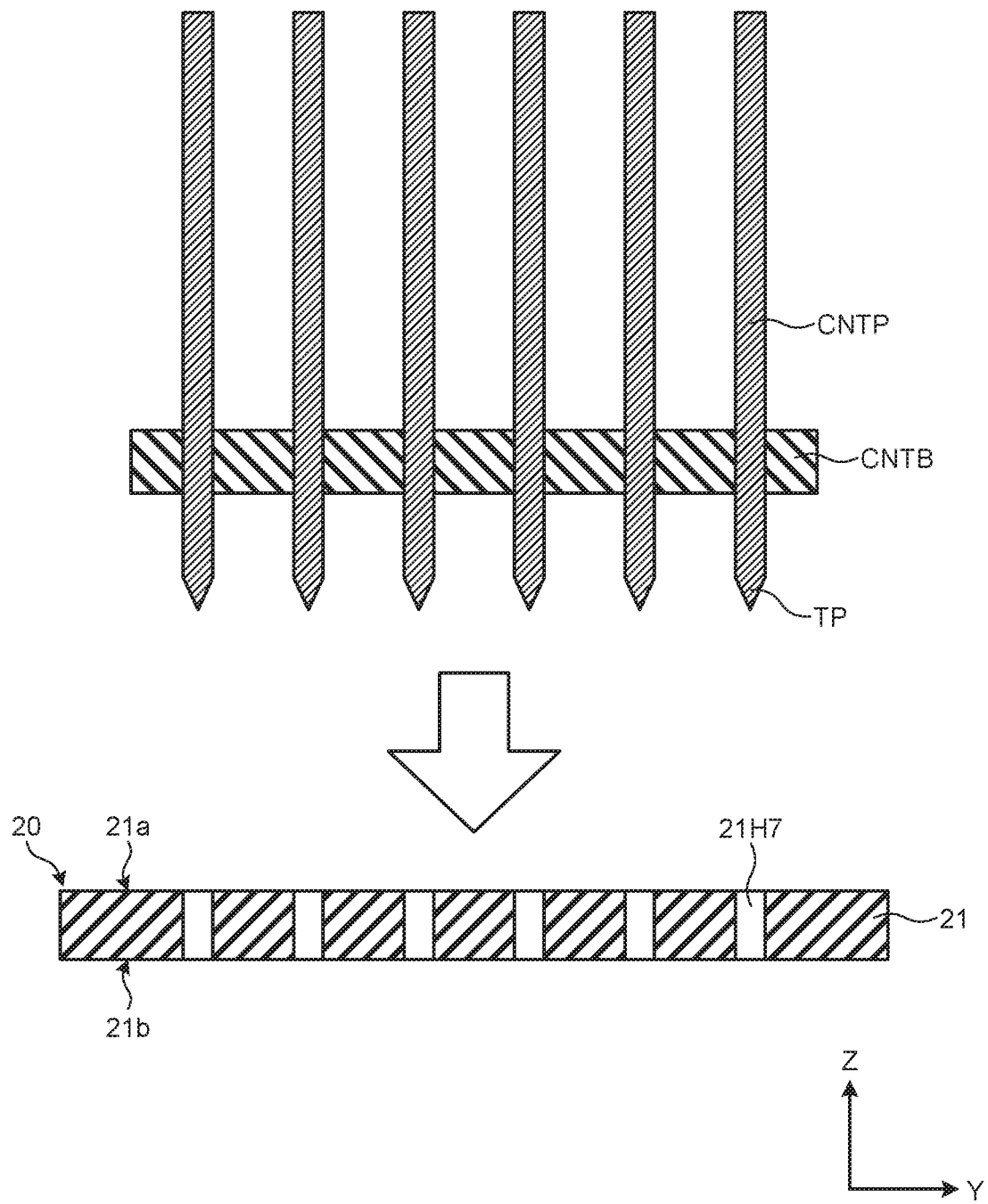
FIG. 60 is a schematic diagram illustrating a connection example of a connector to the circuit board.

FIGS. 60 and 61 are schematic diagrams each illustrating a connection example of each of the connectors to the circuit board. As illustrated in FIG. 60, the terminals CNTP of each of the first connector CNT1, the second connector CNT2, and the third connector CNT3 (refer to FIG. 51) are arranged on the first surface 21a side of the circuit board 20. Each of the first connector CNT1, the second connector CNT2, and the third connector CNT3 includes a connection member CNTB that connects the adjacent terminals CNTP to one another. The connection member CNTB arranges the terminals CNTP adjacent to each another in the Y-direction in a state separated from one another. For example, the terminals CNTP of the first connector CNT1, the second connector CNT2, and the third connector CNT3 are connected by the connection member CNTB for each of the first connector CNT1, the second connector CNT2, and the third connector CNT3. Alternatively, the terminals CNTP of the first connector CNT1, the second connector CNT2, and the third connector CNT3 may be collectively connected together by one connection member CNTB.

As illustrated in FIG. 60, the terminals CNTP connected by the connection members CNTB are inserted in the through-holes 21H7 of the board body 21 with tips TP thereof directed toward the circuit board 20. As illustrated in FIG. 61, once the tips TP of the terminals CNTP reach the second surface 21b side of the board body 21, the terminals CNTP are connected to the circuit board 20.

Figure 62:
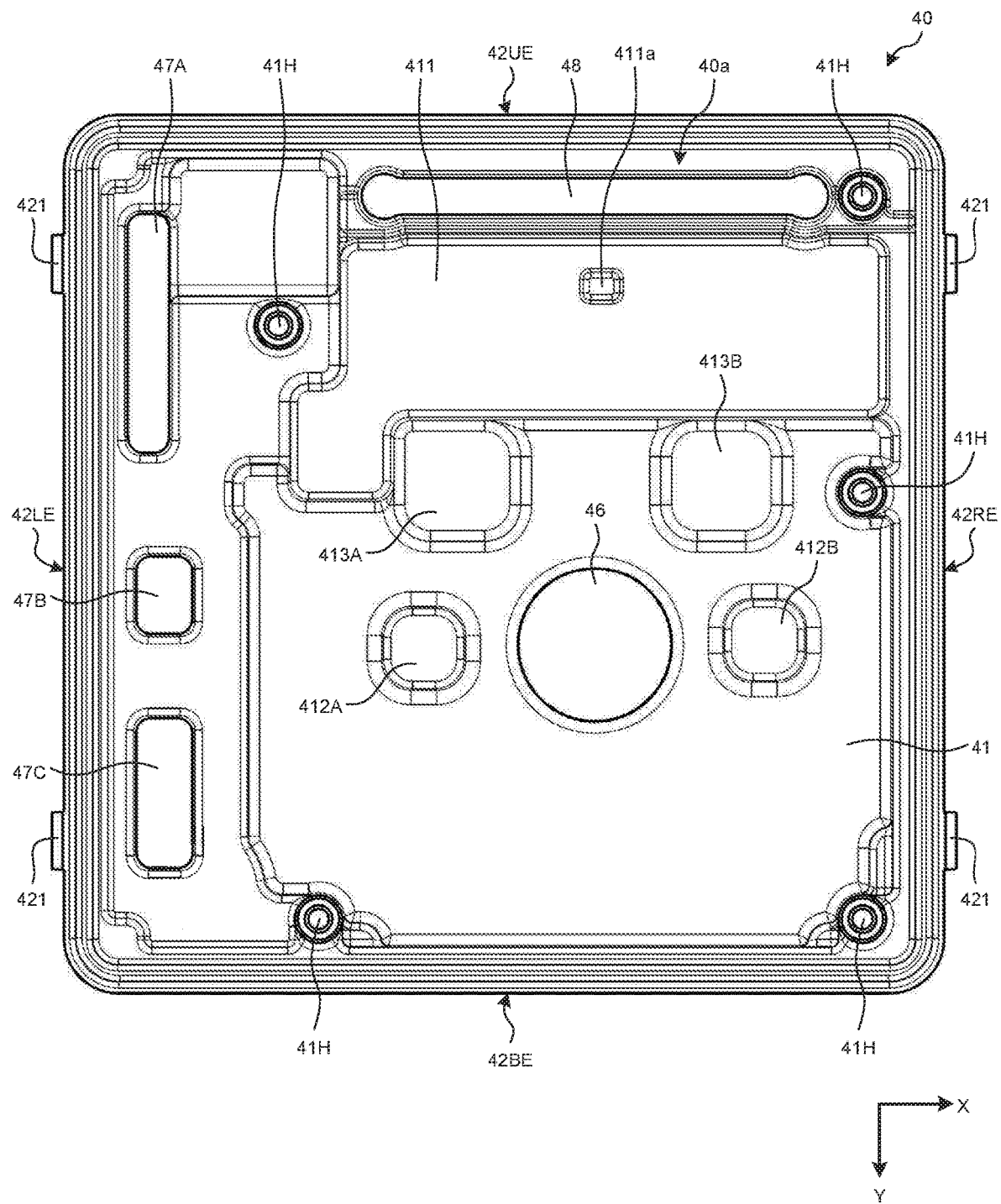
FIG. 62 is a front view illustrating a configuration example of the heat sink according to the fourth embodiment.
Figure 63:
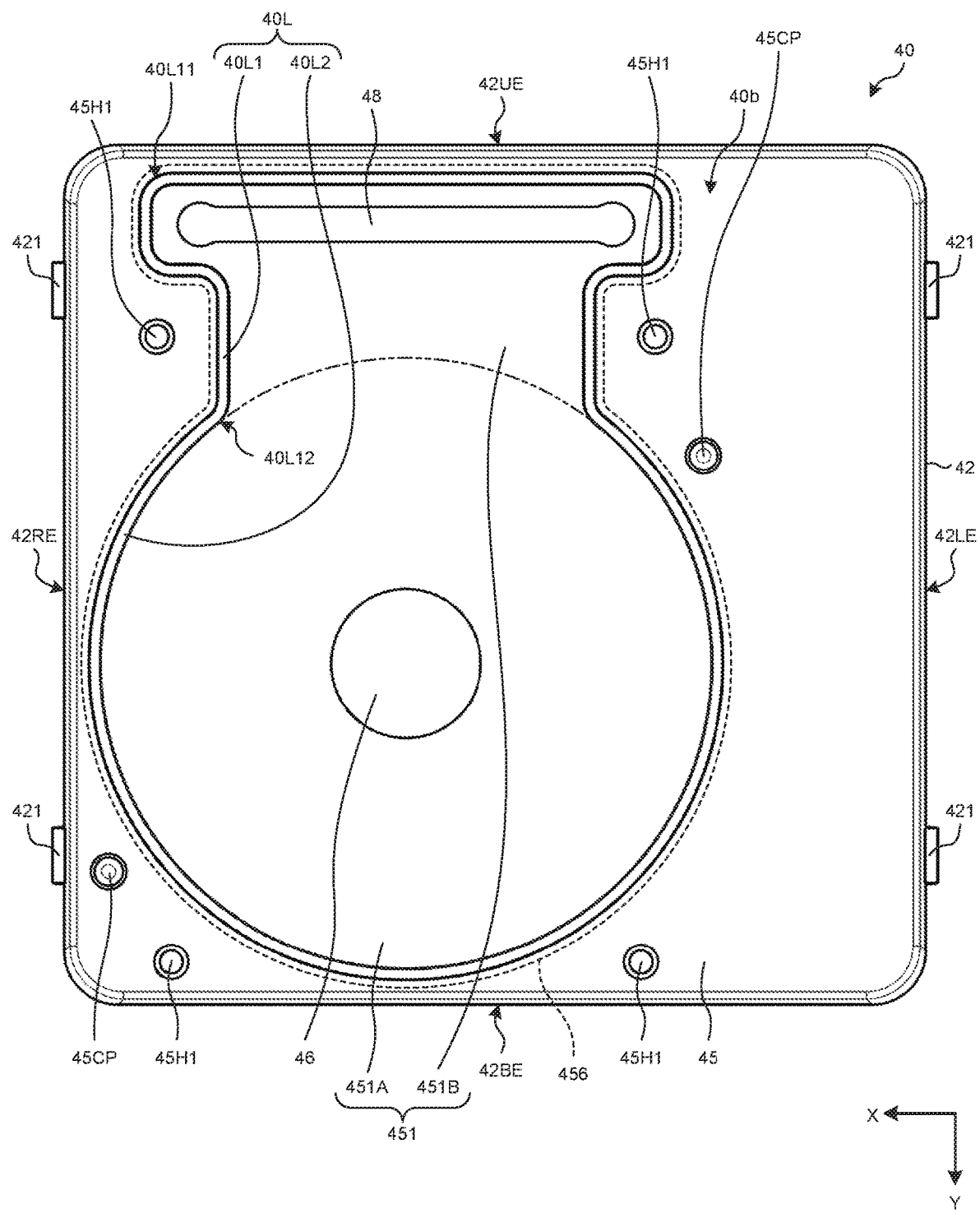
FIG. 63 is a rear view illustrating the configuration example of the heat sink according to the fourth embodiment.
Figure 64:
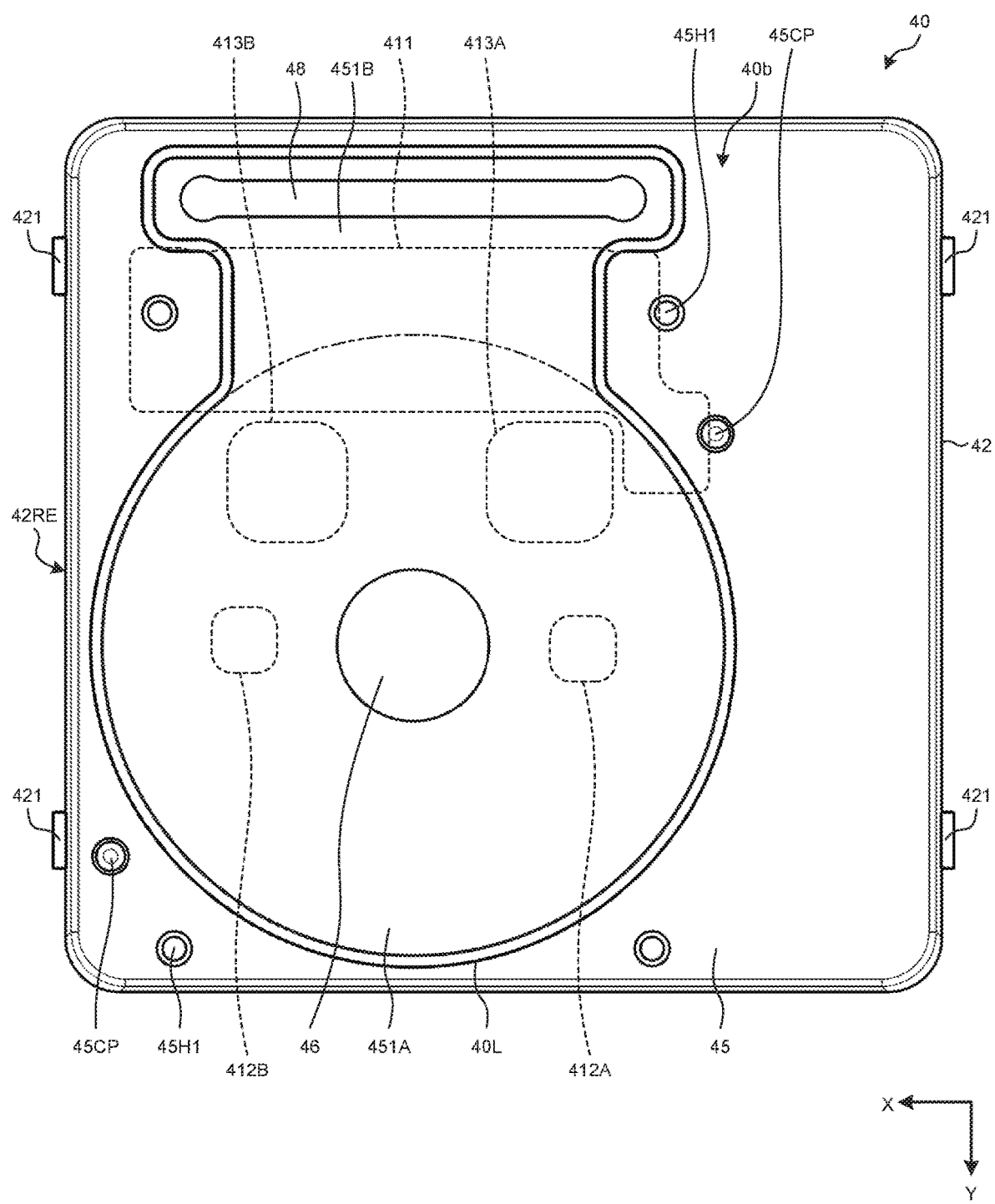
FIG. 64 is a perspective view illustrating the first raised portion, the second raised portions, and the depressed portions provided on the first surface side of the heat sink according to the fourth embodiment, when viewed from the second surface side thereof.
Figure 65:
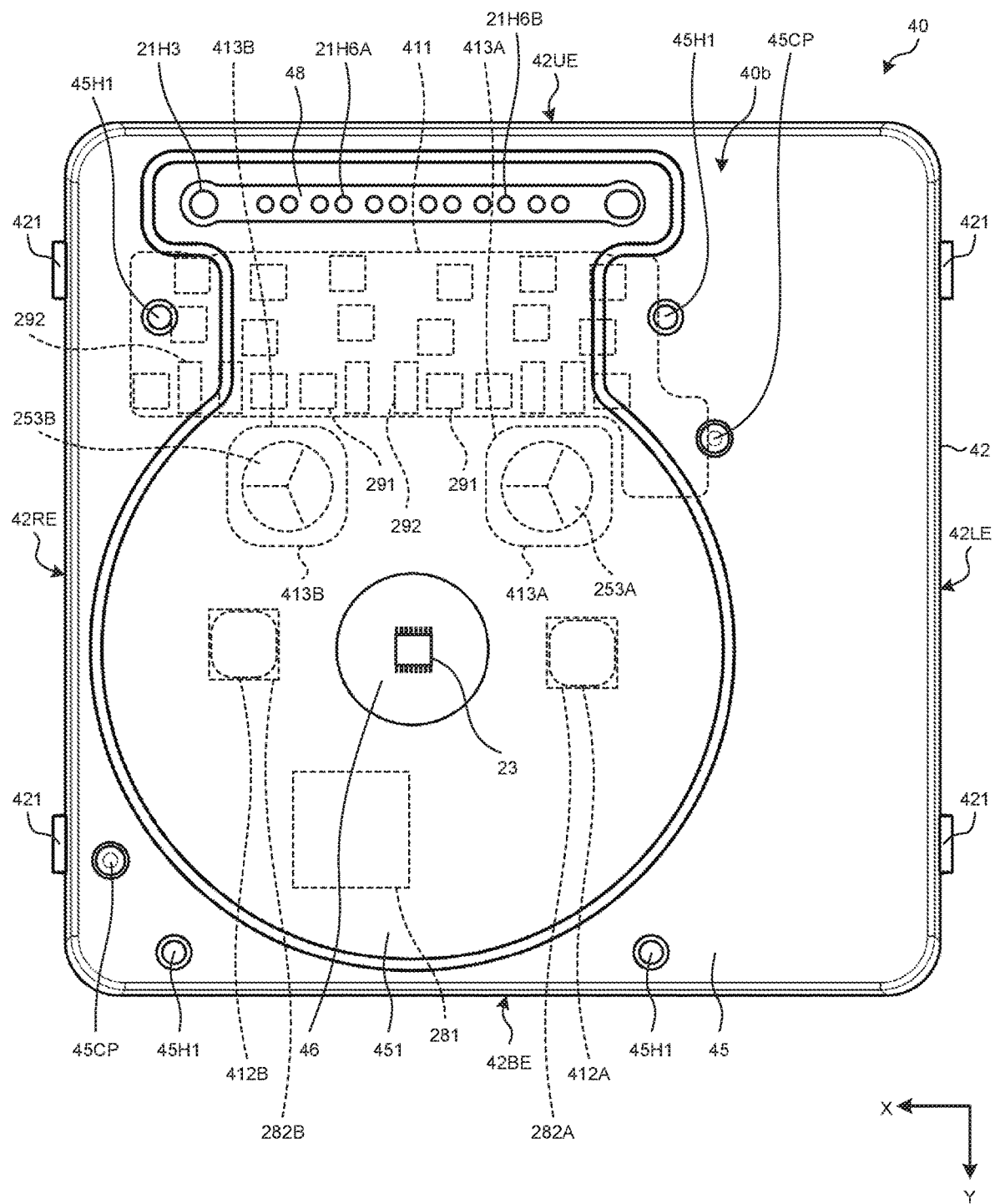
FIG. 65 is a perspective view illustrating the first raised portion, the second raised portions, and the depressed portions provided on the first surface side of the heat sink and the electronic components mounted on the circuit board according to the fourth embodiment, when viewed from the second surface side of the heat sink.

FIG. 62 is a front view illustrating a configuration example of the heat sink according to the fourth embodiment. FIG. 63 is a rear view illustrating the configuration example of the heat sink according to the fourth embodiment. FIG. 64 is a perspective view illustrating the first raised portion, the second raised portions, and the depressed portions provided on the first surface side of the heat sink according to the fourth embodiment, when viewed from the second surface side thereof. FIG. 65 is a perspective view illustrating the first raised portion, the second raised portions, and the depressed portions provided on the first surface side of the heat sink and the electronic components mounted on the circuit board according to the fourth embodiment, when viewed from the second surface side of the heat sink.

As illustrated in FIGS. 59 and 62, the heat sink 40 has depressed portions 47A, 47B, and 47C on the first surface 40a side thereof. The depressed portion 47A is provided in a position facing the first connector CNT (refer to FIG. 54). For example, the tips TP (refer to FIG. 61) of the terminals CNTP (for example, the power supply terminals Tdc and Tgnd) included in the first connector CNT1 are arranged in the depressed portion 47A. The depressed portion 47B is provided in a position facing the second connector CNT2 (refer to FIG. 54). For example, the tips TP of the terminals CNTP (for example, the CAN terminal) included in the second connector CNT2 are arranged in the depressed portion 47B. The depressed portion 47C is provided in a position facing the third connector CNT3 (refer to FIG. 54). For example, the tips TP of the terminals CNTP (for example, the input-output terminals other than the CAN terminal) included in the third connector CNT3 are arranged in the depressed portion 47C. As illustrated in FIGS. 62 to 65, the heat sink 40 has the through-hole 48. The first coil wiring 321A, 322A, and 323A and the second coil wiring 321B, 322B, and 323B (refer to FIG. 54) are inserted in the through-hole 48.

Figure 66:
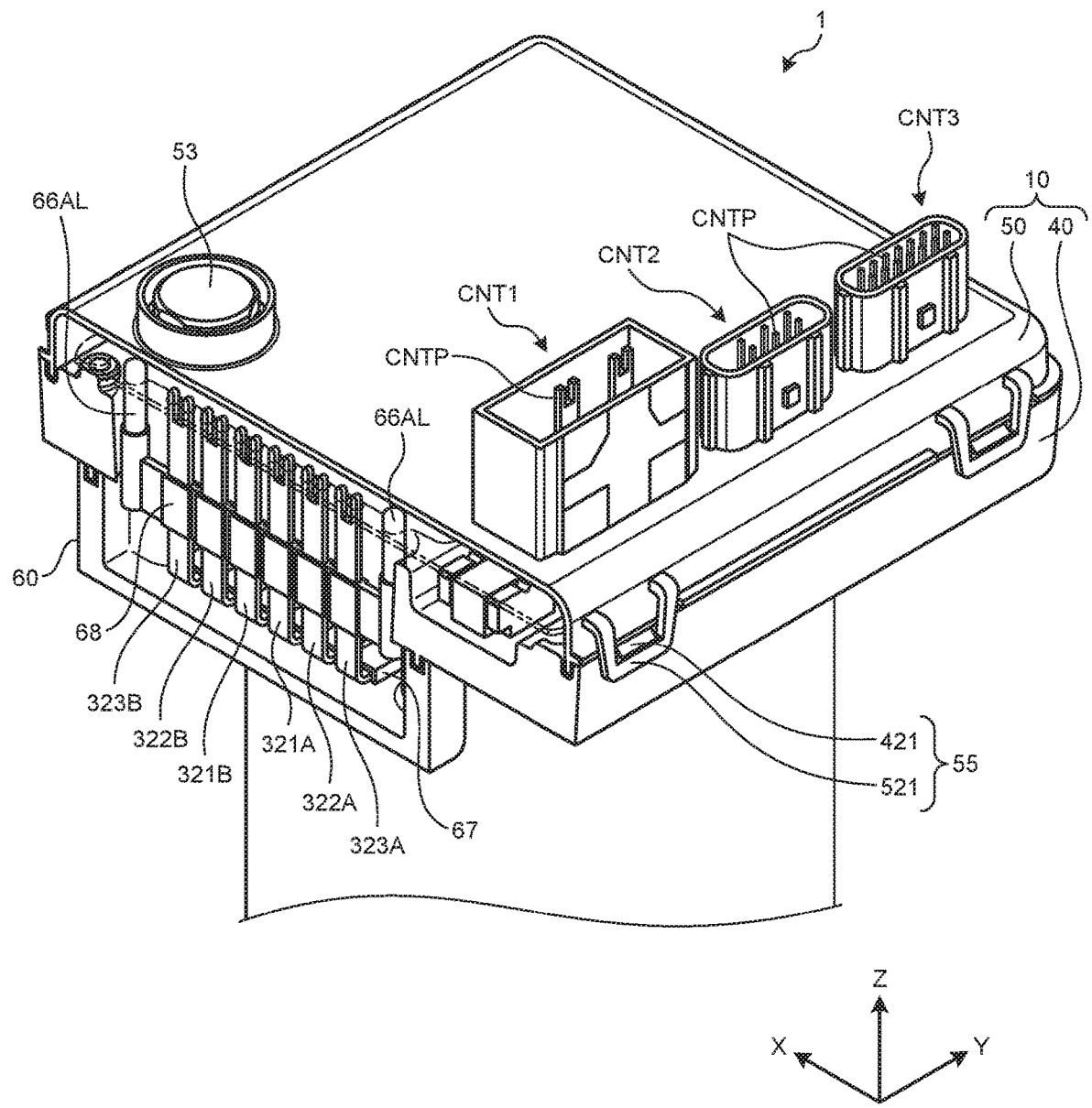
FIG. 66 is a perspective view illustrating a section obtained by cutting the electric drive device along line A9-A10 in FIG. 52.
Figure 67:
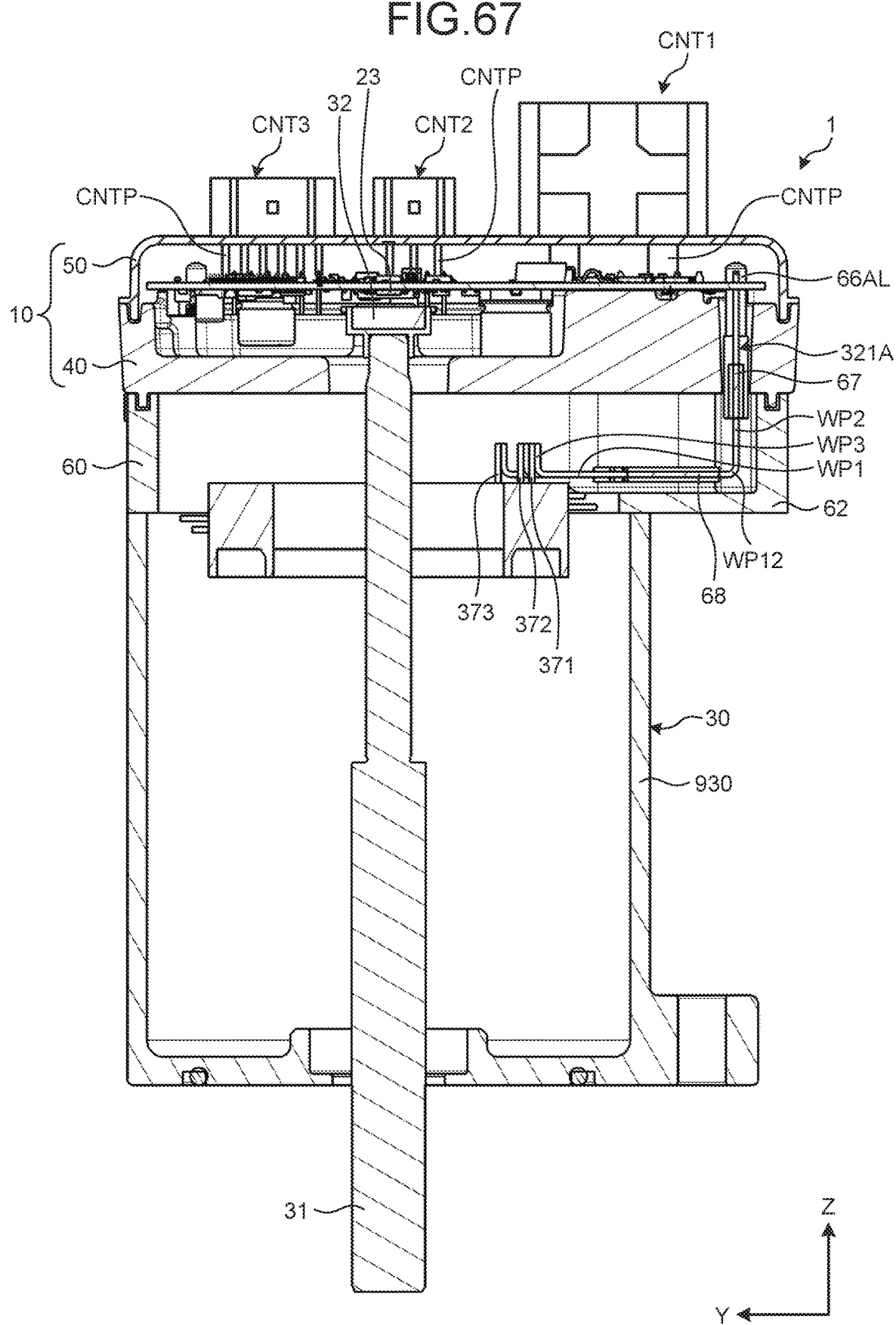
FIG. 67 is a sectional view obtained by cutting the electric drive device along line B3-B4 in FIG. 53.

FIG. 66 is a perspective view illustrating a section obtained by cutting the electric drive device along line A9-A10 in FIG. 52. FIG. 67 is a sectional view obtained by cutting the electric drive device along line B3-B4 in FIG. 53. As illustrated in FIGS. 66 and 67, also in the fourth embodiment, the electric drive device 1 includes the first coil wiring 321A, 322A, and 323A, the second coil wiring 321B, 322B, and 323B, the first connection member 67, and the second connection member 68. The first connection member 67 connects the first portions WP1 of the first coil wiring 321A, 322A, and 323A and the second coil wiring 321B, 322B, and 323B to one another. The second connection member 68 connects the second portions WP2 of the first coil wiring 321A, 322A, and 323A and the second coil wiring 321B, 322B, and 323B to one another. Each of the first connection member 67 and the second connection member 68 is made of an insulating resin. The first connection member 67 and the second connection member 68 allow the first coil wiring 321A, 322A, and 323A and the second coil wiring 321B, 322B, and 323B to be arranged adjacent to each another in the X-direction in a mutually separated state.

The electric motor 30 includes, for example, the three first terminal pieces 371, 372, and 373 connected to the first coil groups Gr1 and the three second terminal pieces (not illustrated) connected to the second coil groups Gr2. Once the heat sink 40 is mounted on the electric motor 30 with the adapter 60 interposed therebetween, the third portions WP3 of the first coil wiring 321A, 322A, and 323A are pressed so as to come in contact with the first terminal pieces 371, 372, and 373, respectively. The third portions WP3 of the second coil wiring 321B, 322B, and 323B are also pressed so as to come in contact with the respective second terminal pieces (not illustrated). As a result, the first coil wiring 321A, 322A, and 323A are connected to the first coil groups Gr1 with the first terminal pieces 371, 372, and 373 interposed therebetween, and the second coil wiring 321B, 322B, and 323B are connected to the second coil groups Gr2 with the second terminal pieces interposed therebetween. The resistance welding or the laser welding may be used to join the third portions WP3 to the first terminal pieces 371, 372, and 373 or the second terminal pieces.

As illustrated in FIG. 27, each of the bent portions WP12 of the first coil wiring 321A, 322A, and 323A is disposed inside the projecting portion 62 of the adapter 60. Each of the bent portions WP12 of the second coil wiring 321B, 322B, and 323B is also disposed inside the projecting portion 62.

Figure 68:
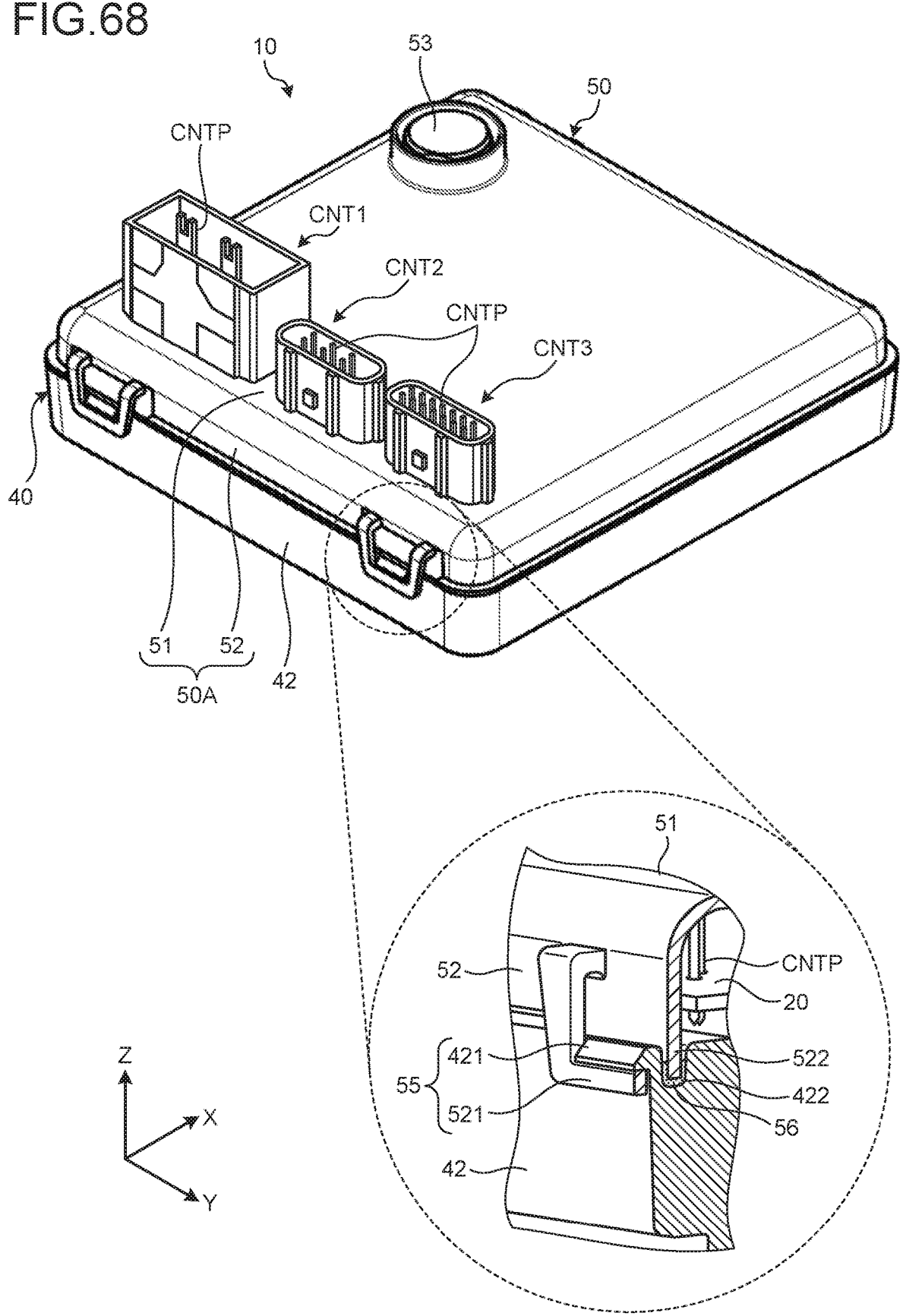
FIG. 68 is a perspective view illustrating an example of the snap-fits according to the fourth embodiment.

FIG. 68 is a perspective view illustrating an example of the snap-fits according to the fourth embodiment.

As illustrated in FIG. 68, also in the fourth embodiment, the ECU 10 is provided with the snap-fits 55 for mounting the lid 50 onto the heat sink 40. Each of the snap-fits 55 includes, for example, the hooking part 521 and the hooked part 421 hooked by the hooking part 521. The hooking parts 521 are provided at the outer circumferential portion 52 of the lid 50. The hooked parts 421 are provided at the outer circumferential portion 42 of the heat sink 40. The hooking parts 521 are provided in positions that overlap the hooked parts 421 in the Z-direction when the lid 50 is mounted on the heat sink 40. The process to mount the lid 50 onto the heat sink 40 is the same as that of the first embodiment.

As described above, the electric drive device 1 according to the fourth embodiment is provided with the electric motor 30 and the ECU 10 that is provided on the anti-load side of the shaft 31 to control the drive of the electric motor 30. The ECU 10 includes: the magnet 32 at the anti-load side end of the shaft 31; the circuit board 20 disposed on the anti-load side of the shaft 31 on an extended line in the axial direction of the shaft 31 (for example, the Z-direction); the lid 50 that covers the circuit board 20; and the connector CNT that is connected to the circuit board 20. The exterior portions CNTE of the connector CNT are formed integrally with the lid 50.

The integral formation of the lid body 50A with the exterior portions CNTE can contribute to a reduction in number of parts of the electric drive device 1.

The lid 50 has the first surface 51a facing the circuit board 20 and the second surface 51b located on the opposite side of the first surface 51a. The exterior portions CNTE of the connector CNT project from the second surface 51b to the outside of the lid 50. With this configuration, the signal transmission wiring (signal transmission wiring for transmitting, for example, the steering torque signal T and the vehicle speed signal SV) located outside the electric drive device can be connected from the lid 50 side through the connector CNT to the circuit board 20.

The first connector CNT1, the second connector CNT2, and the third connector CNT3 are separated from the first coil wiring 321A, 322A, and 323A and the second coil wiring 321B, 322B, and 323B in the Z-direction that is the normal direction of the circuit board 20. When viewed from the Z-direction, the first connector CNT1, the second connector CNT2, and the third connector CNT3 do not overlap the first coil wiring 321A, 322A, and 323A and the second coil wiring 321B, 322B, and 323B. With this configuration, at the circuit board 20, a region (for example, the through-holes 21H7) where the first connector CNT1, the second connector CNT2, and the third connector CNT3 are connected and a region (for example, the through-holes 21H6) where the first coil wiring 321A, 322A, and 323A or the second coil wiring 321B, 322B, and 323B are connected can be separated from each other. This arrangement can prevent excessive concentration of the through-holes 21H6 and 21H7 at the circuit board 20, When viewed from the Z-axis direction, the connector CNT is disposed outside the electric motor 30. This arrangement can locate the connector CNT away from the rotation angle sensor 23a. For example, the first connector CNT1 includes the power supply terminal Tdc. When the torque sensor 94 has detected a large amount of the steering torque, the current PSC flows from the power supply terminal Tdc to the first power circuit 25A and the second power circuit 25B (refer to FIG. 59), and may generate a strong magnetic field around the power supply terminal. Nevertheless, the electric drive device 1 according to the fourth embodiment has the first connector CNT1 disposed outside the electric motor 30 when viewed from the Z-axis direction, thereby making the separation distance between the power supply terminal Tdc and the rotation angle sensor 23a large. As a result, even when the strong magnetic field is generated around the power supply terminal Tdc, the magnetic field can be prevented from affecting the detection accuracy of the rotation angle sensor 23a as much as possible.

While the fourth embodiment has been described above, the present invention is not limited to the above-described embodiment. For example, while the fourth embodiment has the configuration in which the first connector CNT1, the second connector CNT2, and the third connector CNT3 are arranged in a row, the first connector CNT1, the second connector CNT2, and the third connector CNT3 need not be arranged in a row. For example, the first connector CNT1 may be provided outside a direction in which the second connector CNT2 and the third connector CNT3 are arranged.

REFERENCE SIGNS LIST

1 Electric drive device
10 ECU (electronic control device)
10A ECU body
20 Circuit board
21 Board body
23 Detection circuit
23a Rotation angle sensor
24 Control circuit
25A First power circuit
25B Second power circuit
30 Electric motor
31 Shaft
32 Magnet
37 First coil
38 Second coil
40 Heat sink
42, 52 Outer circumferential portion
44, 44A, 44B (Ring-shaped) wall portion
49 Choke coil
50 Lid
51 Top board
53 Valve
55 Snap-fit
56 Adhesive
57, 57A, 57B Cap
60 Adapter
70 Second rack-and-pinion mechanism
71A Second pinion shaft
71B Second pinion gear
71C Second rack
72 Tie rod
75A Worm shaft
75B Worm wheel
75 Speed reducer
82 Vehicle speed sensor
83 Power supply device
84 Ignition switch
91 Steering wheel
92 Steering shaft
92A Input shaft
92B Output shaft
92C Torsion bar 94 Torque sensor
96 Universal joint
97 Intermediate shaft
97A Upper shaft
97B Lower shaft
98 Universal joint
99 First rack-and-pinion mechanism
99A First pinion shaft
99B First pinion gear
99C Rack shaft
99D First rack
100 Electric power steering device
101 Vehicle
241 Control calculator
242 Gate drive circuit
243 Interruption drive circuit
251 Inverter circuit
253A, 253B Electrolytic capacitor
281, 282A, 282B, 291, 292 Electronic component
283 Thermistor
321A, 322A, 323A First coil wiring
321B, 322B, 323B Second coil wiring
371, 372, 373 First terminal piece
411 First raised portion
412A, 412B Second raised portion
421 Hooked part
422 Groove portion
431 First heat dissipation material
432 Second heat dissipation material
433 Third heat dissipation material
442, 442A, 442B, 442C Rib
445 Elastic ring
447 Magnetic shielding layer
521 Hooking part
930 Housing
931 Stator core
931a Back yoke
931b Tooth
932 Rotor
932a Rotor yoke
932b Magnetic pole
Ax Axial direction
CNT Connector
CNTB Connection member
CNTE Exterior portion
CNTP Terminal
CNT1 First connector
CNT2 Second connector
CNT3 Third connector
Gr1 First coil group
Gr2 Second coil group
PW Power wiring
SV Vehicle speed signal
T Steering torque signal
Tdc, Tgnd Power supply terminal
WP1 First portion
WP12 Bent portion
WP2 Second portion
WP3 Third portion
θm Motor electrical angle

The invention claimed is:

1. An electric drive device comprising:
   an electric motor including:
      a shaft;
      a motor rotor interlocked with the shaft;
      a motor stator including a stator core that rotates the motor rotor;
      a plurality of coil groups that are divided into at least two systems of first coil groups and second coil groups for each of three phases, and that excite the stator core with three-phase alternating currents; and
      a tubular housing that accommodates therein the motor rotor, the motor stator, and the coil groups;
   an electronic control device including:
      a magnet provided at an anti-load side end of the shaft in order to control drive of the electric motor; and
      a circuit board disposed on the anti-load side of the shaft on an extended line in an axial direction of the shaft;
   first coil wiring that connects the first coil groups to the circuit board;
   second coil wiring that connects the second coil groups to the circuit board; and
   a connector that is disposed outside the electric motor when viewed from the axial direction of the shaft, and that is connected to the circuit board, wherein
   the circuit board includes:
      a board body;
      a detection circuit including a magnetic sensor that detects rotation of the magnet;
      a first power circuit including a plurality of electronic components that supply currents to the first coil groups;
      a second power circuit including a plurality of electronic components that supply currents to the second coil groups; and
      a control circuit including electronic components that control the currents supplied by at least one of the first power circuit or the second power circuit,
   the detection circuit is mounted on a first surface of the board body,
   at least part of the electronic components included in the first power circuit and at least part of the electronic components included in the second power circuit are mounted on a second surface located on the opposite side of the first surface of the board body,
   each of the first coil wiring and the second coil wiring includes:
      a first portion that projects in a direction intersecting the axial direction of the shaft to an outside of the housing; and
      a second portion that projects from the first portion toward the circuit board on the outside, and
   when viewed from a normal direction of the circuit board, the second portion of the first coil wiring and the second portion of the second coil wiring are disposed on one side of the circuit board divided by a straight line passing through a center of the circuit board,
   the second portion of the first coil wiring is connected to the first power circuit at a position closer to an outer circumference of the circuit board than the electronic components included in the first power circuit are to the outer circumference of the circuit board,
   the second portion of the second coil wiring is connected to the second power circuit at a position closer to the outer circumference of the circuit board than the electronic components included in the second power circuit are to the outer circumference of the circuit board,
   the circuit board includes:
      a plurality of first through-holes for connection to the second portion of the first coil wiring; and
      a plurality of second through-holes for connection to the second portion of the second coil wiring, arrangement positions of the electronic components included in the first power circuit are between an arrangement position of the detection circuit and the first through-holes, arrangement positions of the electronic components included in the second power circuit are between the arrangement position of the detection circuit and the second through-holes, when viewed from the normal direction of the circuit board, the second portion of the first coil wiring and the second portion of the second coil wiring are arranged side by side in a first direction, and the connector is disposed such that a longitudinal direction thereof corresponds to a second direction intersecting the first direction.

2. The electric drive device according to claim 1, wherein when viewed from the normal direction of the circuit board, an arrangement position of an electronic component included in the control circuit is on the opposite side of the first through-holes across the arrangement positions of the electronic components included in the first power circuit, and an arrangement position of an electronic component included in the control circuit is on the opposite side of the second through-holes across the arrangement positions of the electronic components included in the second power circuit.

3. The electric drive device according to claim 1, further comprising a capacitor disposed on the circuit board, wherein when viewed from the normal direction of the circuit board, an arrangement position of the detection circuit is on the opposite side of arrangement positions of the electronic components included in the first power circuit or the second power circuit across an arrangement position of the capacitor.

4. The electric drive device according to claim 1, wherein, when viewed from the normal direction of the circuit board, an arrangement position of the detection circuit is on the opposite side of arrangement positions of the electronic components included in the first power circuit or the second power circuit across the straight line passing through a center of the circuit board.

5. The electric drive device according to claim 1, further comprising a heat sink that supports the circuit board.

6. The electric drive device according to claim 5, wherein the heat sink includes:
a first raised portion that faces at least one of the first power circuit or the second power circuit, and that is raised toward the circuit board; and
a second raised portion that faces the control circuit, and that is raised toward the circuit board.

7. The electric drive device according to claim 6, further comprising:
a first heat dissipation material provided on the first raised portion; and
a second heat dissipation material provided on the second raised portion.

8. The electric drive device according to claim 5, wherein the heat sink further includes a depressed portion that faces the circuit board, and that is depressed toward the opposite side of the circuit board, and
the depressed portion accommodates a capacitor disposed on the circuit board.

9. The electric drive device according to claim 5, further comprising a ring-shaped wall portion disposed between the heat sink and the circuit board, wherein
the heat sink includes a through-hole through which the shaft passes, and
the through-hole is located inside the ring of the wall portion in a plan view from the axial direction of the shaft.

10. The electric drive device according to claim 9, further comprising a plurality of ribs that connect an outer circumferential surface of the wall portion to the heat sink.

11. The electric drive device according to claim 9, further comprising a cap detachably mounted on an end portion on a circuit board side of the wall portion, wherein
the cap includes:
a top board portion that faces the magnet; and
a rim portion that supports an outer circumference of the top board portion, and a material of the top board portion is a resin.

12. The electric drive device according to claim 9, further comprising an elastic body disposed between the wall portion and the circuit board.

13. The electric drive device according to claim 12, wherein
the elastic body has a ring shape, and
the through-hole is located inside the ring of the elastic body in the plan view from the axial direction of the shaft.

14. The electric drive device according to claim 5, further comprising an adapter disposed between the electric motor and the heat sink, wherein
each of the first coil wiring and the second coil wiring further includes a bent portion bent between the first portion and the second portion, and
the bent portion is disposed inside the adapter.

15. The electric drive device according to claim 1, further comprising: a lid that covers the circuit board, wherein
the lid includes:
a lid body; and
an exterior portion of the connector formed integrally with the lid body.

16. An electric power steering device comprising the electric drive device according to claim 1, wherein the electric drive device generates steering assist torque.

* * * * *